(12) United States Patent
Song et al.

(10) Patent No.: US 10,203,121 B2
(45) Date of Patent: Feb. 12, 2019

(54) AIR CONDITIONER AND METHOD FOR CONTROLLING THE SAME

(71) Applicant: Samsung Electronics Co., Ltd., Suwon-si, Gyeonggi-do (KR)

(72) Inventors: Woo Seog Song, Yongin-si (KR); Dong Yoon Lee, Suwon-si (KR); Bu Youn Lee, Hwaseong-si (KR); Dong Woon Kang, Seongnam-si (KR); Do Yeon Kim, Uiwang-si (KR); Do-Hoon Kim, Suwon-si (KR); Byung Ghun Kim, Suwon-si (KR); Young-Jae Kim, Yongin-si (KR); Jun Woo Kim, Ansan-si (KR); Hyun Ah Kim, Suwon-si (KR); Yong Ho Seo, Hwaseong-si (KR); Hyeong Joon Seo, Suwon-si (KR); Byung Yul So, Incheon (KR); Jae Hyoung Sim, Suwon-si (KR); Joon-Ho Yoon, Suwon-si (KR); Jung Dae Lee, Seoul (KR); Chang Seon Lee, Suwon-si (KR); Chul Ju Lee, Seoul (KR); Seung Beom Lim, Seoul (KR); Keun Jeong Jang, Yongin-si (KR); Min Gu Jeon, Suwon-si (KR); Min-Gi Cho, Suwon-si (KR); Sung-June Cho, Suwon-si (KR); Eun Sung Jo, Seoul (KR); Hyeong Kyu Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/992,478

(22) Filed: May 30, 2018

(65) Prior Publication Data

US 2018/0274794 A1 Sep. 27, 2018

Related U.S. Application Data

(63) Continuation of application No. 15/389,663, filed on Dec. 23, 2016, which is a continuation of application
(Continued)

(30) Foreign Application Priority Data

May 7, 2015 (KR) .................. 10-2015-0063809
Oct. 23, 2015 (KR) .................. 10-2015-0147977
(Continued)

(51) Int. Cl.
*F24F 13/08* (2006.01)
*F24F 13/22* (2006.01)
(Continued)

(52) U.S. Cl.
CPC .......... *F24F 1/0007* (2013.01); *F24F 1/0011* (2013.01); *F24F 1/0022* (2013.01);
(Continued)

(58) Field of Classification Search
CPC .......... F24F 1/0007; F24F 13/20; F24F 11/77; F24F 11/30; F24F 1/0011; F24F 1/0033;
(Continued)

(56) References Cited

U.S. PATENT DOCUMENTS

| 4,856,672 A | 8/1989 | Sullivan |
| 2002/0152760 A1 | 10/2002 | Okuda et al. |

(Continued)

FOREIGN PATENT DOCUMENTS

| CN | 1363024 | 8/2002 |
| CN | 1573229 | 2/2005 |

(Continued)

OTHER PUBLICATIONS

U.S. Notice of Allowance dated Jul. 24, 2018 in U.S. Appl. No. 15/389,663.
(Continued)

*Primary Examiner* — Emmanuel Duke
(74) *Attorney, Agent, or Firm* — Staas & Halsey LLP

(57) ABSTRACT

An air conditioner (AC) indoor unit includes a housing having an inlet and an outlet; a heat exchanger arranged inside the housing; a blower fan for sucking in air at the inlet to be subject to heat exchange with the heat exchanger, and discharging the heat-exchanged air out of the outlet; and an air flow control device for controlling an air flow discharged
(Continued)

from the outlet by sucking in air around the outlet. The AC indoor unit may control the direction of a discharged air flow without a conventional blade structure, thereby increasing an amount of discharged air, reducing circulation noise, and enabling design differentiation.

20 Claims, 75 Drawing Sheets

Related U.S. Application Data

No. 15/145,199, filed on May 3, 2016, now Pat. No. 9,557,070.

(30) Foreign Application Priority Data

| Oct. 23, 2015 | (KR) | 10-2015-0148189 |
|---|---|---|
| Oct. 23, 2015 | (KR) | 10-2015-0148190 |
| Nov. 16, 2015 | (KR) | 10-2015-0160750 |
| Mar. 25, 2016 | (KR) | 10-2016-0035926 |

(51) Int. Cl.

| F24F 11/89 | (2018.01) |
|---|---|
| F24F 13/24 | (2006.01) |
| F24F 13/20 | (2006.01) |
| F24F 11/30 | (2018.01) |
| F24F 11/77 | (2018.01) |
| F24F 11/79 | (2018.01) |
| F24F 1/00 | (2011.01) |
| F24F 11/84 | (2018.01) |
| F24F 11/85 | (2018.01) |
| F24F 110/12 | (2018.01) |
| F24F 140/20 | (2018.01) |
| F24F 110/10 | (2018.01) |

(52) U.S. Cl.
CPC ............ *F24F 1/0033* (2013.01); *F24F 11/30* (2018.01); *F24F 11/77* (2018.01); *F24F 11/79* (2018.01); *F24F 11/89* (2018.01); *F24F 13/08* (2013.01); *F24F 13/20* (2013.01); *F24F 13/22* (2013.01); *F24F 13/222* (2013.01); *F24F 13/24* (2013.01); *F24F 11/84* (2018.01); *F24F 11/85* (2018.01); *F24F 2001/004* (2013.01); *F24F 2001/0037* (2013.01); *F24F 2001/0048* (2013.01); *F24F 2110/10* (2018.01); *F24F 2110/12* (2018.01); *F24F 2140/20* (2018.01); *F24F 2221/28* (2013.01)

(58) Field of Classification Search
CPC .. F24F 13/22; F24F 11/79; F24F 13/08; F24F 1/0022; F24F 13/222; F24F 11/89; F24F 13/24; F24F 2001/004; F24F 2140/20; F24F 2110/12; F24F 2221/28; F24F 2110/10; F24F 2001/0048; F24F 11/84; F24F 11/85; F24F 2001/0037
See application file for complete search history.

(56) References Cited

U.S. PATENT DOCUMENTS

| 2006/0042288 A1 | 3/2006 | Downs |
|---|---|---|
| 2007/0137243 A1 | 6/2007 | Lee |
| 2008/0034775 A1 | 2/2008 | Choi |

FOREIGN PATENT DOCUMENTS

| CN | 1594997 | 3/2005 |
|---|---|---|
| CN | 101187482 | 5/2008 |
| CN | 101297163 | 10/2008 |
| CN | 103245042 | 8/2013 |
| CN | 103261808 | 8/2013 |
| CN | 106907771 | 6/2018 |
| EP | 1710517 | 10/2006 |
| EP | 1884718 | 2/2008 |
| JP | 49-70503 | 9/1974 |
| JP | 58-88206 | 5/1983 |
| JP | 6-117657 | 4/1994 |
| JP | 6-193958 | 7/1994 |
| JP | 9-243109 | 9/1997 |
| JP | 2002-235930 | 8/2002 |
| JP | 2004-245558 | 9/2004 |
| JP | 2009-300044 | 12/2009 |
| JP | 2010-121797 | 6/2010 |
| KR | 10-2000-0055145 | 9/2000 |
| KR | 10-0273353 | 4/2001 |
| KR | 10-2004-0033938 | 4/2004 |
| KR | 10-0702323 | 3/2007 |
| KR | 10-2007-0096716 | 10/2007 |
| KR | 10-0806576 | 2/2008 |
| KR | 10-2008-0045563 | 5/2008 |
| KR | 20-2009-0001192 | 2/2009 |
| KR | 10-2014-0105085 | 9/2014 |
| WO | 2015/052012 | 4/2015 |

OTHER PUBLICATIONS

Korean Office Action dated Jun. 3, 2016 in Korean Patent Application No. 10-2016-0035926.
Extended European Search Report dated Sep. 5, 2016 in European Patent Application No. 16168418.8.
International Search Report dated Aug. 26, 2016 in International Patent Application No. PCT/KR2016/004722.
Restriction Requirement dated Jun. 30, 2016 in U.S. Appl. No. 15/145,199.
Notice of Allowance dated Oct. 14, 2016 in U.S. Appl. No. 15/145,199.
European Decision on Grant dated Mar. 22, 2017 in European Patent Application No. 16168418.8.
Korean Notice of Allowance dated Feb. 2, 2017 in Korean Patent Application No. 10-2016-0035926.
Korean Office Action dated Apr. 18, 2018 in Korean Patent Application No. 10-2017-0015440.
Chinese Office Action dated Mar. 9, 2018 in Chinese Patent Application No. 201710134049.X.
Extended European Search Report dated Jul. 4, 2017 in European Patent Application No. 17162998.3.
Chinese Office Action dated Oct. 12, 2017 in Chinese Patent Application No. 201710134049.X.
European Office Action dated Jul. 3, 2017 in European Patent Application No. 17162999.1.
Extended European Search Report dated Nov. 16, 2017 in European Patent Application No. 17162999.1.
U.S. Notice of Allowance dated Feb. 9, 2018 in U.S. Appl. No. 15/389,685.
U.S. Office Action dated Feb. 2, 2018 in U.S. Appl. No. 15/389,663.
U.S. Appl. No. 15/145,199 (now U.S. Pat. No. 9,557,070), filed May 3, 2016, Woo Seog Song, Samsung Electronics Co., Ltd.
U.S. Appl. No. 15/389,663, filed Dec. 23, 2016, Woo Seog Song, et al., Samsung Electronics Co., Ltd.
U.S. Appl. No. 15/389,685, filed Dec. 23, 2016, Woo Seog Song, et al., Samsung Electronics Co., Ltd.
Chinese Office Action dated Aug. 20, 2018 in Chinese Patent Application No. 201610302652.X.
Australian Office Action dated Aug. 24, 2018 in Australian Patent Application No. 2016259152.
Russian Notice of Allowance dated Jul. 19, 2018 in Russian Patent Application No. 2017134814/12.
Australian Office Action dated Dec. 4, 2018 in Australian Patent Application No. 2016259152.
Japanese Office Action dated Oct. 16, 2018 in Japanese Patent Application No. 2017-557403.

(56) References Cited

OTHER PUBLICATIONS

Korean Office Action dated Oct. 10, 2018 in Korean Patent Application No. 10-2017-0015440.
South African Notice of Allowance dated Nov. 16, 2018 in South African Patent Application No. 2017/06577.

AIR CONDITIONER AND METHOD FOR CONTROLLING THE SAME

CROSS-REFERENCE TO RELATED APPLICATIONS

This application is a continuation application of U.S. patent application Ser. No. 15/389,663 filed on Dec. 23, 2016, which is a continuation application of U.S. patent application Ser. No. 15/145,199 filed on May 3, 2016 which claims priority to and the benefit of Korean Patent Applications No. 10-2015-0063809 filed on May 7, 2015, No. 10-2015-0148190 filed on Oct. 23, 2015, No. 10-2015-0160750 filed on Nov. 16, 2015, No. 10-2015-0147977 filed on Oct. 23, 2015, No. 10-2015-0148189 filed on Oct. 23, 2015, and No. 10-2016-0035926 filed on Mar. 25, 2016, the disclosures of which are incorporated herein by reference in their entirety.

BACKGROUND

1. Field

The following description relates to an air conditioner and method for controlling the same, whereby a discharged air flow is controlled without a blade structure.

2. Description of the Related Art

An air conditioner (AC) is equipped with a compressor, a condenser, an expansion valve, an evaporator, a blower fan, and the like, for controlling indoor temperature, humidity, air flows, etc., using refrigeration cycles. The ACs may be classified into split ACs having two separate parts: the indoor unit to be installed indoors and the outdoor unit to be installed outdoors, and packaged ACs having the indoor unit and the outdoor unit located in a single housing.

The AC indoor unit includes a heat exchanger for exchanging heat between refrigerants and air, a blower fan for circulating air, and a motor for driving the blower fan, to cool or heat an indoor room.

The AC indoor unit may also have a structure for controlling a discharged air flow, to discharge the air cooled or heated by the heat exchanger in various directions. The structure for controlling a discharged air flow may commonly include a vertical or horizontal blade equipped in an outlet, and a driving system for driving the blade to turn. The AC indoor unit controls the direction of an air flow by controlling the turning angle of the blade.

With the structure to control a discharged air flow using the blade, the amount of discharged air may be reduced because the blade interferes with air flow, and circulating noise may increase due to turbulence produced around the blade. Furthermore, because a pivot of the blade is formed to be straight, the shape of the outlet is restricted to the straight shape.

SUMMARY

Additional aspects and/or advantages will be set forth in part in the description which follows and, in part, will be apparent from the description, or may be learned by practice of the disclosure.

The present disclosure relates to an air conditioner (AC) indoor unit capable of controlling a discharged air flow without a blade structure.

The present disclosure relates to an AC that prevents air discharged from an outlet from being sucked back into an inlet.

The present disclosure relates to an AC that prevents air discharged from an outlet from being sucked back into an inlet, thereby preventing condensation from being formed inside.

The present disclosure relates to an AC that prevents air discharged from an outlet from being sucked back into an inlet, thereby increasing a range the discharged air reaches and thus improving effective performance of the AC felt by the user.

The present disclosure relates to an AC that prevents air discharged from an outlet from being sucked back into an inlet, thereby increasing cooling/heating efficiency.

The present disclosure relates to an AC that includes a suction guide or a control case to promote the smooth flow of air to the inside of the AC.

In accordance with an aspect of the present disclosure, an air conditioner (AC) includes a housing having an and an outlet; a main fan for drawing air from the inlet and discharging the air to the outlet; an auxiliary fan arranged to draw air from around the outlet in order to change a direction of discharged air discharged from the outlet; and a guide path for guiding air drawn by the auxiliary fan.

The housing may include a bottom housing having the inlet and the outlet, and a middle housing combined on the top of the bottom housing, and the guide path may be formed between the middle housing and the bottom housing.

The housing may include an inflow hole to draw air around the outlet into the guide path, and a discharging hole to discharge air from the guide path.

The inflow hole may be located further away from a center of the air conditioner than the outlet, and the discharging hole is located closer to the center of the air conditioner than the outlet.

The guide path may include a first path to guide air around the outlet in a first direction in which the outlet extends, and a second path to guide the air from the first path in a second direction different from the first direction.

The housing may have another outlet, the outlets of the housing may be arranged to be separated from one another, and the second path may be formed between the outlets of the housing.

The Air conditioner may include another auxiliary fan and another guide path including another first path and another second path, and the first paths and the second paths correspond to the auxiliary fans respectively.

The housing may include a partition to divide the first paths.

Each of the first paths may be symmetrical with respect to the corresponding auxiliary fan.

The housing may include a guide part arranged at a point where the first path and the second path join, in order to change a direction of air flowing in the first path to the second path.

The housing may include a bridge formed between the outlets to form the second path.

The AC may further include a fan case to house the auxiliary fan, and the fan case may be arranged on the bridge.

The AC may further include a display unit for displaying information, and the display unit may be mounted on the bridge.

Each of the outlet and the inflow hole may have an arc form.

In accordance with an aspect of the present disclosure, an air conditioner (AC) includes a housing having an inlet and an outlet; a heat exchanger arranged inside the housing; a main fan for drawing air at the inlet to be subject to heat exchange with the heat exchanger, and discharging the heat-exchanged air out of the outlet; and a drain tray arranged to collect water condensed at the heat exchanger, wherein the drain tray comprises a drain tray outlet through which air to be discharged to the outlet passes, and a discharging guide rib arranged in the drain tray outlet.

The discharging guide rib may include a first discharging guide rib extending in a first direction in which the drain tray outlet extends and a second discharging guide rib extending in radial second direction different from the first direction.

The housing may include a housing discharging guide rib arranged to extend in the second direction to correspond to the second discharging guide rib.

In an aspect of the present disclosure, an air conditioner (AC) includes a housing having an inlet and an outlet; a heat exchanger arranged inside the housing; a main fan for draw air at the inlet to be subject to heat exchange with the heat exchanger, and discharging the heat-exchanged air out of the outlet; a drain tray arranged to collect water condensed at the heat exchanger and having an opening through which air sucked into the inlet passes; and a control case arranged outside of a perimeter of the opening in the radial direction to house electronic parts and having a curved part to correspond to the perimeter of the opening.

The AC may further include a suction guide combined onto the inlet and having a suction path to guide air drawn through the inlet to the main fan.

The control case may be arranged between the drain tray and the suction guide.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
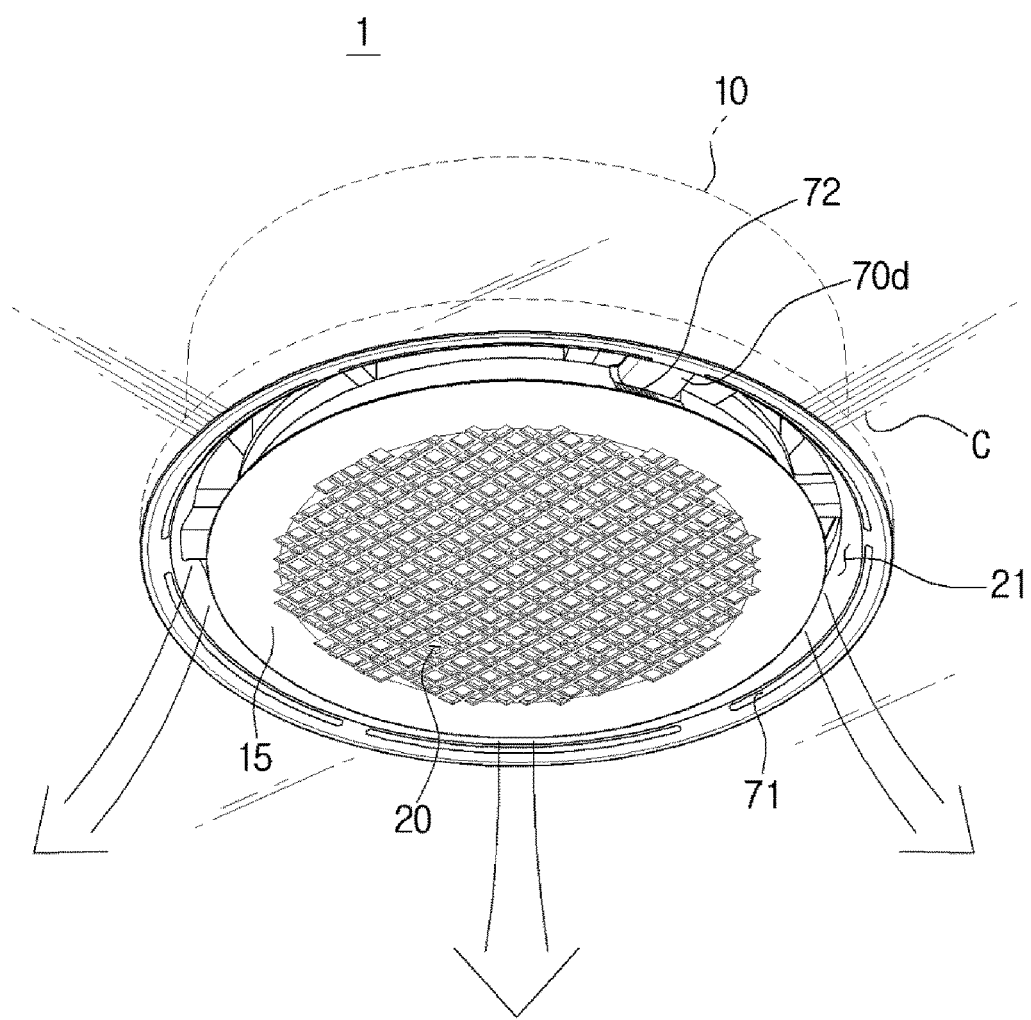
FIG. 1 shows an air conditioner (AC) indoor unit, according to an embodiment of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

Embodiments of the present disclosure will now be described in detail.

Figure 2:
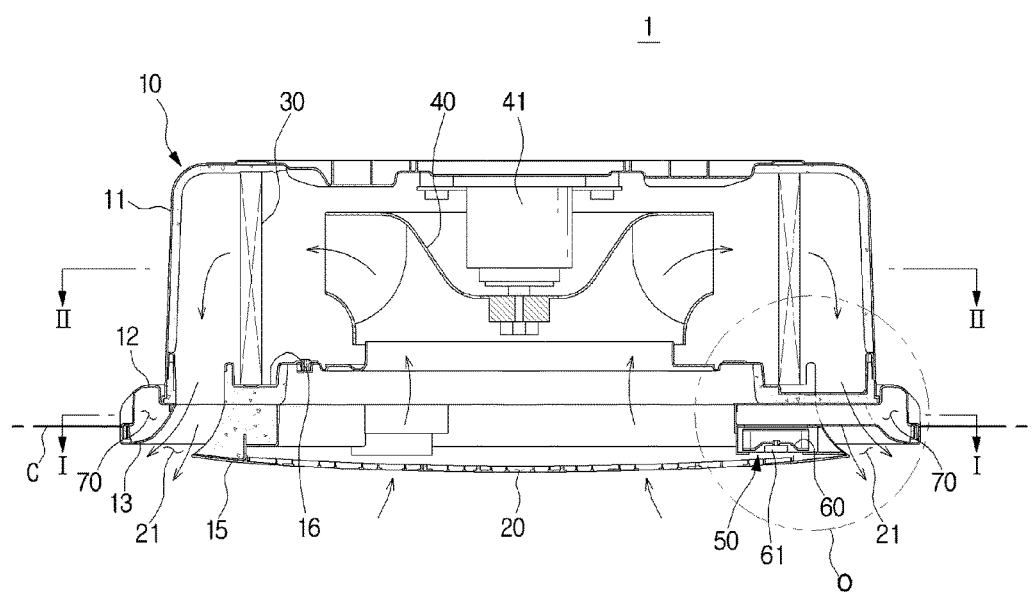
FIG. 2 shows a side cross-sectional view of the AC indoor unit of FIG. 1.
Figure 3:
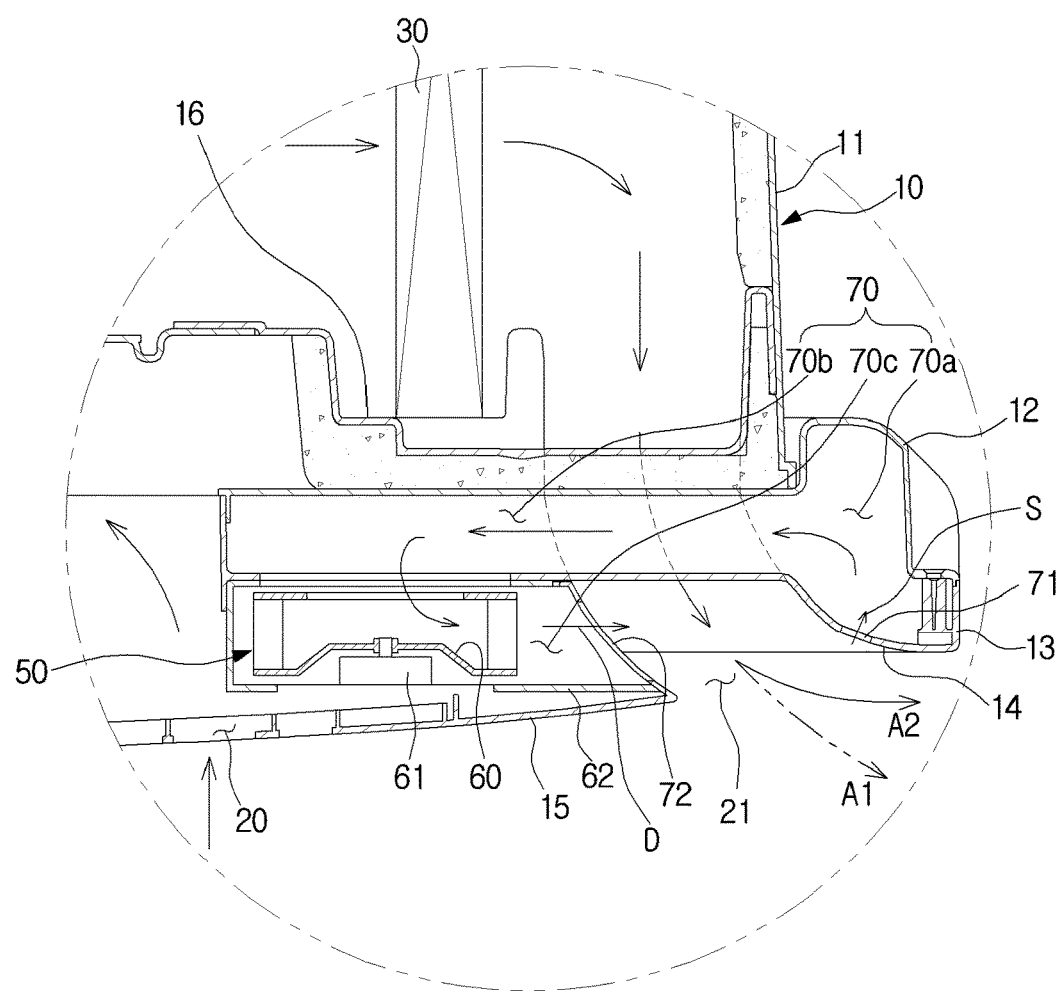
FIG. 3 is an enlarged view of part 'O' of FIG. 2.
Figure 4:
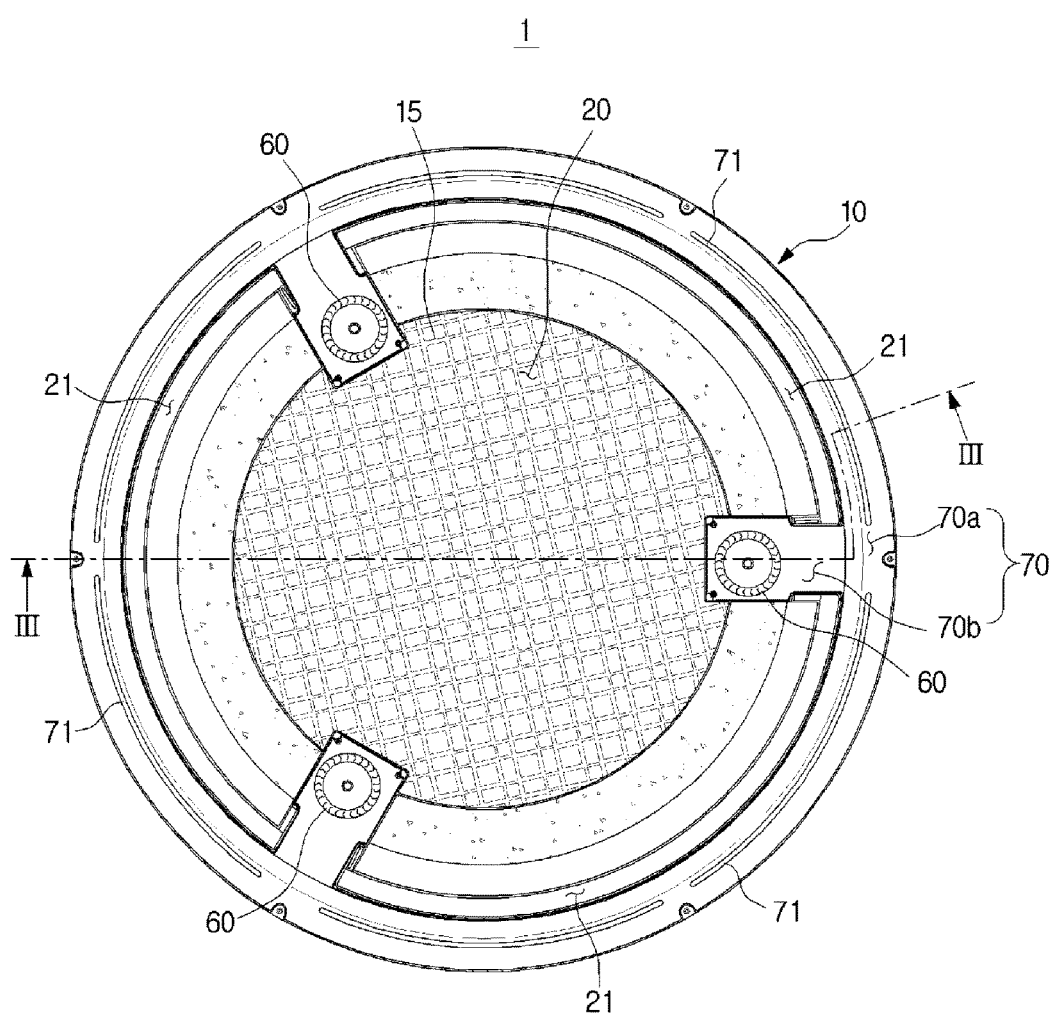
FIG. 4 is a cross-sectional plane view cut along line I-I of FIG. 2.
Figure 5:
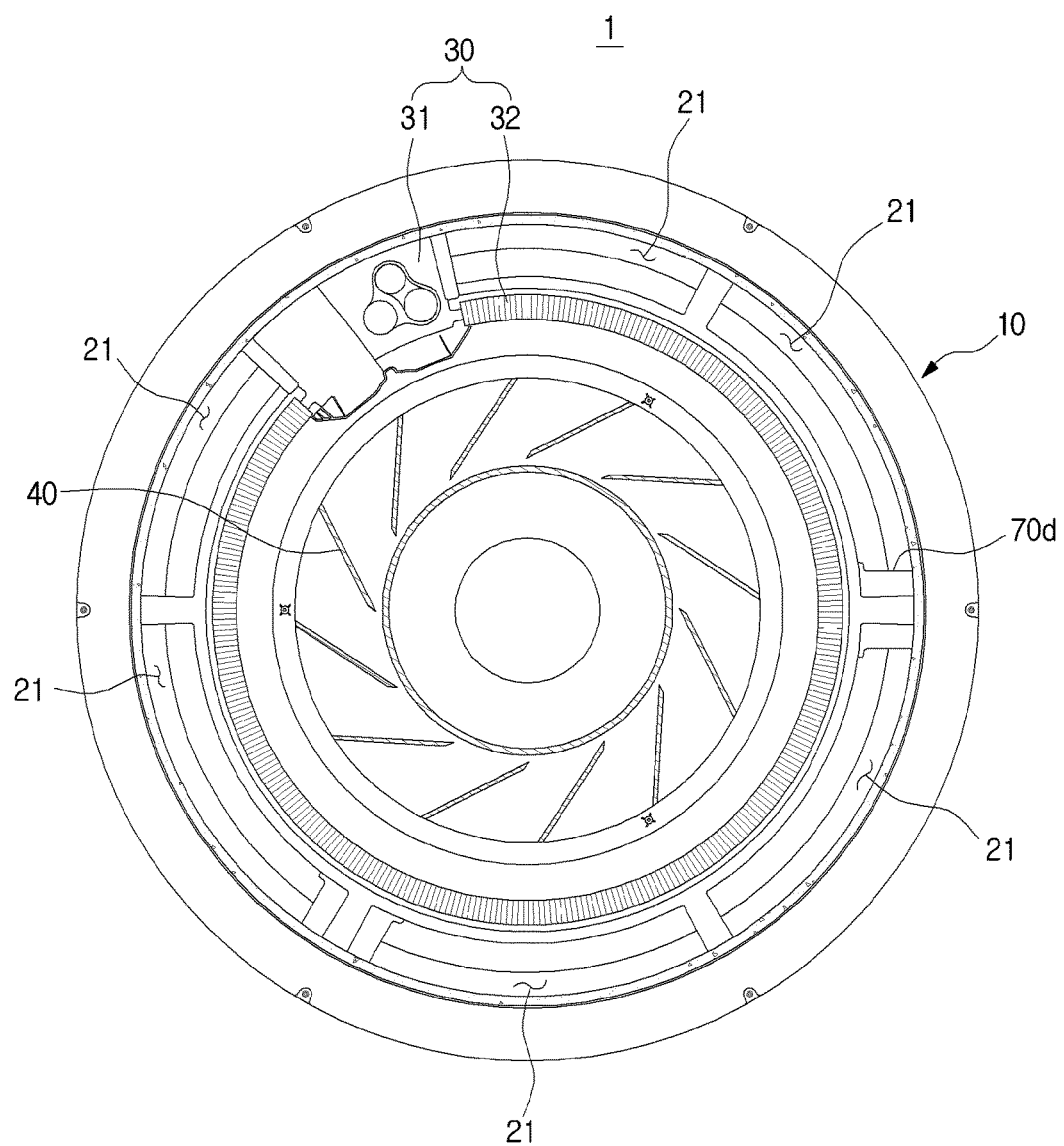
FIG. 5 is a cross-sectional plane view cut along line II-II of FIG. 2.

FIG. 1 shows an air conditioner (AC) indoor unit, according to an embodiment of the present disclosure. FIG. 2 shows a side cross-sectional view of the AC indoor unit of FIG. 1. FIG. 3 is an enlarged view of part 'O' of FIG. 2. FIG. 4 is a cross-sectional plane view cut along line I-I of FIG. 2. FIG. 5 is a cross-sectional plane view cut along line II-II of FIG. 2. Technically speaking, the side cross-sectional view of FIG. 2 is a revolved section view cut along line III to III of FIG. 3.

Referring to FIGS. 1 to 5, an AC indoor unit in accordance with an embodiment of the present disclosure will be described.

An AC indoor unit 1 may be installed on the ceiling C. At least a part of the AC indoor unit 1 may be embedded in the ceiling C.

The AC indoor unit 1 may include a housing 10 having an inlet 20 and an outlet 21, a heat exchanger 30 arranged inside the housing 10, and a blower fan 40 for circulating air.

Viewed from the vertical direction, the housing 10 may have an approximately circular shape. The housing 10 may include a top housing 11, a middle housing 12 combined on the bottom of the top housing 11, and a bottom housing 13 combined on the bottom of the middle housing 12. At least parts of the top housing 11 and middle housing 12 may be embedded in the ceiling C.

The inlet 20 for sucking in air may be formed in the center of the bottom housing 13, and the outlet 21 for discharging air may be formed around and outside the inlet 20. Viewed from the vertical direction, the outlet 21 may have an approximately circular shape. Specifically, the outlet 21 may include a plurality of arcs separated from one another by bridges 70d, as viewed from the vertical direction.

With this structure, the AC indoor unit 1 may suck in air at the bottom, cool or heat the air, and discharge the cooled or heated air out of the bottom.

The bottom housing 13 may have a Coanda curved part 14 to guide the air discharged through the outlet 21. The Coanda curved part 14 may guide an air flow discharged though the outlet 21 to adhere closely to and flow across the Coanda curved part 14.

A grill 15 may be combined onto the bottom of the bottom housing 13 to filter out dust from air sucked into the inlet 20.

The heat exchanger 30 may include a tube 32 in which refrigerants circulate, and a header 31 connected to an external refrigerant tube to supply or collect refrigerants to or from the tube 32, as shown in FIG. 5. The tube 32 may have heat exchange pins to expand a heat radiation area.

Viewed from the vertical direction, the heat exchanger 30 may have an approximately circular shape. Specifically, the tube 32 of the heat exchanger 30 may have a circular shape. The heat exchanger 30 may rest on a drain tray 16 for condensed water generated in the heat exchanger 30 to be collected in the drain tray 16.

The blower fan 40 may be located on inner side in the radial direction of the heat exchanger 30. The blower fan 40 may be a centrifugal fan that sucks in air in the axial direction and releases the air in the radial direction. The AC indoor unit 1 may include a blower motor 41 for driving the blower fan 40. The blower fan 40 may be named main fan and current control fan 60 which is described later may be named auxiliary fan.

With this structure, the AC indoor unit 1 may suck in air in a room, cool or heat the air, and then release the cooled or heated air back to the room.

The AC indoor unit 1 may further include an air flow control device 50 for controlling a discharged air flow.

The air flow control device 50 may control the direction of the discharged air flow by sucking in air around the outlet 21 to change the pressure. Furthermore, the air flow control device 50 may control an amount of sucking air around the outlet 21. In other words, the air flow control device 50 may control the direction of a discharged air flow by controlling the amount of sucking air around the outlet 21.

Controlling the direction of a discharged air flow herein refers to controlling an angle of the discharged air flow.

In sucking in air around the outlet 21, the air flow control device 50 may suck in air from one side of a direction in which the discharged air flow flows.

Specifically, as shown in FIG. 3, given that a direction in which the discharged air flow flows when the air flow control device 50 is not activated is denoted as direction A1, the air flow control device 50, when activated, may change the direction for the discharged air flow to flow to direction A2 by sucking in (S) air from one side of the direction A1.

At this time, the angle of changing direction may be controlled based on the amount of air suction. For example, the less the amount of air suction, the less the angle of changing direction, and the more the amount of air suction, the more the angle of changing direction.

The air flow control device 50 may discharge (D) air sucked in to one side of the direction A1 in which the discharged air flow flows. Especially, the air flow control device 50 may discharge air in the opposite direction to the direction in which the air was sucked in. By doing this, it may expand the angle of discharging air flow, thereby controlling the air flow more smoothly.

The air flow control device 50 may suck in air from the outer side in the radial direction of the outlet 21 (or from above the discharged air flow). Like this, as the air flow control device 50 sucks in air from the outer side in the radial direction of the outlet 21, the discharged air flow may widely spread out from the center part in the radial direction of the outlet 21 to the outer side in the radial direction.

The air flow control device 50 may include an air flow control fan 60 for producing a sucking force to suck in air around the outlet 21, an air flow control motor 61 for driving the air flow control fan 60, and a guide paths 70 for guiding the air sucked in by the air flow control fan 60.

The air flow control fan 60 may be housed in a fan case 62. In the embodiment, there may be three air flow control fans 60 each formed with 120 degrees. The air flow control fan 60 is not limited thereto, but more or fewer air flow control fans 60 with various arrangements may be designed.

Although the air flow control fan 60 corresponds to a centrifugal fan in the embodiment, it is not limited thereto, and various fans, such as axial-flow fans, cross-flow fans, mixed flow fans, etc., may also be used for the air flow control fan 60.

The guide path 70 connects an inflow hole 71 for sucking in air around the outlet 21 to the discharging hole 72 for discharging the air sucked in. When a path to connect the inlet 20 and the outlet 21 is called a main path, the guide path 70 may be said to be formed by being branched from the main path.

The inflow hole 71 may be formed on the Coanda curved part 14 of the bottom housing 13. Accordingly, the discharged air flow bent toward the inflow hole 71 of the bottom housing 13 according to a sucking force of the air flow control fan 60 may flow across the surface of the Coanda curved part 14.

The inflow hole 71 may be formed of a plurality of arc-shaped slits. The plurality of slits may be arranged in the circumferential direction to be separated from one another with a predetermined gap.

The discharging hole 72 may be located around the outlet 21 on the opposite side to the inflow hole 71. Specifically, the discharging hole 72 may be formed in the fan case 62.

As described above, with this structure, the air flow control device 50 may discharge (D) air to one side of the direction A1 in which the discharged air flow flows. Especially, the air flow control device 50 may discharge air in the direction opposite to the sucking direction, thereby expanding an angle of discharging air flow and controlling the air flow more smoothly.

The guide path 70 may include a first path 70a formed in the circumferential direction on the outer side of the housing 10 and funneled with the inflow hole 71, a second path 70b extending inward in the radial direction from the first path 70a, and a third path 70c formed inside the fan case 62. The second path 70b may be formed inside the bridge 70d that crosses the outlet 21.

Accordingly, air sucked in through the inflow hole 71 may be discharged out of the discharging hole 72 through the first path 70a, the second path 70b, and the third path 70c.

The structure of the guide path 70 is, however, only by way of example, and there are no limitations on the structure, shape, and arrangement of the guide path 70 as long as the guide path 70 connects the inflow hole 71 and the discharging hole 72.

With the structure, the AC indoor unit in accordance with embodiments of the present disclosure may control a discharged air flow without a blade structure, as compared to a conventional AC indoor unit in which a blade is arranged in the outlet and an air flow is controlled by turning the blade. Accordingly, because there is no interference by a blade, an amount of discharge may increase and circulation noise may be lessened.

Furthermore, in contrast with the conventional AC indoor unit having an outlet that has to be formed in a straight shape to turn the blade, the AC indoor unit according to embodiments of the present disclosure has an outlet that may be formed in a circular shape, and accordingly the housing and the heat exchanger may also be formed in the circular shape, thereby improving the aesthetic appearance with the differentiated design. Furthermore, given that the shape of a common blower fan is circular, in the embodiments of the present disclosure, air flows more naturally, pressure loss is reduced, and as a result, cooling or heating performance of the AC may be improved.

Figure 6:
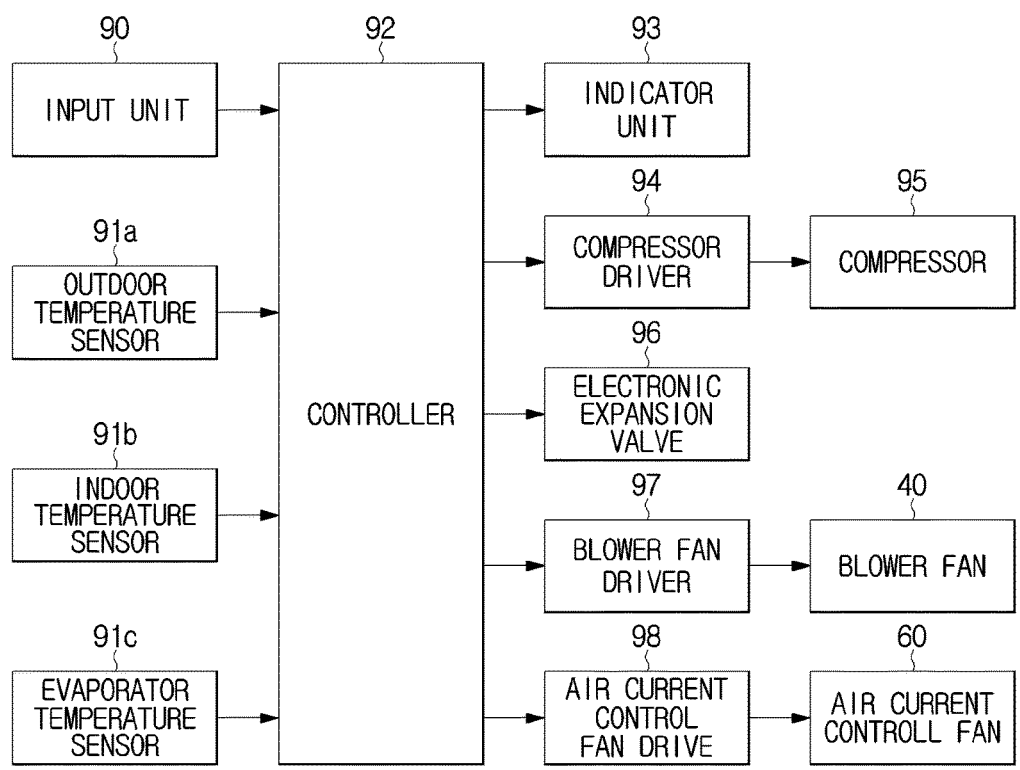
FIG. 6 is a block diagram of an AC control system, according to an embodiment of the present disclosure.

FIG. 6 is a block diagram of an AC control system, according to an embodiment of the present disclosure.

An AC may include a controller 92 for controlling general operation, an input unit 90 for receiving operation instructions, an outdoor temperature sensor 91a for detecting an outdoor temperature, an indoor temperature sensor 91b for detecting an indoor temperature, an evaporator temperature sensor 91c for detecting temperature of an evaporator, an indicator unit 93 for indicating various information to the outside, a compressor driver 94 for driving a compressor 95, an electronic expansion valve 96, a blower fan driver 97 for driving the blower fan 40, and an air flow control fan driver 98 for driving the air flow control fan 60.

The controller 92 may receive various operation instructions and/or temperature information from the input unit 90, outdoor temperature sensor 91a, indoor temperature sensor 91b, and evaporator temperature sensor 91c, and send control instructions to the indicator unit 93, compressor driver 94, electronic expansion valve 96, blower fan driver 97, and air flow control fan driver 98 based on the received instruction and/or information.

The air flow control fan driver 98 may control whether to drive the air flow control motor 61 and the driving speed according to the control instruction from the controller 92. By doing this, it may control an amount of air to be sucked in around the outlet 21 and the direction of a discharged air flow.

Figure 7:
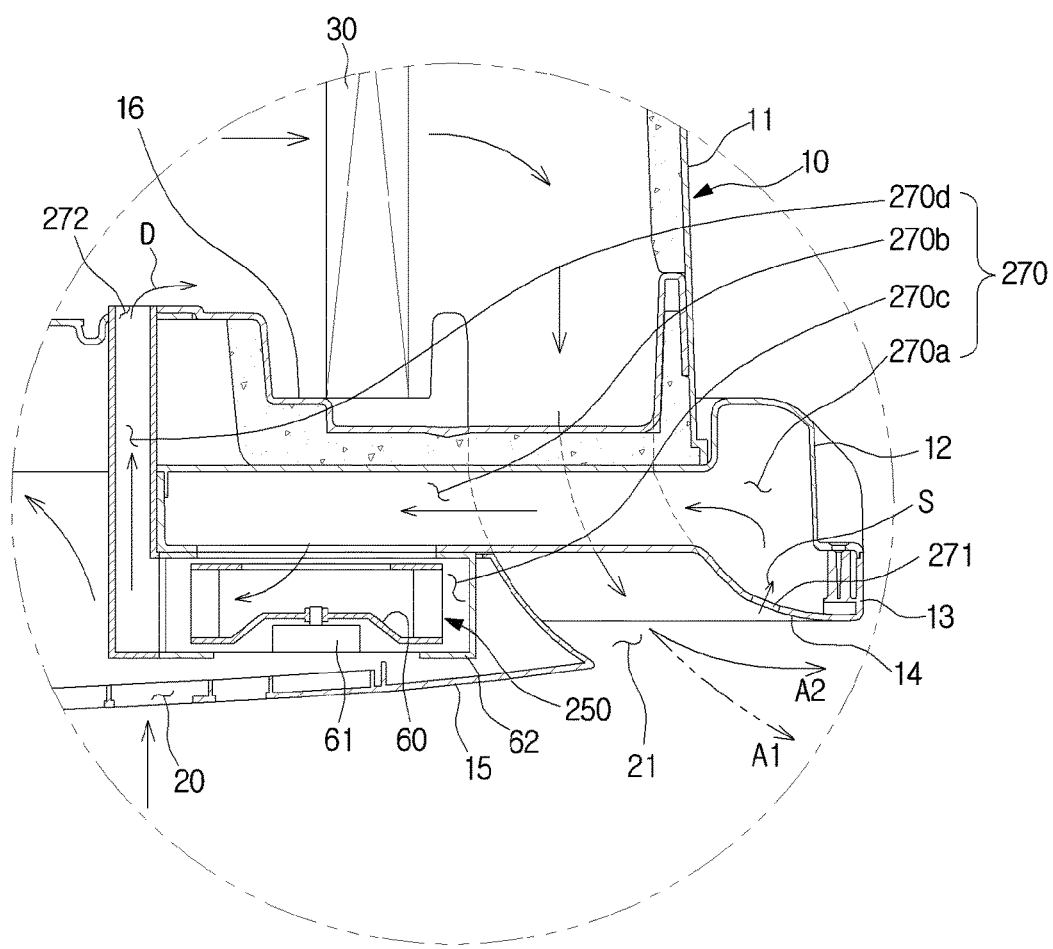
FIG. 7 is a side cross-sectional view of an AC indoor unit, according to an embodiment of the present disclosure.

FIG. 7 is a side cross-sectional view of an AC indoor unit, according to an embodiment of the present disclosure. Referring to FIG. 7, an AC indoor unit in accordance with an embodiment of the present disclosure will be described. The same features as in the aforementioned embodiment are denoted by the same reference numerals, and the overlapping description will be omitted herein.

An air flow control device 250 of an AC indoor unit 200 may suck in (S) air from around the outlet 21, and discharge (D) the air sucked in to the inside of the housing 10.

In the embodiment, the air flow control device 250 may discharge the air sucked in from around the outlet 21 toward the upper reaches of the heat exchanger 30 according to the direction in which the air flow flows. The discharged air is cooled or heated by the heat exchanger 30, and then finally discharged into the room through the outlet 21.

An inflow hole 271 for sucking in air around the outlet 21 to release the air to the inside of the housing 10 is formed in the bottom housing 13, and a discharging hole 272 for discharging the air sucked in is formed inside the housing 10.

A guide path 270 is formed to connect the inflow hole 217 and the discharging hole 272. The guide path 270 may include a first path 270a formed in the circumferential direction and funneled with the inflow hole 271, a second path 270b extending inward in the radial direction from the first path 270a, a third path 270c formed inside the fan case 62, and a fourth path 270d extending from the third path 270c to the inside of the housing 10 and funneled with the discharging hole 272.

Accordingly, air sucked in through the inflow hole 271 may be discharged out of the discharging hole 272 through the first path 270a, the second path 270b, the third path 270c, and the fourth path 270d.

The structure of the guide path 270 is, however, only by way of example, and there are no limitations on the structure, shape, and arrangement of the guide path 270 as long as the guide path 70 connects the inflow hole 271 and the discharging hole 272.

Figure 8:
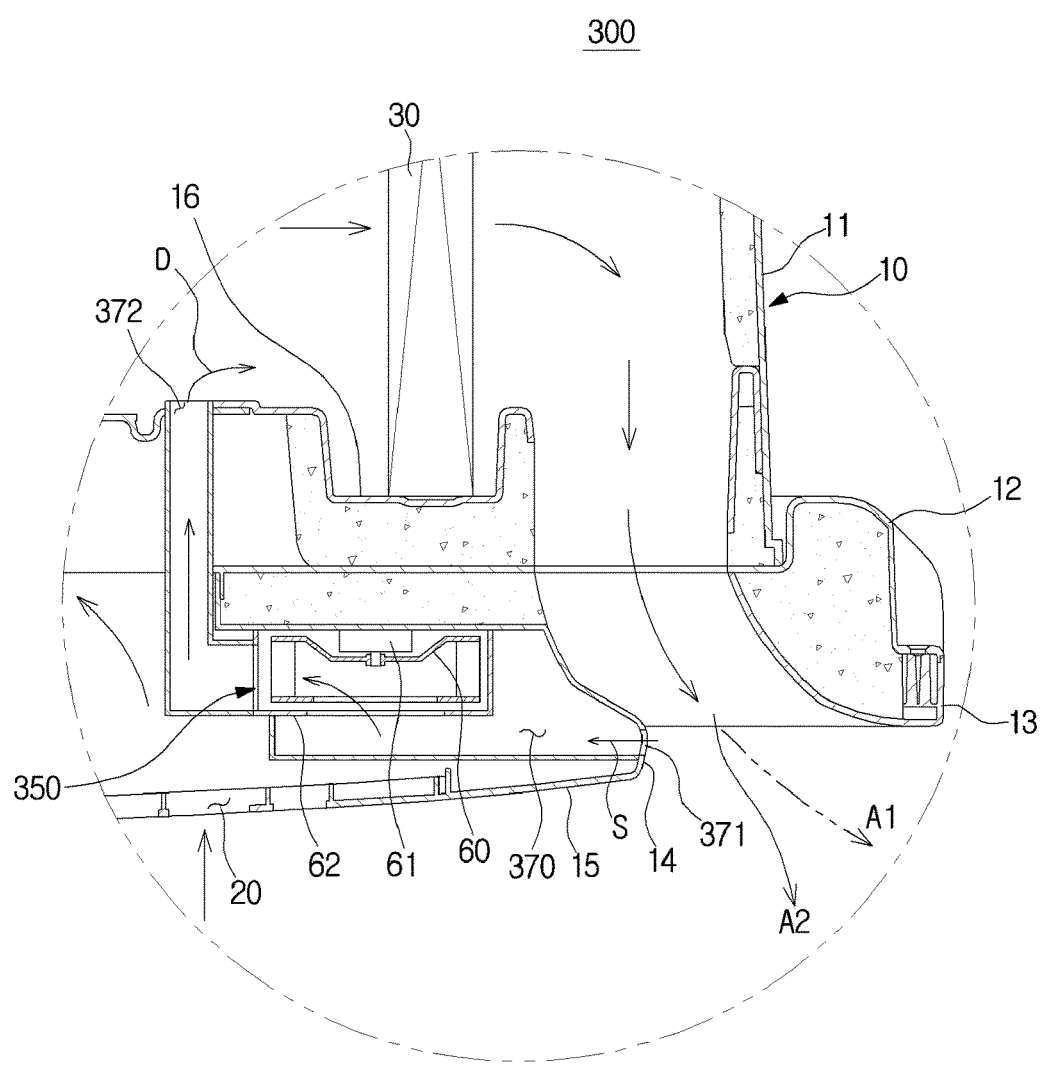
FIG. 8 is a side cross-sectional view of an AC indoor unit, according to an embodiment of the present disclosure.

FIG. 8 is a side cross-sectional view of an AC indoor unit, according to an embodiment of the present disclosure. Referring to FIG. 8, an AC indoor unit in accordance with an embodiment of the present disclosure will be described. The same features as in the aforementioned embodiments are denoted by the same reference numerals, and the overlapping description will be omitted herein.

An air flow control device 350 of an AC indoor unit 300 may be configured not to suck in air from the outer side in the radial direction of the outlet 21 (or from above a discharged air flow) but to suck in air from the inner side in the radial direction of the outlet 21 (or from under the discharged air flow). For this, an inflow hole 371 for sucking in air around the outlet 21 may be formed on the inner side in the radial direction of the outlet 21.

Air sucked in through the inflow hole 371 may be discharged (D) out of the discharging hole 372 through a guide path 370.

Like this, as the air flow control device 350 sucks in (S) air from the inner side in the radial direction of the outlet 21, the discharged air flow may be concentrated onto the central part in the radial direction from the outer side in the radial direction of the outlet 21.

Figure 9:
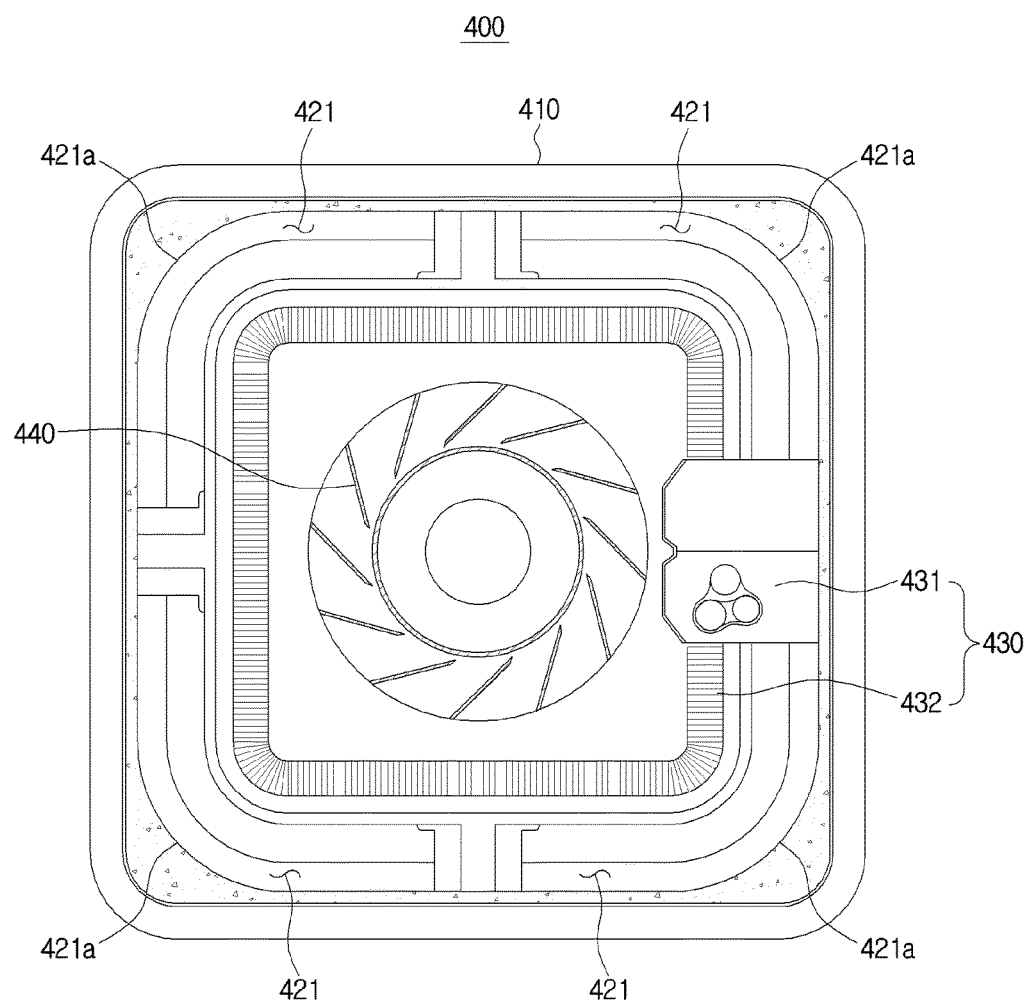
FIG. 9 is a cross-sectional plane view of an AC indoor unit, according to an embodiment of the present disclosure.

FIG. 9 is a cross-sectional plane view of an AC indoor unit, according to an embodiment of the present disclosure. Referring to FIG. 9, an AC indoor unit in accordance with an embodiment of the present disclosure will be described. The same features as in the aforementioned embodiments are denoted by the same reference numerals, and the overlapping description will be omitted herein.

An AC indoor unit 400 may include a housing 410 having an inlet and an outlet 421, a heat exchanger 430 arranged inside the housing 410, and a blower fan 440 for circulating air.

Viewed from the vertical direction, the housing 410 may have an approximately square shape. The inlet for sucking in air may be formed in the bottom center of the housing 410, and the outlet 421 for discharging air may be formed around and outside the inlet.

The outlet 421 may have an approximately square form, when viewed from the vertical direction, with round corners 421a. Unlike the conventional AC indoor unit having an outlet that has to be in a straight shape to turn a blade, the outlet 421 in accordance with the embodiment may be allowed to have such round corners 421a because it has no blade structure.

Alternatively, the outlet 421 may have a triangular, pentagonal, hexagonal shape, or the like, other than the square shape.

The heat exchanger 430 may include a tube 432 for circulating refrigerants, and a header 431 connected to an external refrigerant tube for supplying or collecting refrigerants into or from the tube 432, and a blower fan 440 may be located within the radius of the heat exchanger 430.

Figure 10:
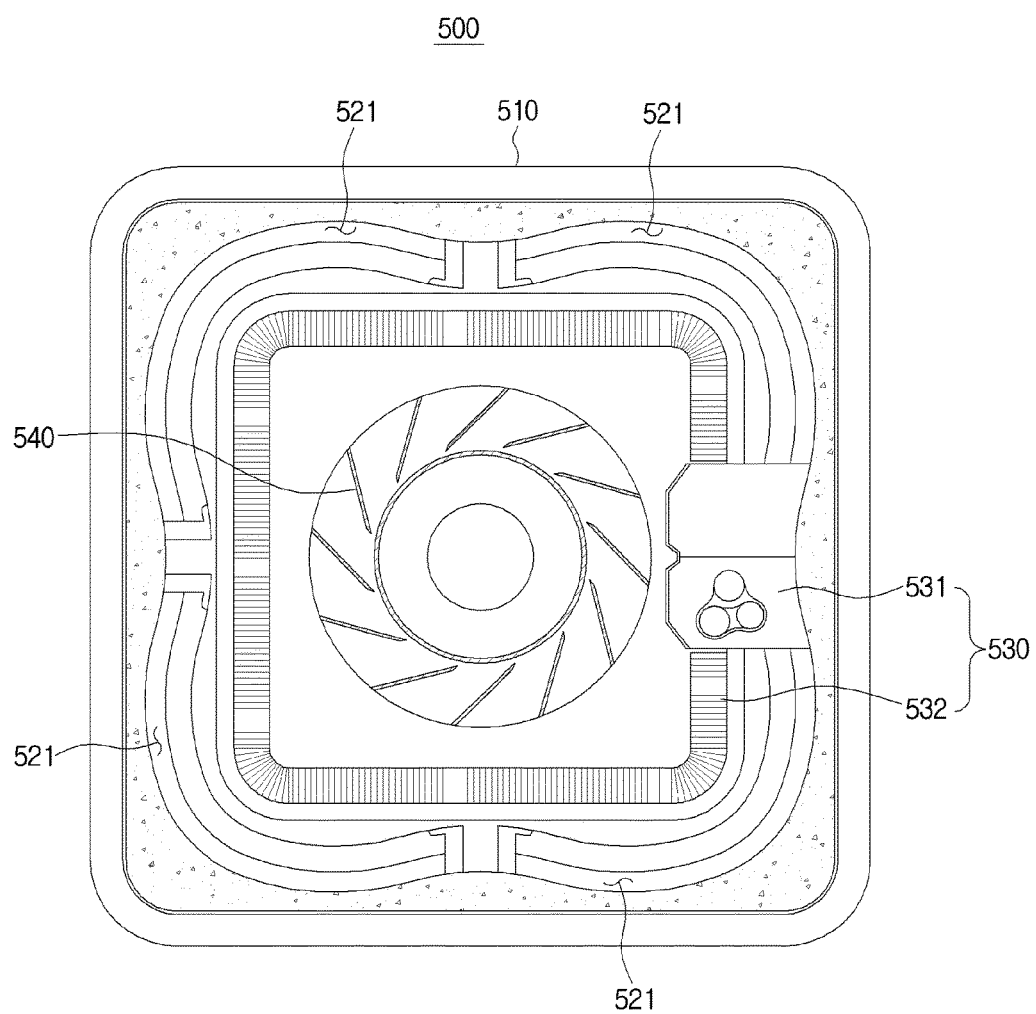
FIG. 10 is a cross-sectional plane view of AC indoor unit, according to an embodiment of the present disclosure.

FIG. 10 is a cross-sectional plane view of an AC indoor unit, according to an embodiment of the present disclosure. Referring to FIG. 10, an AC indoor unit in accordance with an embodiment of the present disclosure will be described. The same features as in the aforementioned embodiments are denoted by the same reference numerals, and the overlapping description will be omitted herein.

An AC indoor unit 500 may include a housing 510 having an inlet and an outlet 521, a heat exchanger 530 arranged inside the housing 510, and a blower fan 540 for circulating air.

Viewed from the vertical direction, the housing 510 may have an approximately square shape. The inlet for sucking in air may be formed in the bottom center of the housing 510, and the outlet 521 for discharging air may be formed on the outer side in the radial direction of the bottom of the housing 510.

The outlet 521 may have an approximately square form, when viewed from the vertical direction, with not straight but curved sides. Unlike the conventional AC indoor unit having an outlet that has to be in a straight shape to turn a blade, the outlet 521 in accordance with the embodiment may be allowed to have such a curved shape because it has no blade structure.

The heat exchanger 530 may include a tube 532 for circulating refrigerants, and a header 531 connected to an external refrigerant tube for supplying or collecting refrigerants into or from the tube 532, and a blower fan 540 may be located within the radius of the heat exchanger 530.

Figure 11:
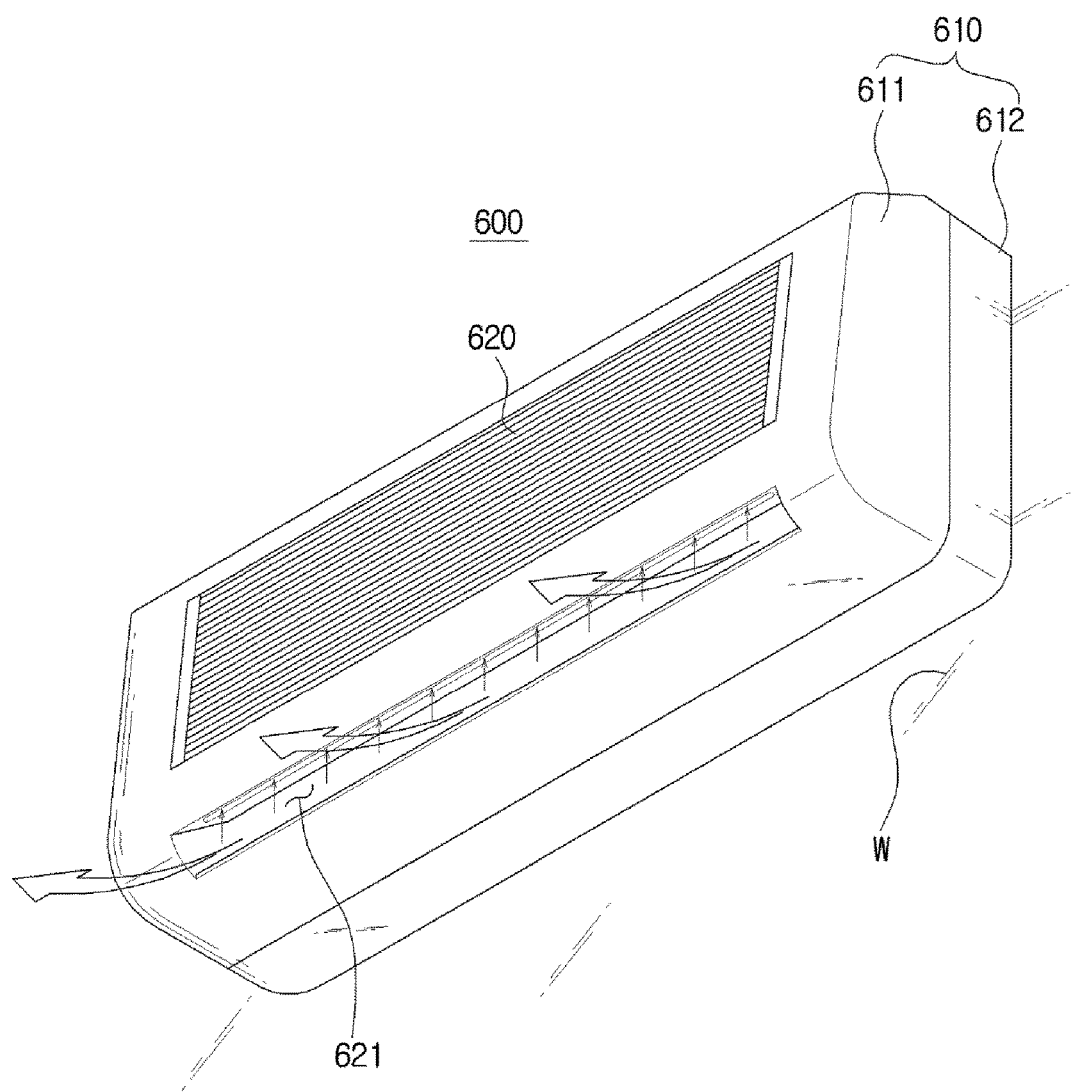
FIG. 11 shows an AC indoor unit, according to an embodiment of the present disclosure.
Figure 12:
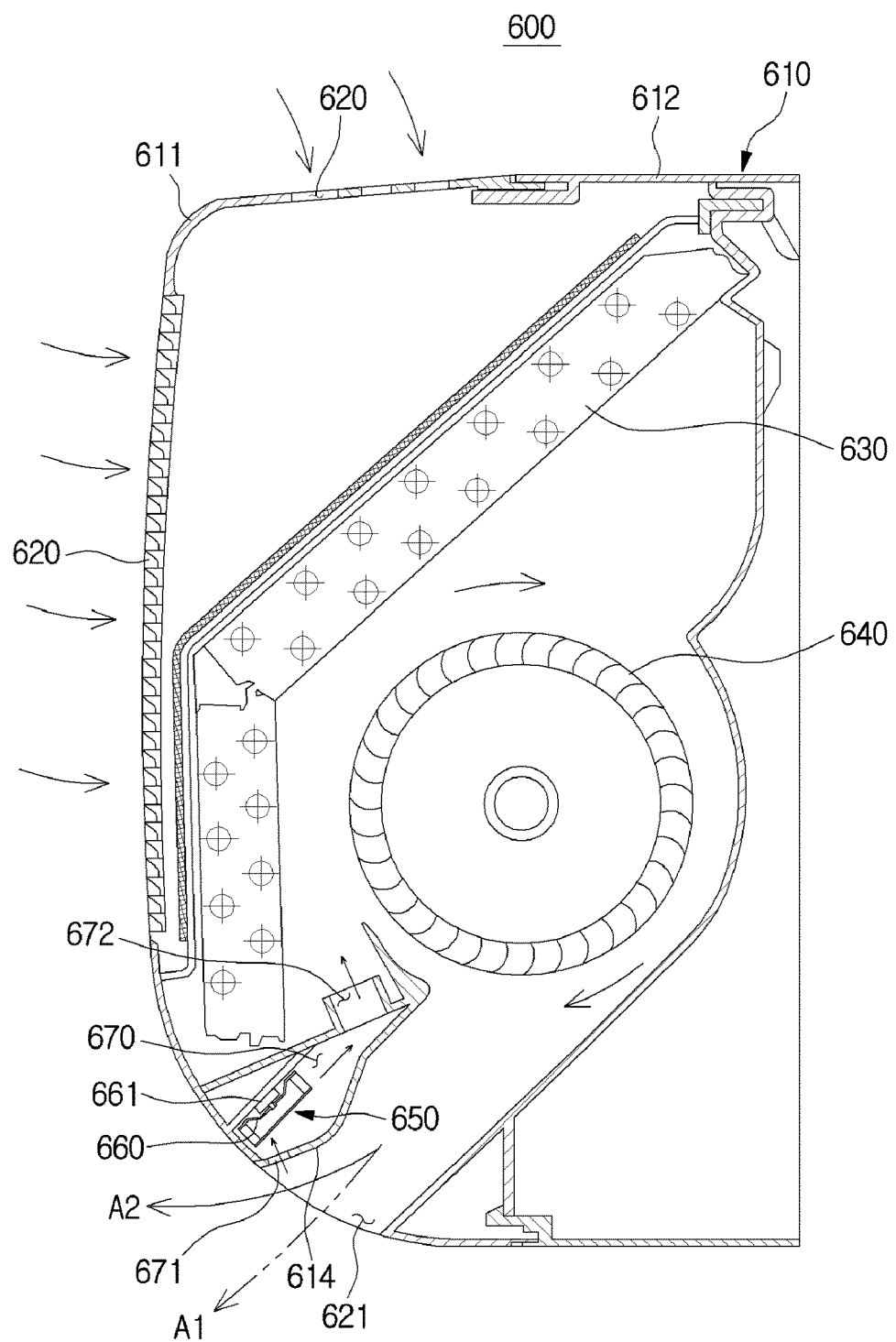
FIG. 12 shows a side cross-sectional view of the AC indoor unit of FIG. 11.

FIG. 11 shows an AC indoor unit, according to an embodiment of the present disclosure. FIG. 12 shows a side cross-sectional view of the AC indoor unit of FIG. 11.

Referring to FIGS. 11 and 12, an AC indoor unit in accordance with an embodiment of the present disclosure will be described. The same features as in the aforementioned embodiments are denoted by the same reference numerals, and the overlapping description will be omitted herein.

An AC indoor unit 600 may be installed on the wall C. The AC indoor unit 600 may include a housing 610 having an inlet 620 and an outlet 621, a heat exchanger 630 arranged inside the housing 610, and a blower fan 640 for circulating air.

The housing 610 may include a rear housing 612 attached to the wall W, and a front housing 611 combined on the front of the rear housing 612.

The inlet 620 for sucking in air may be formed in the upper front of the front housing 611, and the outlet 621 for discharging air may be formed in the lower part of the front housing 611. With this structure, the AC indoor unit 600 may suck in air at its upper front part, cool or heat the air, and discharge the cooled or heated air out of its lower part.

Similar to the aforementioned embodiments, the outlet 621 may have various forms, such as circular, polygonal, curved, etc. The housing 610 may have a Coanda curved part 614 to guide the air discharged through the outlet 621. The Coanda curved part 614 may guide an air flow discharged through the outlet 621 to adhere closely to and flow across the Coanda curved part 614. The blower fan 640 may be a cross-flow fan.

The AC indoor unit 600 further includes an air flow control device 650 for controlling the direction of a discharged air flow by sucking in air around the outlet 621 to change the air pressure.

The air flow control device 650 may include an air flow control fan 660 for producing a sucking force to suck in air around the outlet 621, an air flow control motor 661 for driving the air flow control fan 660, and a guide path 670 for guiding the air sucked in by the air flow control fan 660.

The guide path 70 connects an inflow hole 671 for sucking in air around the outlet 621 to the discharging hole 672 for discharging the air sucked in. The inflow hole 671 may be formed on the Coanda curved part 614 of the housing 610.

Figure 13:
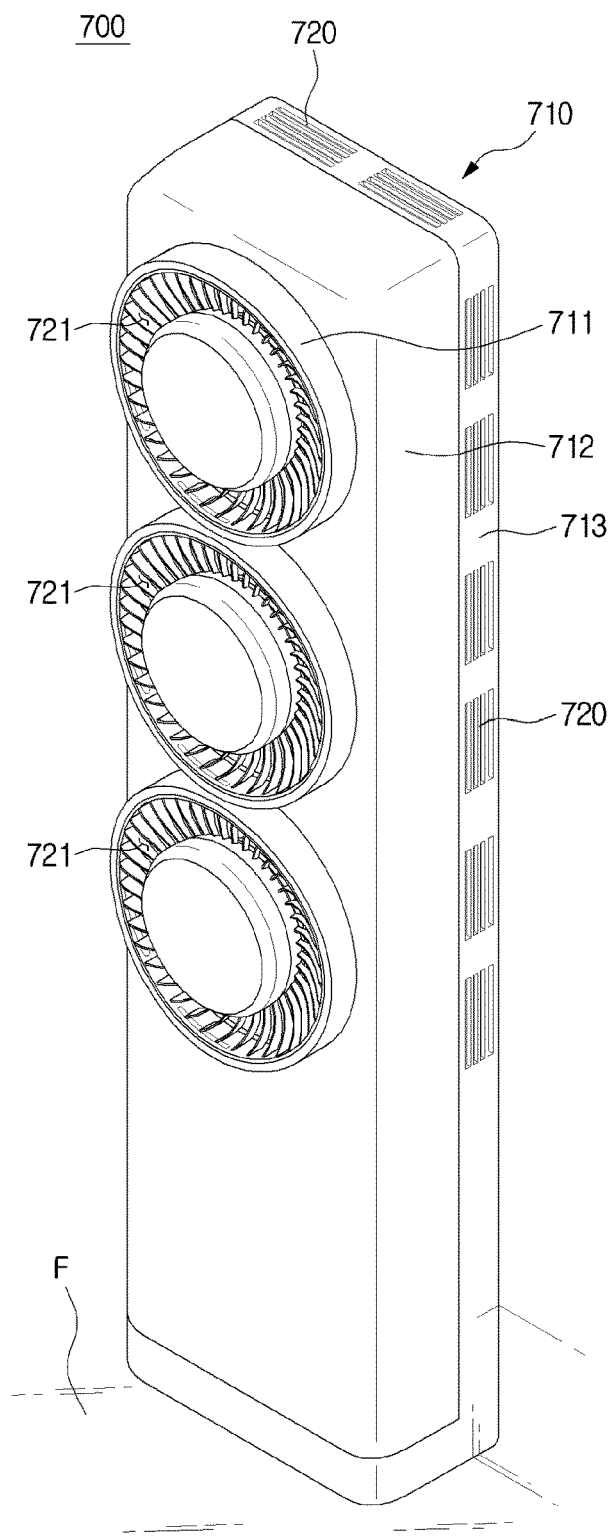
FIG. 13 is a perspective view of an AC indoor unit, according to an embodiment of the present disclosure.
Figure 14:
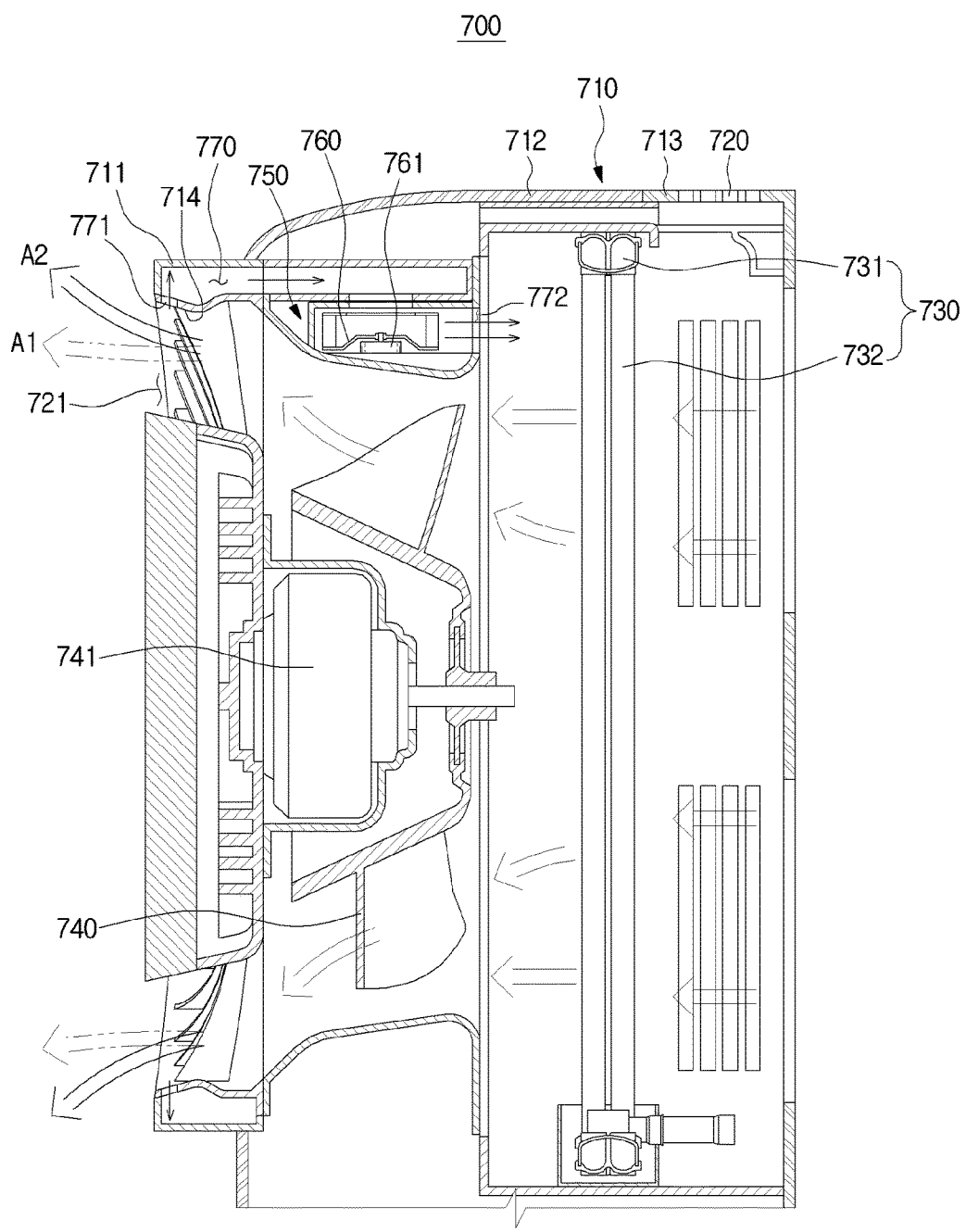
FIG. 14 is a side cross-sectional view illustrating a part of the AC indoor unit of FIG. 13.

FIG. 13 is a perspective view of an AC indoor unit, according to an embodiment of the present disclosure. FIG. 14 is a side cross-sectional view illustrating a part of the AC indoor unit of FIG. 13.

Referring to FIGS. 13 and 14, an AC indoor unit in accordance with an embodiment of the present disclosure will be described. The same features as in the aforementioned embodiments are denoted by the same reference numerals, and the overlapping description will be omitted herein.

An AC indoor unit 700 may be installed to stand on the floor F. The AC indoor unit 700 may include a housing 710 having inlets 720 and outlets 721, heat exchangers 730 arranged inside the housing 710, and blower fans 740 for circulating air.

The housing 710 may include a front housing 711, a middle housing 712, and a rear housing 713. The inlets 720 for sucking in air may be formed on the top, side, and rear faces of the rear housing 713, and the outlets 721 for discharging air may be formed on the front of the front housing 711. With this structure, the indoor unit 700 of the AC may suck in air at the top, sides, and back, cool or heat the air, and discharge the cooled or heated air forward.

Similar to the aforementioned embodiments, the outlet 721 may have various forms, such as circular, polygonal, curved, etc. The housing 710 may have a Coanda curved part 714 to guide the air discharged through the outlet 721. The Coanda curved part 714 may guide an air flow discharged through the outlet 721 to adhere closely to and flow across the Coanda curved part 714. The blower fan 740 may be a cross-flow fan or axial-flow fan.

The AC indoor unit 700 further includes an air flow control device 750 for controlling the direction of a discharged air flow by sucking in air around the outlet 721 to change the air pressure.

The air flow control device 750 may include an air flow control fan 760 for producing a sucking force to suck in air around the outlet 721, an air flow control motor 761 for driving the air flow control fan 760, and a guide path 770 for guiding the air sucked in by the air flow control fan 760.

The guide path 770 connects an inflow hole 771 for sucking in air around the outlet 721 to the discharging hole 772 for discharging the air sucked in. The inflow hole 671 may be formed on the Coanda curved part 714 of the housing 610.

Figure 15:
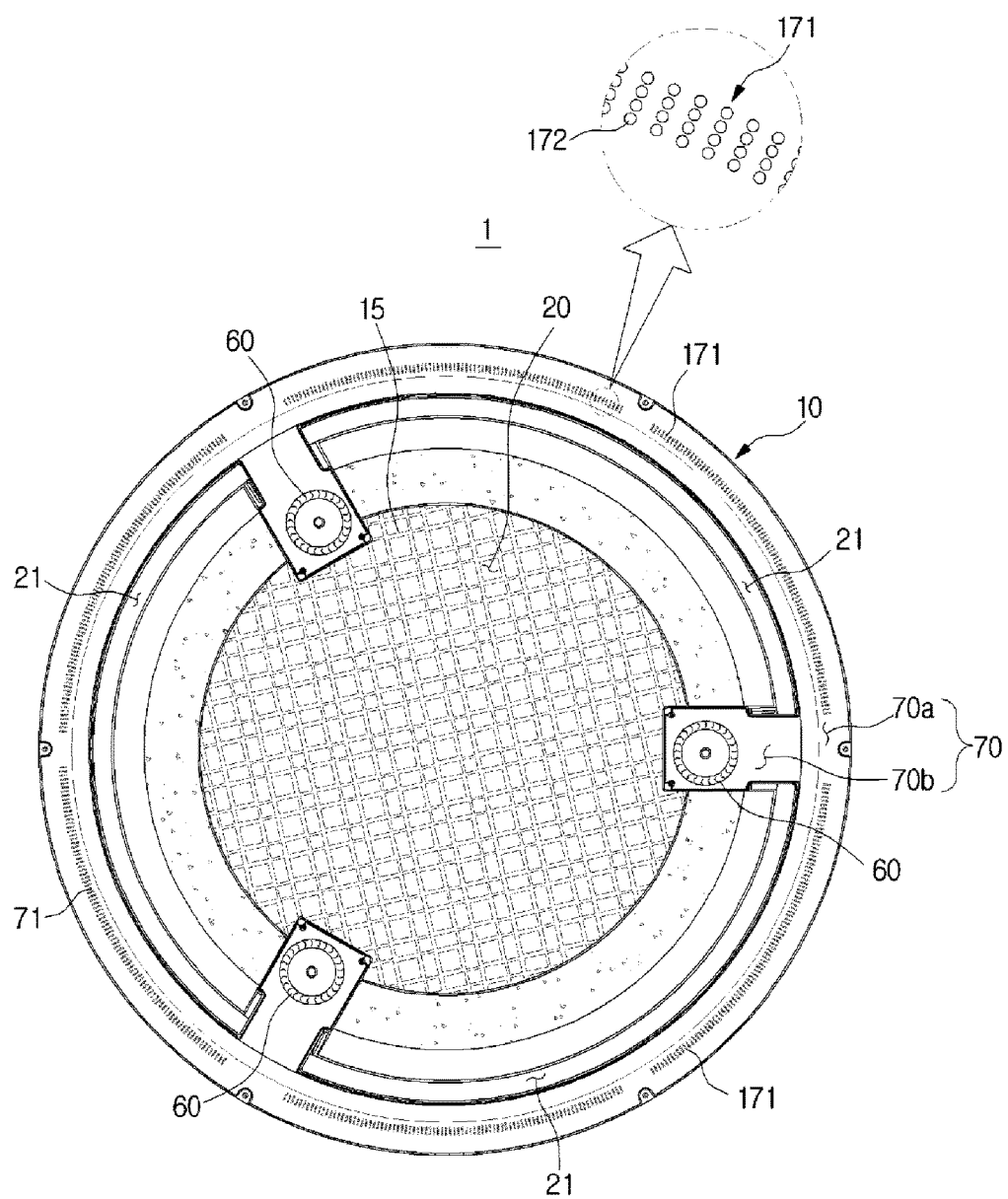
FIG. 15 shows an example of an inflow hole of an air flow control device of the present disclosure, in comparison with that of FIG. 4, the inflow hole being formed of multiple holes.

FIG. 15 shows an example of an inflow hole of an air flow control device of the present disclosure, in comparison with that of FIG. 4, the inflow hole being formed of multiple holes.

Referring to FIG. 15, an inflow hole 171 of the air flow control device may include collections of a plurality of small holes 172. Specifically, the collection of a plurality of small holes 172 may constitute an arc-shaped slit, and a set of at least one of such slits may constitute the inflow hole 171.

The structure of the inflow hole 171 formed of a plurality of small holes 172 may prevent dust, foreign materials, etc., from being sucked in through the inflow hole 171.

Figure 16:
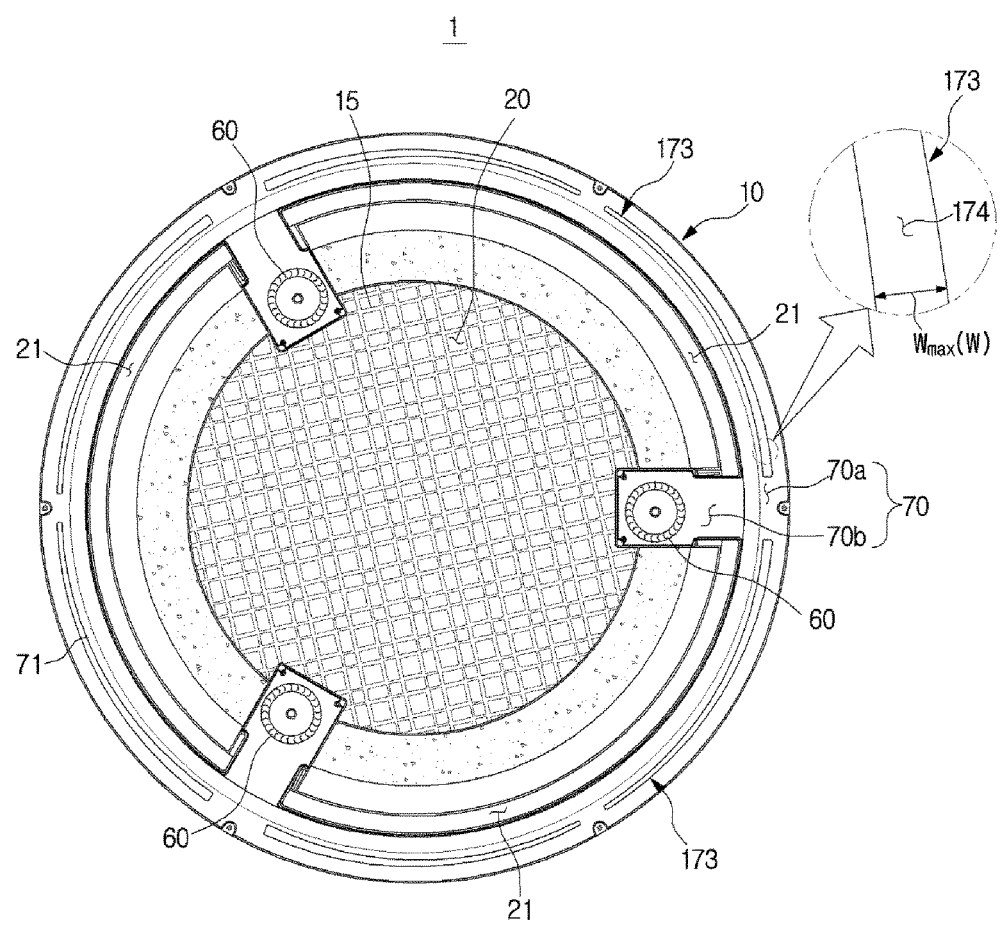
FIGS. 16 and 17 show an example of an inflow hole of an air flow control device of the present disclosure, in comparison with that of FIG. 4, the inflow hole being formed to have a variable width.
Figure 17:
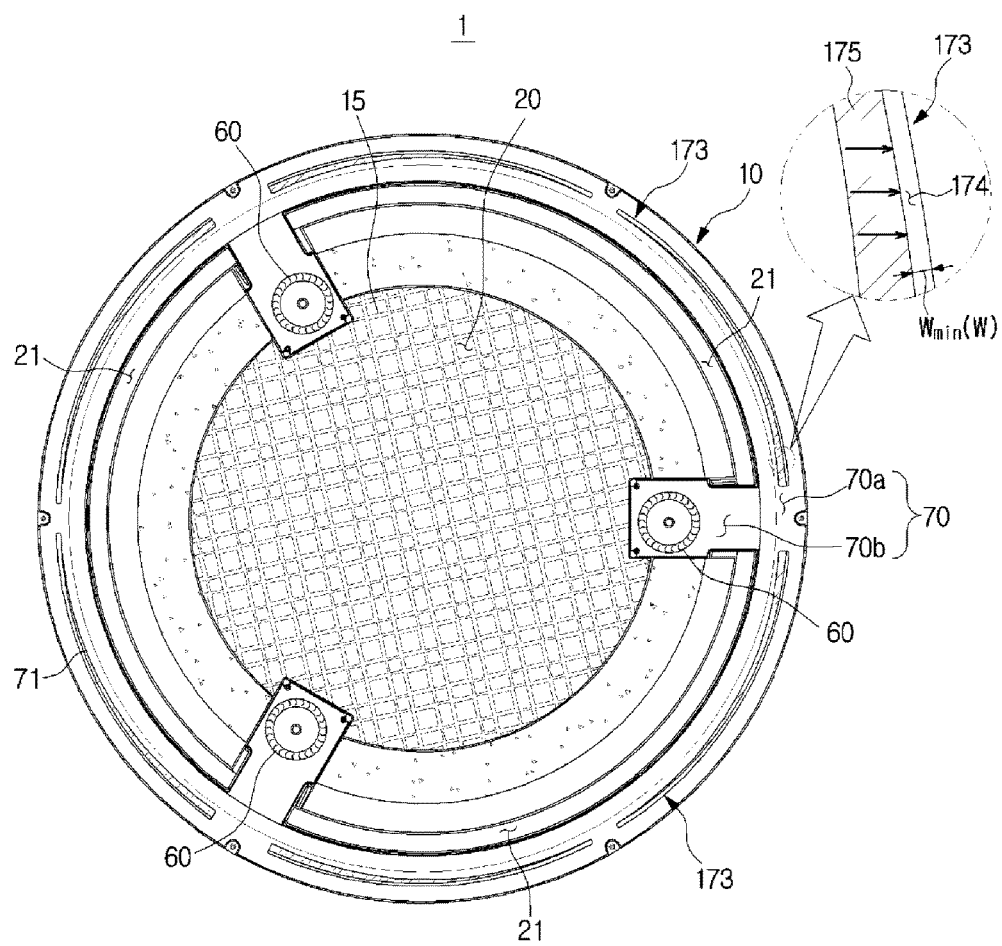

FIGS. 16 and 17 show other examples of an inflow hole of an air flow control device of the present disclosure, in comparison with that of FIG. 4, the inflow hole being formed to have variable width. In FIG. 16, width of the inflow hole becomes relatively wider, and in FIG. 17, width of the inflow hole becomes relatively narrower.

As shown in FIGS. 16 and 17, the inflow hole 173 of the air flow control device may include at least one arc-shaped slit 174, which may be formed to have variable width W. In other words, the opening degree of the slit 174 may be controlled.

For this, the air flow control device may include a scalable fence 175 to control the opening degree of the slit 174. As shown in FIG. 16, when the fence 175 shrinks to a minimum size, the slit 174 may reach a maximum width Wmax, and as shown in FIG. 17, when the fence 175 expands to a maximum size, the slit 174 may reach a minimum width Wmin.

With the structure to control the opening degree of the inflow hole 173, an amount of sucking air through the inflow hole 173 may be controlled, and accordingly, the direction of a discharged air flow may be controlled.

Figure 18:
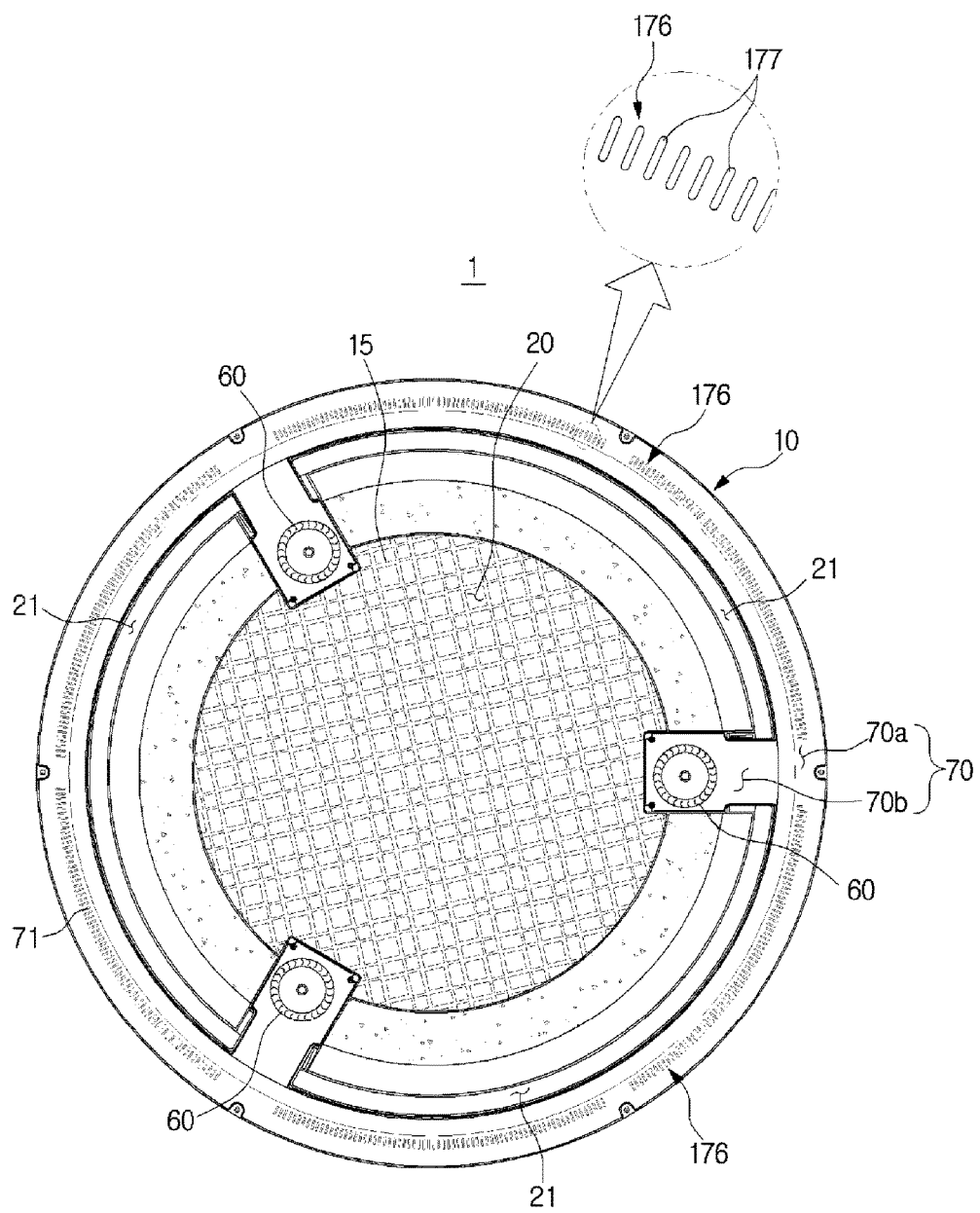
FIG. 18 shows an example of an inflow hole of an air flow control device of the present disclosure, in comparison with that of FIG. 4, the inflow hole being formed of multiple slits that extend in the radial direction.

FIG. 18 shows an example of an inflow hole of an air flow control device of the present disclosure, in comparison with that of FIG. 4, the inflow hole being formed of multiple slits that extend in the radial direction.

Referring to FIG. 18, the inflow hole 176 of the air flow control device may be formed of a plurality of slits 177 that are formed to extend in the radial direction. The plurality of slits 177 may be arranged in the circumferential direction to be separated from one another with a predetermined gap.

This structure may reduce resistance in sucking in air from around the outlet 21, thereby reducing the power required to suck in air, i.e., the number of turns of a fan.

Figure 19:
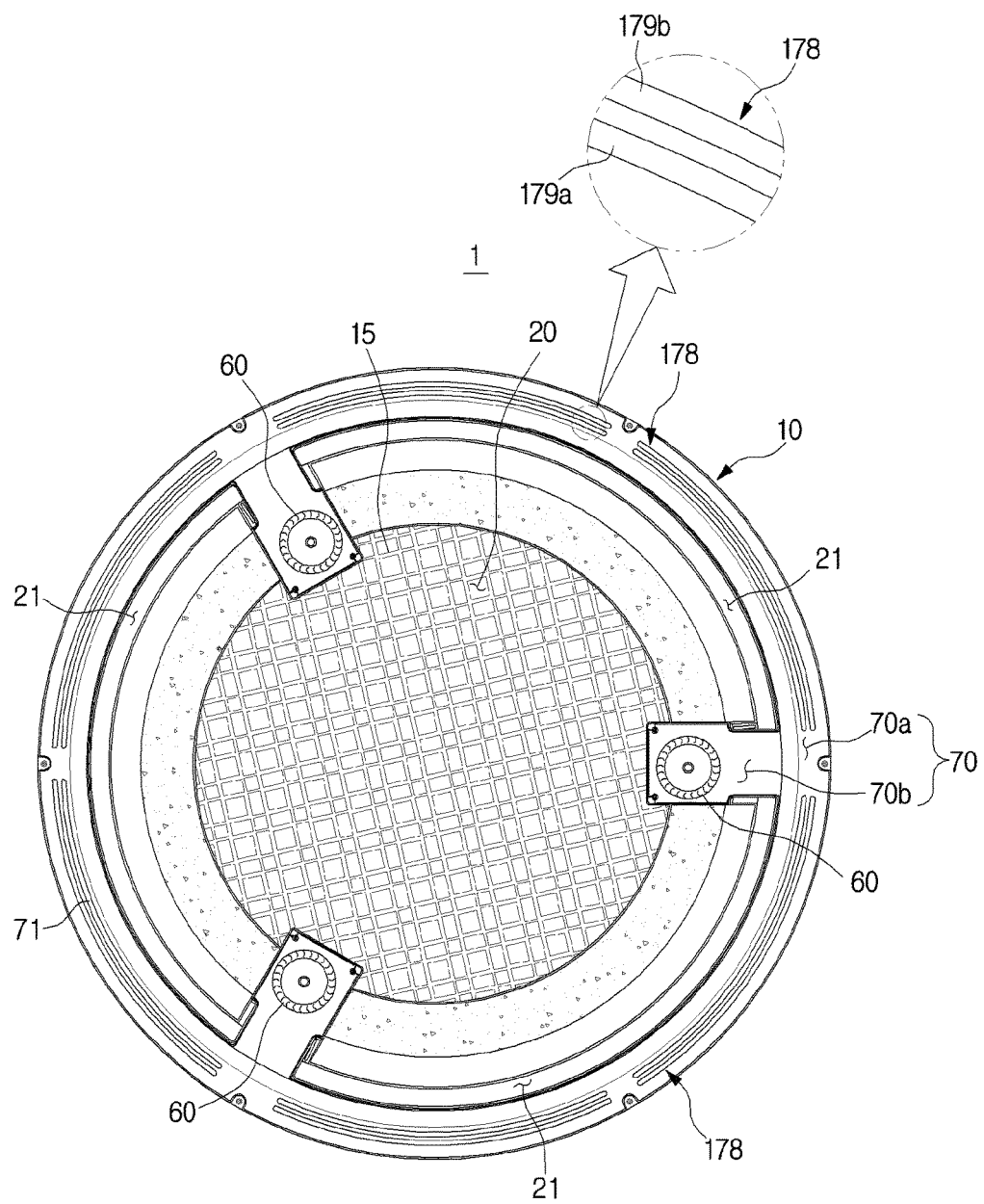
FIG. 19 shows an example of an inflow hole of an air flow control device of the present disclosure, in comparison with that of FIG. 4, the inflow hole being formed of multi-slits.

FIG. 19 shows an example of an inflow hole of an air flow control device of the present disclosure, in comparison with that of FIG. 4, the inflow hole being formed of multi-slits.

As shown in FIG. 19, an inflow hole 178 of an air flow control device may be formed of a plurality of arc-shaped multi-slits.

Each multi-slit may include an inner slit 179a located on the relatively inner side in the radial direction and an outer slit 179b located on the relatively outer side in the radial direction. The inner slit 179a and the outer slit 179b may be separated with a predetermined gap.

This structure may help precisely or reliably control the amount of sucking air.

The inner slit 179a and the outer slit 179b may or may not have the same width. Alternatively, the multi-slit may be formed of three or more slits.

As such, the multi-slit may be designed to have a different number of slits, different width, different separation gap, etc., as necessary.

Figure 20:
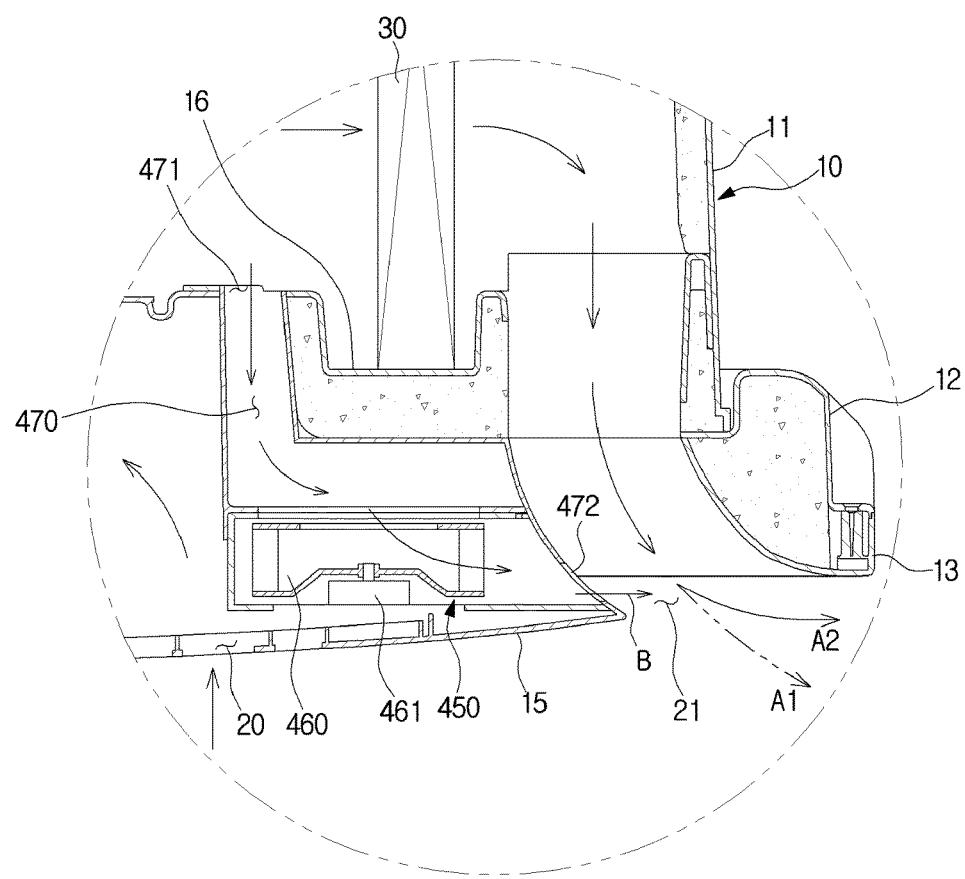
FIG. 20 is a cross-sectional view illustrating a key part of an AC indoor unit according to an embodiment of the present disclosure, in comparison with that of FIG. 7.

FIG. 20 is a cross-sectional view illustrating a key part of an AC indoor unit according to an embodiment of the present disclosure, in comparison with that of FIG. 7.

Referring to FIG. 20, an AC indoor unit in accordance with an embodiment of the present disclosure will be described. The same features as in the aforementioned embodiments are denoted by the same reference numerals, and the overlapping description will be omitted herein.

Unlike the aforementioned embodiments, an air flow control device 450 may control the direction of a discharged air flow by blowing air around the outlet 21 to change the pressure. Specifically, unlike the aforementioned embodiments in which the air flow control device controls the direction of a discharged air flow by producing negative pressure around the outlet 21, the air flow control device 450 in accordance with the embodiment may control the direction of a discharged air flow by producing positive pressure around the outlet 21.

The air flow control device 450 may control an amount of blowing air around the outlet 21. In other words, the air flow control device 450 may control the direction of a discharged air flow by controlling an amount of blowing air around the outlet 21.

Controlling the direction of a discharged air flow herein refers to controlling an angle of discharging air flow. In other words, it refers to controlling whether to converge or widely spread the discharged air flow.

In blowing air around the outlet 21, the air flow control device 450 may blow air from a side of a direction in which the discharged air flow flows.

Specifically, as shown in FIG. 20, given that a direction in which the discharged air flow flows when the air flow control device 450 is not activated is denoted as direction A1, the air flow control device 450, when activated, may change the direction for the discharged air flow to flow to direction A2 by blowing (B) air to a side of the direction A1.

The air flow control device 450 may blow air from the inner side in the radial direction of the outlet 21 (or from under the discharged air flow). That is, while the discharged air flow relatively converges when the air flow control device 450 is not activated, the discharged air flow may be relatively widely spread outward in the radial direction when the air flow control device 450 is activated.

The air flow control device 450 may include an air flow control fan 460 for producing a blowing force to blow air around the outlet 21, an air flow control motor 461 for driving the air flow control fan 460, and a guide path 470 for guiding the air flowing by the air flow control fan 460.

The guide path 470 connects a duct 472 for blowing air to around the outlet 21 to an inflow hole 471 for sucking in air.

Figure 21:
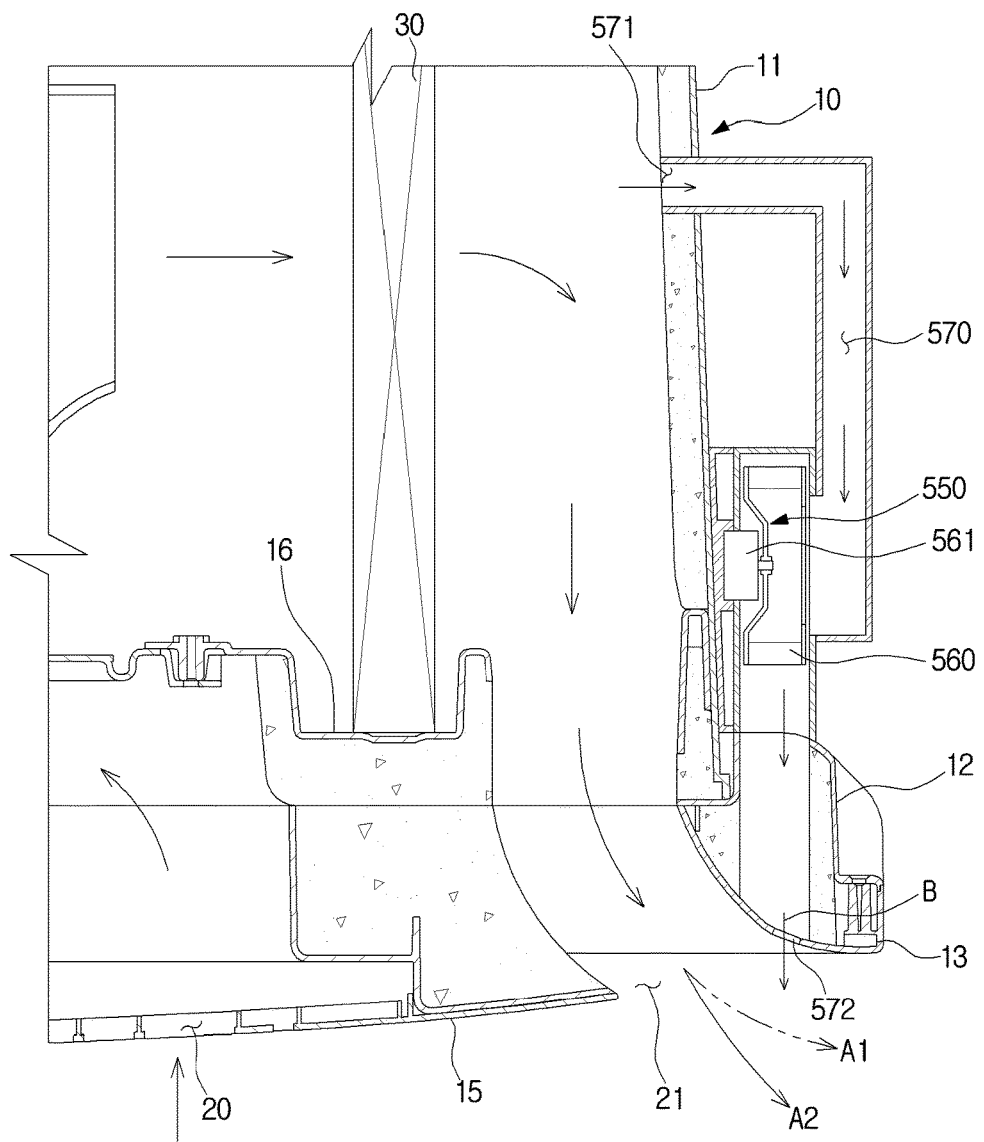
FIG. 21 is a cross-sectional view illustrating a key part of an AC indoor unit according to an embodiment of the present disclosure, in comparison with that of FIG. 20.

FIG. 21 is a cross-sectional view illustrating a key part of an AC indoor unit according to an embodiment of the present disclosure, in comparison with that of FIG. 20.

Referring to FIG. 21, an AC indoor unit in accordance with an embodiment of the present disclosure will be described. The same features as in the aforementioned embodiments are denoted by the same reference numerals, and the overlapping description will be omitted herein.

Similar to the previous embodiment, an air flow control device 550 may control the direction of a discharged air flow by blowing air around the outlet 21 to change the pressure. However, unlike the previous embodiment, the air flow control device 550 may blow air from the outer side in the radial direction of the outlet 21 (or from above the discharged air flow).

That is, while the discharged air flow is relatively widely spread when the air flow control device 550 is not activated, the discharged air flow may relatively converge inward in the radial direction when the air flow control device 550 is activated.

The air flow control device 550 may include an air flow control fan 560 for producing a blowing force to blow air around the outlet 21, an air flow control motor 561 for driving the air flow control fan 560, and a guide path 570 for guiding the air flowing by the air flow control fan 560. The guide path 570 connects a duct 572 for blowing air to around the outlet 21 to an inflow hole 571 for sucking in air.

Figure 22:
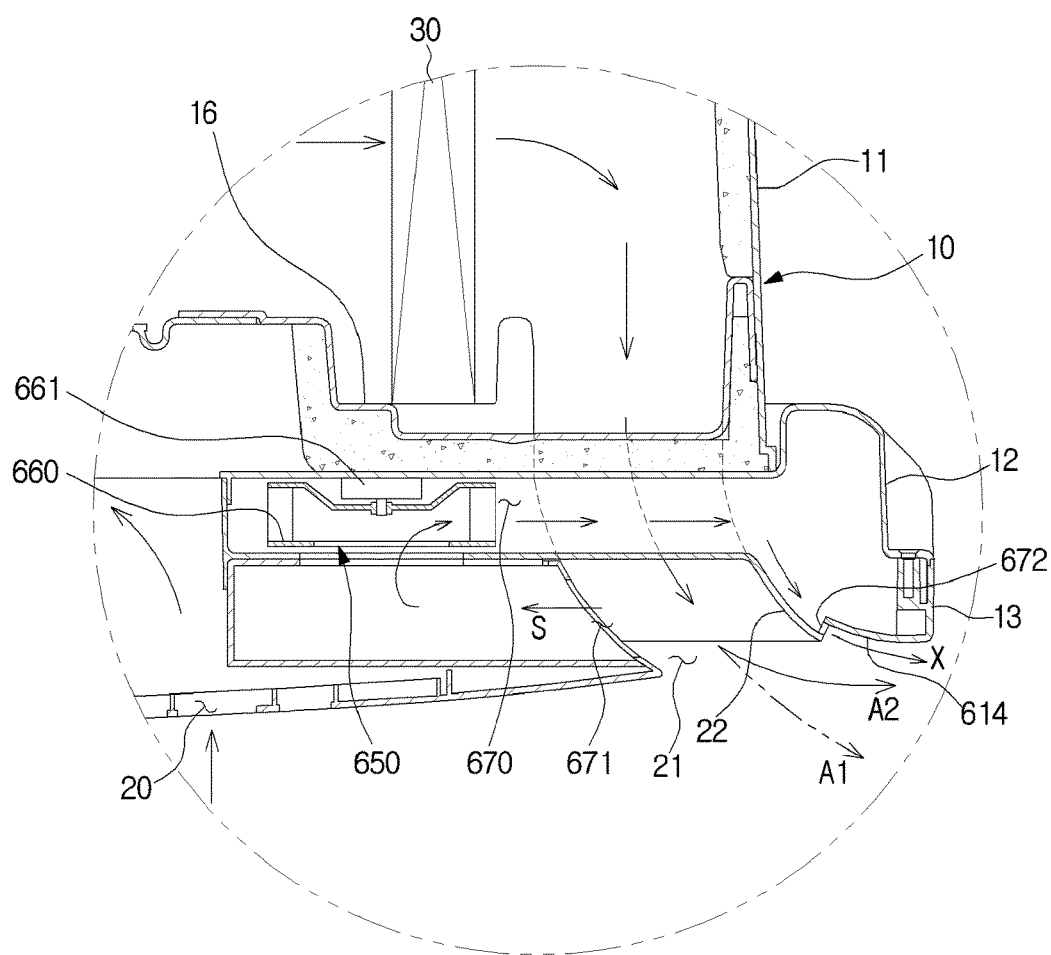
FIG. 22 is a cross-sectional view illustrating a key part of an AC indoor unit according to an embodiment of the present disclosure, in comparison with that of FIG. 20.

FIG. 22 is a cross-sectional view illustrating a key part of an AC indoor unit according to an embodiment of the present disclosure, in comparison with that of FIG. 20.

Referring to FIG. 22, an AC indoor unit in accordance with an embodiment of the present disclosure will be described. The same features as in the aforementioned embodiments are denoted by the same reference numerals, and the overlapping description will be omitted herein.

An air flow control device 650 may control the direction of a discharged air flow by blowing air to around the outlet 21 to change the pressure. However, unlike the embodiments of FIGS. 20 and 21 where the air flow control device controls the discharged air flow by pushing the discharged air flow, the air flow control device 650 may control the discharged air flow by pulling in the discharged air flow.

For this, a Coanda curved part 614 is formed around the outlet 21, and the air flow control device 650 may discharge an auxiliary air flow X in the direction tangential to the Coanda curved part 614.

The Coanda curved part 614 may guide the auxiliary air flow X discharged through the discharging hole 672 to adhere closely to and flow across the surface of the Coanda curved part 614 according to the Coanda effect. The Coanda curved part 614 may be formed integrally with the housing 10, e.g., the bottom housing 13.

The Coanda curved part 614 may have a form, which is approximately convex toward the outlet 21. Accordingly, the velocity of the auxiliary air flow X flowing across the Coanda curved part 614 may increase, and the pressure may decrease. Thus, the main air flow discharged out of the outlet 21 is pulled toward the auxiliary air flow X to change its direction from A1 to A2.

The direction of the auxiliary air flow X discharged through the discharging hole 672 may be tangential to the Coanda curved part 614 while approximately corresponding to the direction of the main air flow.

The guide path 670 for guiding the auxiliary air flow X connects the inflow hole 671 for sucking in air to the discharging hole 672 for discharging the air sucked in. When a path to connect the inlet 20 and the outlet 21 is called a main path, the guide path 70 may be said to be formed by being branched from the main path.

The discharging port 672 is formed near the Coanda curved part 614 such that the auxiliary air flow X is discharged in the direction tangential to the Coanda curved part 614. Specifically, the discharging hole 672 may be formed between the inner circumferential face 22 of the outlet 21 and the Coanda curved part 614.

The air flow control device 650 may blow the auxiliary air X from the outer side in the radial direction of the outlet 21 (or from above the main air flow). That is, while the main discharged air flow relatively converges when the air flow control device 650 is not activated, the main discharged air flow may be relatively widely spread when the air flow control device 650 is activated.

The air flow control device 650 may further include an air flow control fan 660 for blowing air to generate the auxiliary air flow X, and an air flow control motor 661 for driving the air flow control fan 660. The air flow control fan 660 is arranged separately from the main blower fan 40, and there may be multiple air flow control fans as necessary.

To increase the force of the auxiliary air flow X drawing in the main air flow, the air flow control device 650 may increase the velocity of the auxiliary air flow X. In other words, the faster the velocity of the auxiliary air flow X, the greater the pressure reduction, which may increase the force of drawing in the main current. The velocity of the auxiliary air flow X may be faster than at least that of the main air flow.

The inflow hole 671 of the guide path 670 may be formed around the outlet 21. Accordingly, the air flow control device 650 may generate the auxiliary air flow X by sucking in air around the outlet 21.

Figure 23:
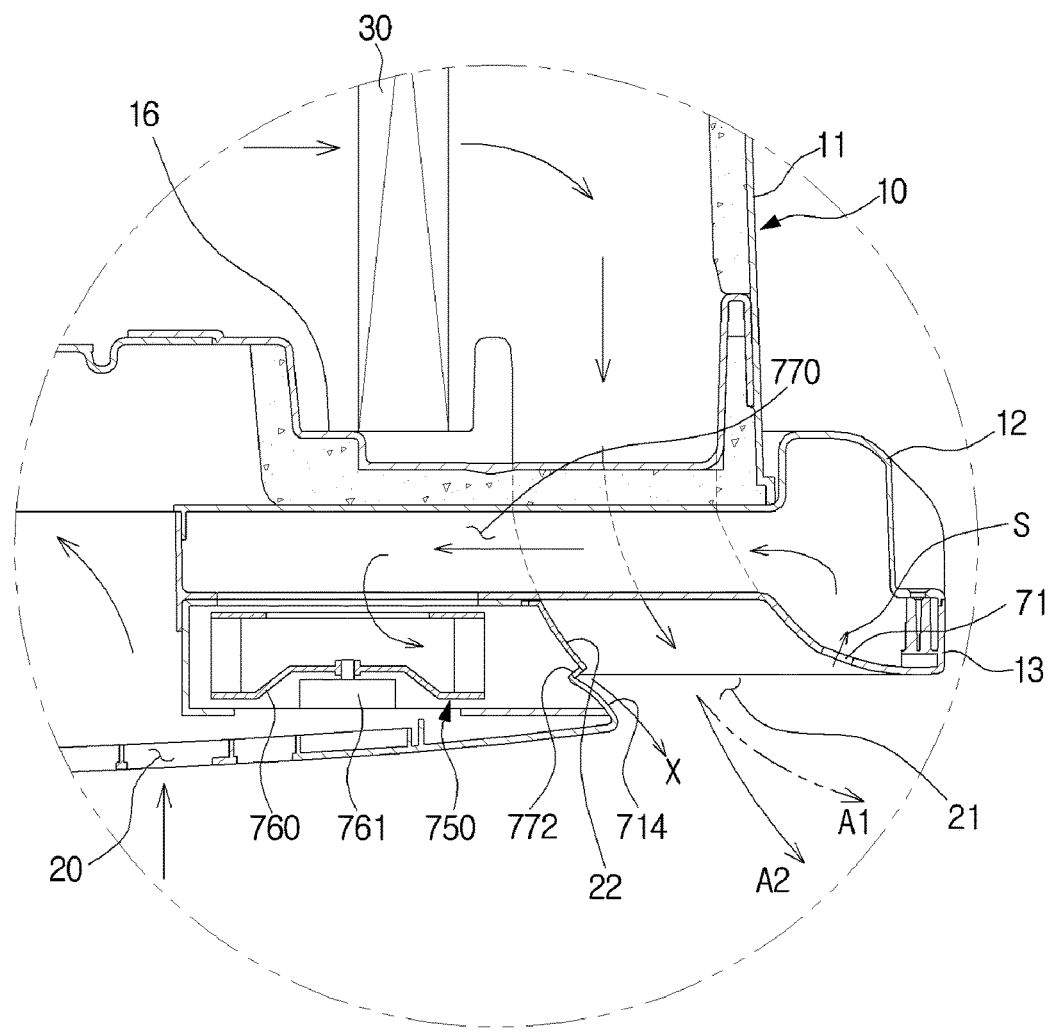
FIG. 23 is a cross-sectional view illustrating a key part of an AC indoor unit according to an embodiment of the present disclosure, in comparison with that of FIG. 20.

FIG. 23 is a cross-sectional view illustrating a key part of an AC indoor unit according to an embodiment of the present disclosure, in comparison with that of FIG. 20.

Referring to FIG. 23, an AC indoor unit in accordance with an embodiment of the present disclosure will be described. The same features as in the aforementioned embodiments are denoted by the same reference numerals, and the overlapping description will be omitted herein.

Like the air flow control device 650 of FIG. 22, an air flow control device 750 in the embodiment may control a discharged air flow by blowing air to around the outlet 21 to draw in the discharged air flow.

However, unlike the air flow control device 650, the air flow control device 750 may blow the auxiliary air flow X from the inner side in the radial direction of the outlet 21 (or from under the main air flow). That is, while the main discharged air flow is relatively widely spread when the air flow control device 750 is not activated, the main discharged air flow may relatively converge when the air flow control device 750 is activated.

A Coanda curved part 714 is formed around the outlet 21, and the air flow control device 750 may discharge the auxiliary air flow X in the direction tangential to the Coanda curved part 714.

The Coanda curved part 714 may guide the auxiliary air flow X discharged through the discharging hole 772 to adhere closely to and flow across the surface of the Coanda curved part 714 according to the Coanda effect.

The Coanda curved part 714 may have a form, which is approximately convex toward the outlet 21. Accordingly, the velocity of the auxiliary air flow X flowing across the Coanda curved part 714 may increase, and the pressure may decrease. Thus, the main air flow discharged out of the outlet 21 is pulled in toward the auxiliary air flow X to change its direction from A1 to A2.

The direction of the auxiliary air flow X discharged through the discharging hole 772 may be tangential to the Coanda curved part 714 while approximately corresponding to the direction of the main air flow.

The guide path 770 for guiding the auxiliary air flow X connects the inflow hole 771 for sucking in air to the discharging hole 772 for discharging the air sucked in.

The discharging port 772 is formed near the Coanda curved part 714 such that the auxiliary air flow X is discharged in the direction tangential to the Coanda curved part 714. Specifically, the discharging hole 772 may be formed between the inner circumferential face 22 of the outlet 21 and the Coanda curved part 714.

The air flow control device 750 may further include an air flow control fan 760 for blowing air to generate the auxiliary air flow X, and an air flow control motor 761 for driving the air flow control fan 760. The air flow control fan 760 is arranged separately from the main blower fan 40, and there may be multiple air flow control fans as necessary.

Figure 24:
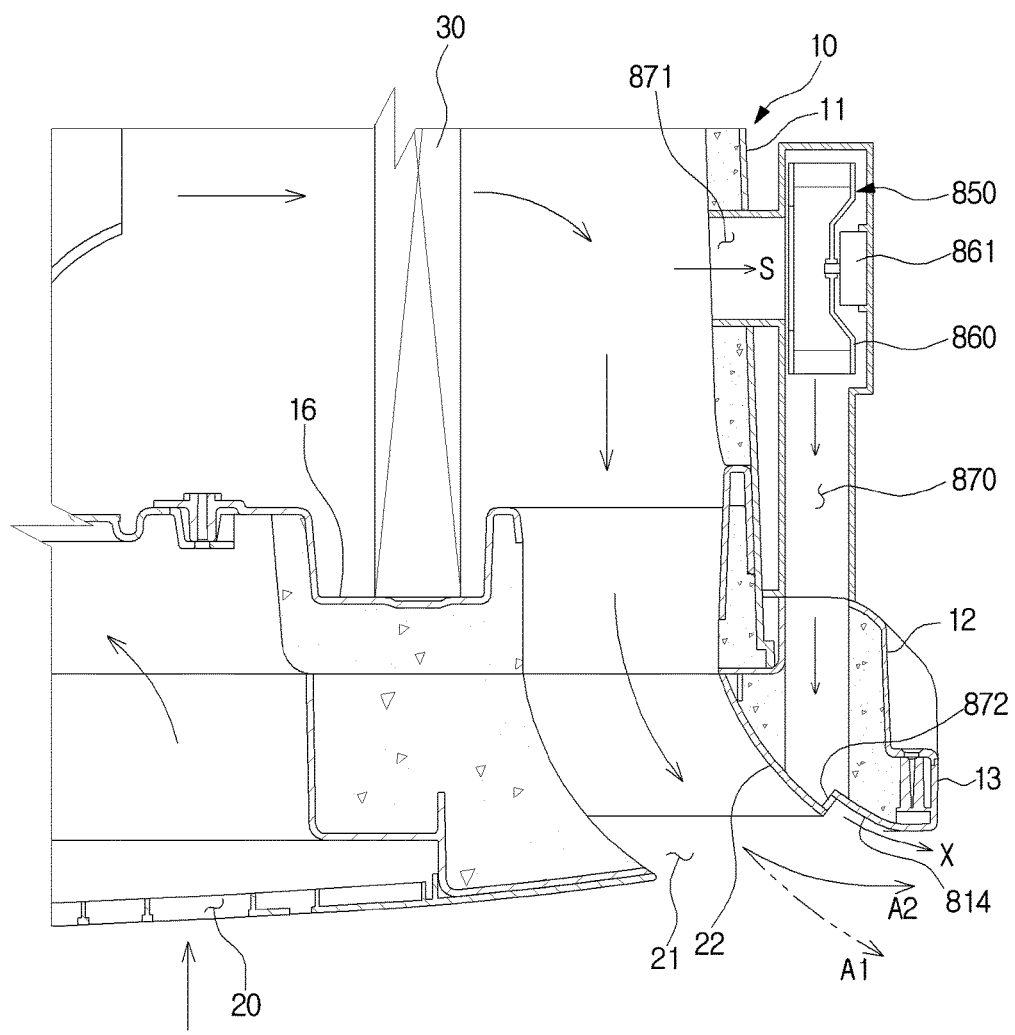
FIG. 24 is a cross-sectional view illustrating a key part of an AC indoor unit according to an embodiment of the present disclosure, in comparison with that of FIG. 21.

FIG. 24 is a cross-sectional view illustrating a key part of an AC indoor unit according to an embodiment of the present disclosure, in comparison with that of FIG. 21.

Referring to FIG. 24, an AC indoor unit in accordance with an embodiment of the present disclosure will be described. The same features as in the aforementioned embodiments are denoted by the same reference numerals, and the overlapping description will be omitted herein.

Like the air flow control device 650 of FIG. 22, an air flow control device 850 in the embodiment may control a discharged air flow by blowing air to around the outlet 21 to pull in the discharged air flow.

However, unlike the air flow control device 650 of FIG. 22, the air flow control device 850 may produce the auxiliary air flow X not by sucking in air from around the outlet 21, but by sucking in air from inside of the housing 10.

Specifically, part of air cooled by the heat exchanger 30 may be discharged out of a discharging hole 872 through a guide path 870 to produce the auxiliary air flow X while the remaining part of the air may be discharged out of the outlet 21 to produce the main air flow.

A Coanda curved part 814 is formed around the outlet 21, and the air flow control device 850 may discharge the auxiliary air flow X in the direction tangential to the Coanda curved part 814.

The guide path 870 for guiding the auxiliary air flow X connects the inflow hole 871 for sucking in air to the discharging hole 872 for discharging the air sucked in.

The air flow control device 850 may further include an air flow control fan 860 for blowing air to generate the auxiliary air flow X, and an air flow control motor 861 for driving the air flow control fan 860.

Figure 25:
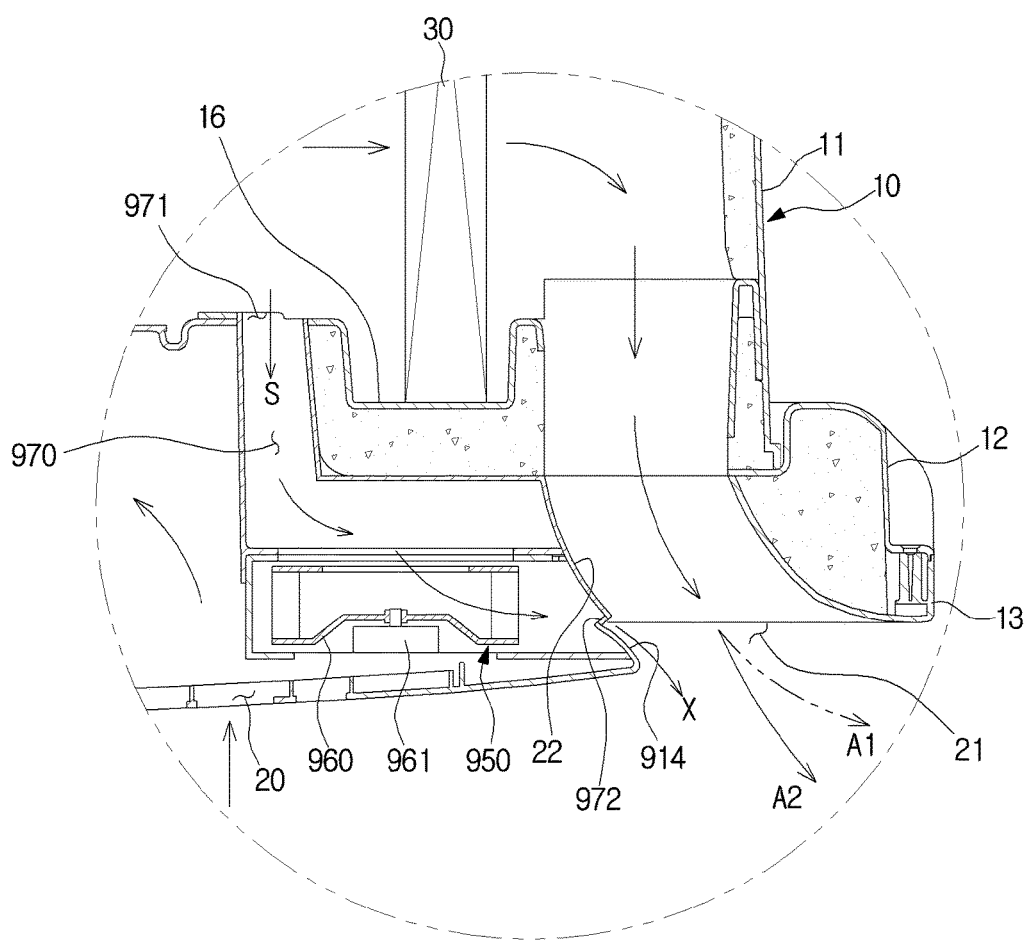
FIG. 25 is a cross-sectional view illustrating a key part of an AC indoor unit according to an embodiment of the present disclosure, in comparison with that of FIG. 21.

FIG. 25 is a cross-sectional view illustrating a key part of an AC indoor unit according to an embodiment of the present disclosure, in comparison with that of FIG. 21.

Referring to FIG. 25, an AC indoor unit in accordance with an embodiment of the present disclosure will be described. The same features as in the aforementioned embodiments are denoted by the same reference numerals, and the overlapping description will be omitted herein.

Like the air flow control device 750 of FIG. 23, an air flow control device 950 in the embodiment may control a discharged air flow by blowing air to around the outlet 21 to pull in the discharged air flow.

However, unlike the air flow control device 750 of FIG. 23, the air flow control device 950 may produce the auxiliary air flow X not by sucking in air from around the outlet 21, but by sucking in air from inside of the housing 10.

Specifically, part of air in the upper reaches of the heat exchanger 30 may be discharged out of a discharging hole 972 through a guide path 970 to produce the auxiliary air flow X while the remaining part of the air may be discharged out of the outlet 21 to produce the main air flow.

A Coanda curved part 914 is formed around the outlet 21, and the air flow control device 950 may discharge the auxiliary air flow X in the direction tangential to the Coanda curved part 914.

The guide path 970 that guides the auxiliary air flow X connects the inflow hole 971 for sucking in air to the discharging hole 972 for discharging the air sucked in.

The air flow control device 950 may further include an air flow control fan 960 for blowing air to generate the auxiliary air flow X, and an air flow control motor 961 for driving the air flow control fan 960.

Figure 26:
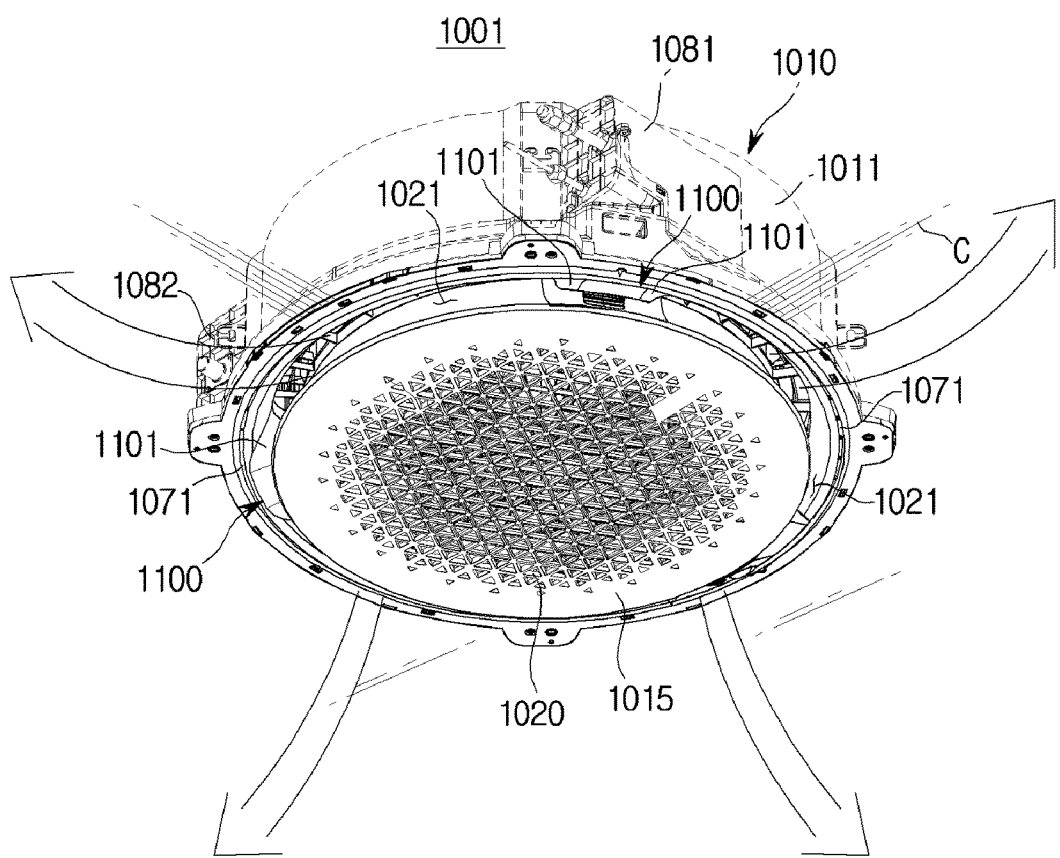
FIG. 26 is a perspective view of an AC, according to an embodiment of the present disclosure.
Figure 27:
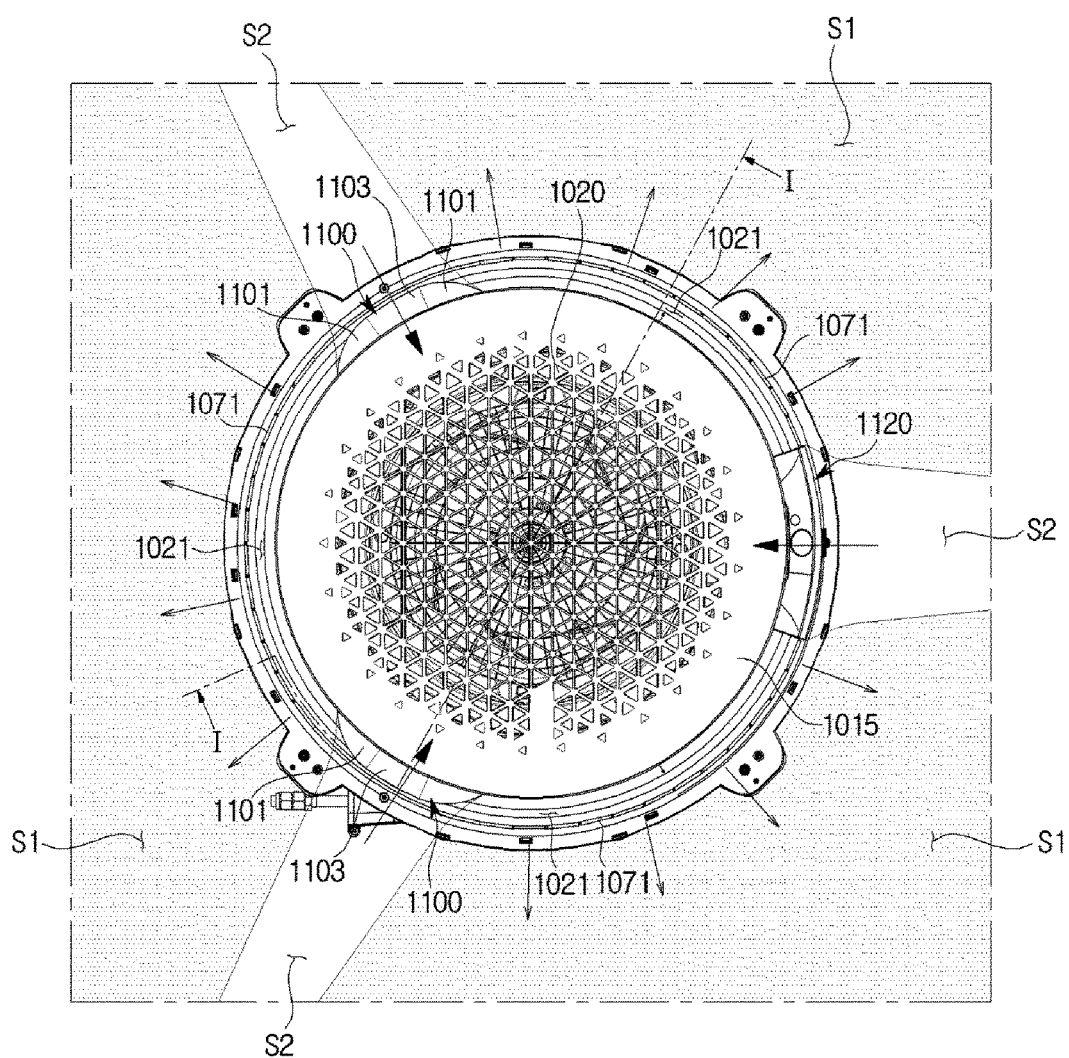
FIG. 27 is a bottom view of the AC shown in FIG. 26.
Figure 28:
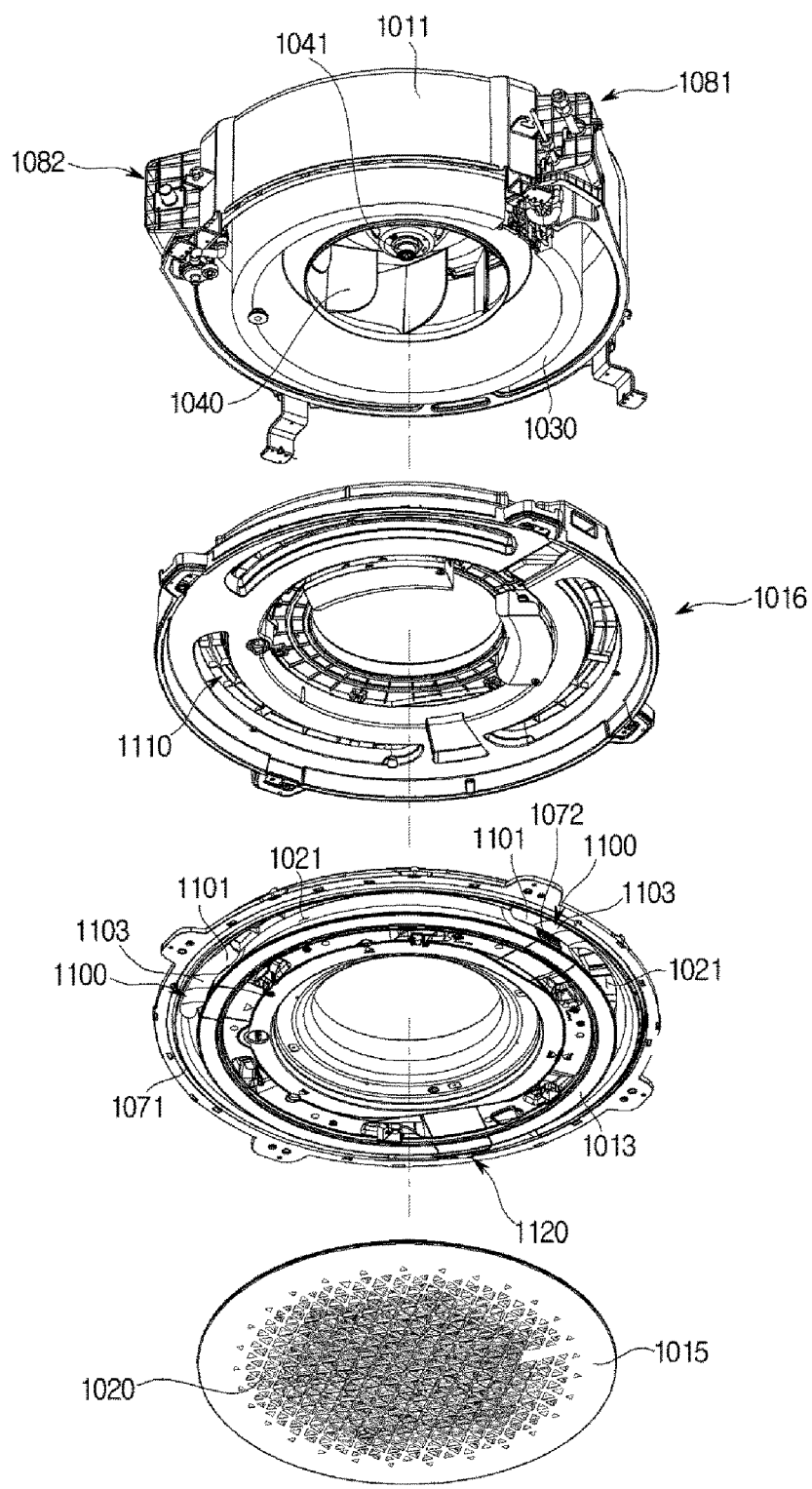
FIG. 28 is an exploded view of the AC shown in FIG. 26.
Figure 29:
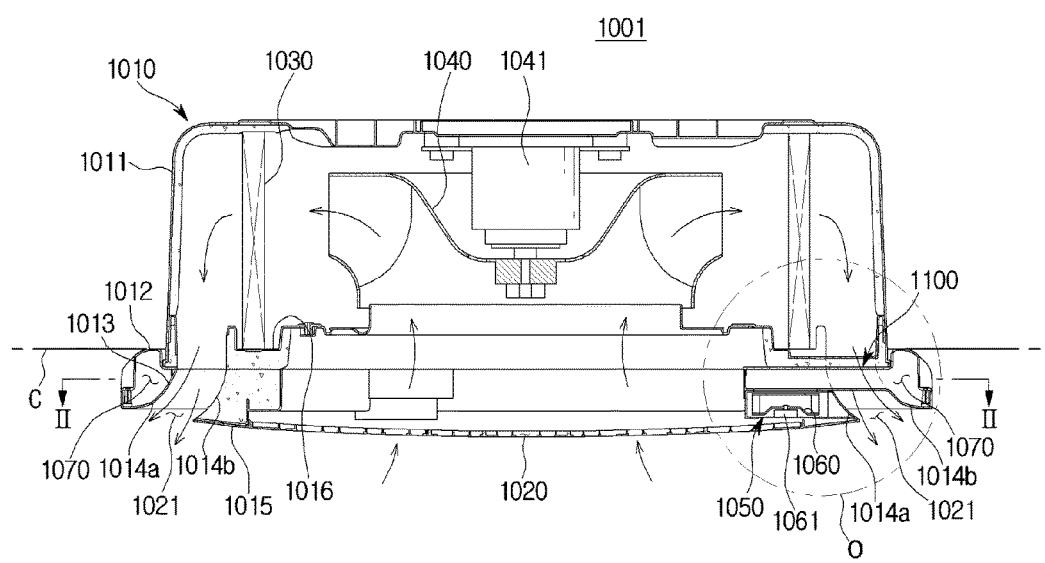
FIG. 29 is a side cross-section cut along the line from I to I as shown in FIG. 27.

FIG. 26 is a perspective view of an AC, according to an embodiment of the present disclosure. FIG. 27 is a bottom view of the AC shown in FIG. 26. FIG. 28 is an exploded view of the AC shown in FIG. 26. FIG. 29 is a side cross-sectional view cut along the line I-I indicated in FIG. 27.

Referring to FIGS. 26 to 29, an AC 1001 in accordance with an embodiment of the present disclosure will now be described.

The AC 1001 may be installed on the ceiling C. At least a part of the AC 1001 may be built into the ceiling C.

The AC 1001 may include a housing 1010 having an inlet 1020 and an outlet 1021, a heat exchanger 1030 arranged inside the housing 1010, and a blower fan 1040 for circulating air.

Viewed from the vertical direction, the housing 1010 may have an approximately circular shape. The housing 1010 may include a top housing 1011 arranged inside the ceiling C, a middle housing 1012 combined on the bottom of the top housing 1011, and a bottom housing 1013 combined on the bottom of the middle housing 1012.

The inlet 1020 for sucking in air may be formed in the center of the bottom housing 1013, and the outlet 1021 for discharging air may be formed around and outside the inlet 1020. Viewed from the vertical direction, the outlet 1021 may have an approximately circular shape.

With this structure, the AC 1001 may suck in air at the bottom, cool or heat the air, and discharge the cooled or heated air back out of the bottom.

The bottom housing 1013 may have a first guide plane 1014a and a second guide plane 1014b, which form the outlet 1021. The first guide plane 1014a may be arranged close to the inlet 1020 and the second guide plane 1014b may be arranged farther away from the inlet 1020 than the first guide plane 1014a. The first and/or second guide planes 1014a, 1014b may include a Coanda curved part to guide the air discharged through the outlet 1021. The Coanda curved part may guide an air flow discharged through the outlet 1021 to adhere closely to and flow across the Coanda curved part.

A grill 1015 may be combined onto the bottom of the bottom housing 1013 to filter out dust from air sucked into the inlet 1020.

A heat exchanger 1030 may be placed inside the housing and located in an air path between the inlet 1020 and the outlet 1021. The heat exchanger 1030 may include a tube (not shown) in which refrigerants circulate, and a header (not shown) connected to an external refrigerant tube to supply or collect refrigerants to or from the tube. The tube may have heat exchange pins to expand a heat radiation area.

Viewed from the vertical direction, the heat exchanger 1030 may have an approximately circular shape. The heat exchanger 1030 may rest on a drain tray 1016 for condensed water generated in the heat exchanger 1030 to be collected in the drain tray 1016.

The blower fan 1040 may be located on inner side in the radial direction of the heat exchanger 1030. The blower fan 1040 may be a centrifugal fan that sucks in air in the axial direction and releases the air in the radial direction. The AC 1001 may include a blower motor 1041 for driving the blower fan 1040.

With this structure, the AC 1001 may suck in air in the room, cool or heat the air, and then release the cooled or heated air back to the room.

The AC 1001 may further include a heat exchange pipe 1081 connected to the heat exchanger 1030, through which refrigerants flow, and a drain pump 1082 for releasing condensate collected in a drain tray 1016. The heat exchange pipe 1081 and drain pump 1082 may be located on the top of a bridge 1100, which will be described later, not to block the inlet. Specifically, the heat exchange pipe 1081 may be safely received in a safe heat exchange pipe receiving part 1016a arranged on the drain tray 1016, and the drain pump 1082 may be safely received in a safe drain pump receiving part 1016b arranged on the drain tray 1016 (see FIG. 33).

Referring to FIG. 27, the AC 1001 may further include bridges 1100 that is located adjacent to the outlet 1021 and that extends as much as a predetermined length in the circumferential direction of the outlet 1021. The bridges 1100 may be separated at predetermined intervals along the circumferential direction, and may be three in number. The bridges 1100 may be arranged to connect the first guide plane 1014a and the second guide plane 1014b.

If air is released in all directions from the outlet 1021 that is in a ring shape, relatively high pressure is produced around the outlet 1021 and relatively low pressure is produced around the inlet 1020. Furthermore, because the air discharged from all the directions of the outlet 1021 forms an air curtain, air to be sucked in through the inlet 1020 may not be supplied to the side of the inlet 1020. Under this situation, the air discharged from the outlet 1021 is sucked back through the inlet 1020, which causes condensation inside the housing 1010 and the loss of discharged air, thereby degrading the effective performance felt by the user.

The bridges 1100 in accordance with an embodiment of the present disclosure are located on the outlet 1021 for blocking the outlet 1021 as much as a predetermined length. Accordingly, the outlet 1021 may be partitioned into a first section S1 from which air is released and a second section S2 from which air is barely released due to the blockage by the bridges 1100. That is, the bridges 1100 may form the second section S2 to supply air to be sucked in through the inlet 1020. Furthermore, the bridges 1100 may promote smooth supply of air into the inlet 1020 by reducing a difference between the low pressure around the inlet 1020 and the high pressure around the outlet 1021.

The bridges 1100 may include a pair of discharging guide planes 1101 which get closer as they are located close to the direction in which the air is released, so as to minimize the second section S2 formed by the bridges 1100. The air being discharged by the discharging guide planes 1101 from the outlet 1021 may spread out from the outlet 1021 because of the discharging guide planes 1101.

Figure 30:
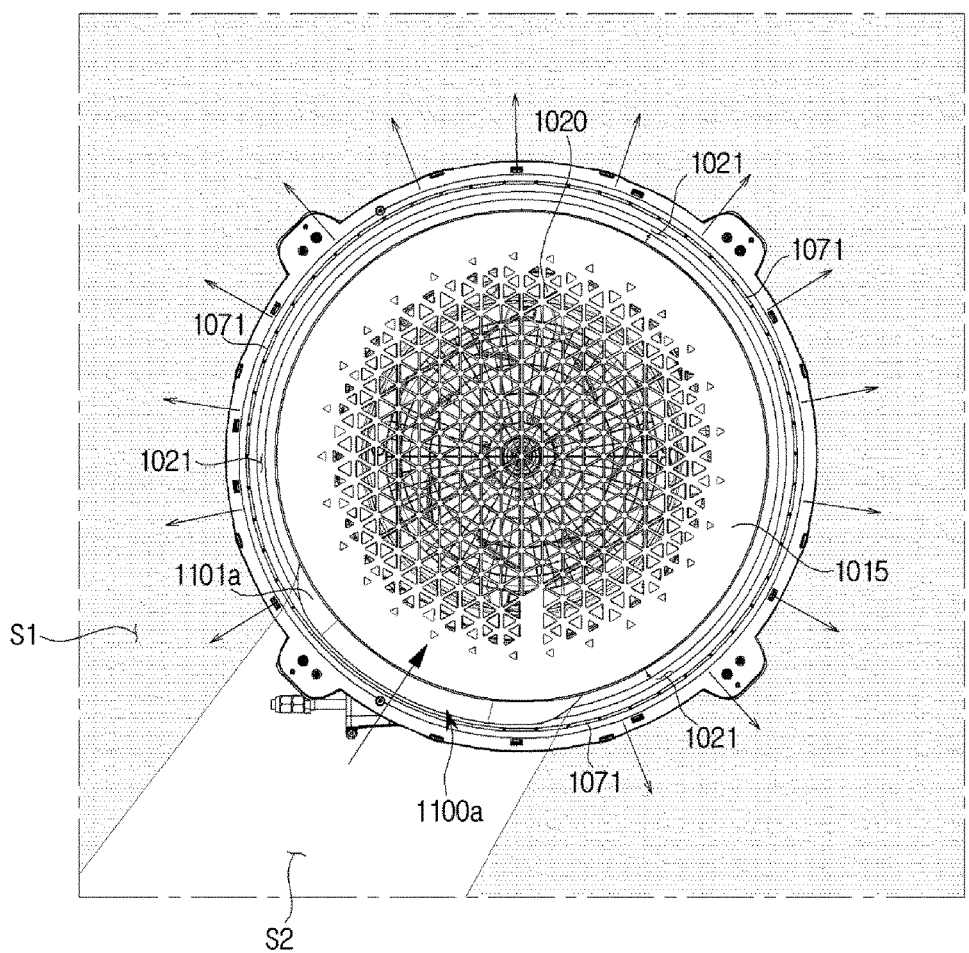
FIG. 30 is an embodiment of the AC of FIG. 26.
Figure 31:
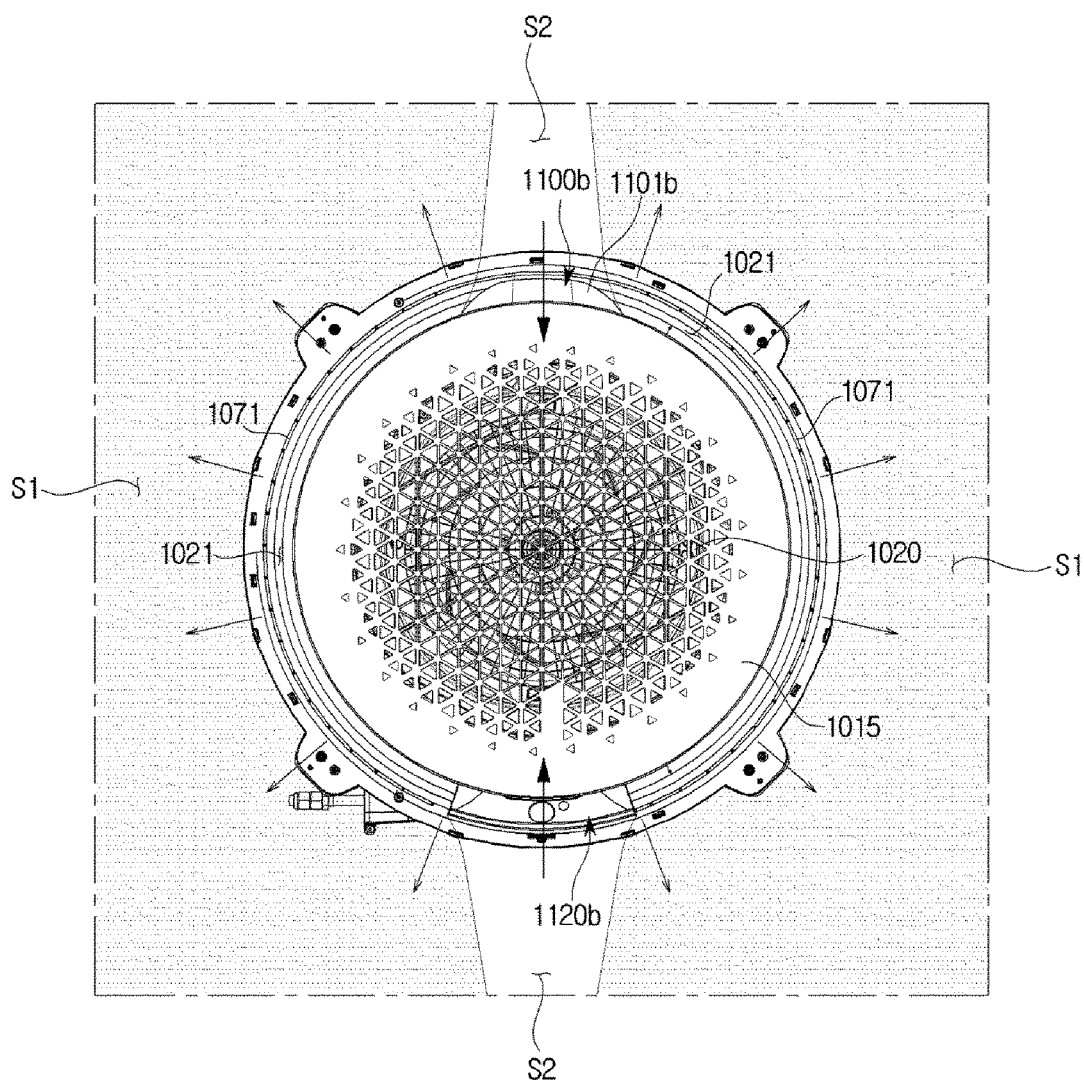
FIG. 31 is an embodiment of the AC of FIG. 26.
Figure 32:
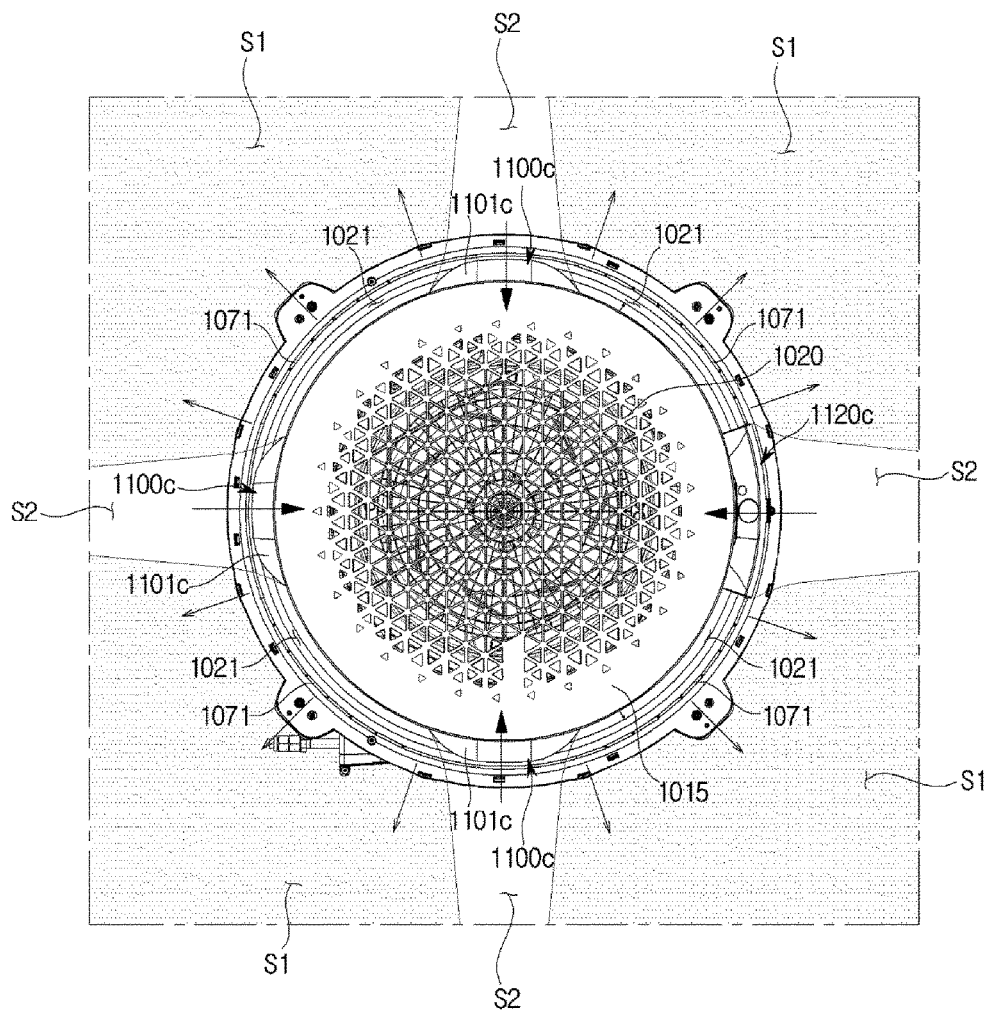
FIG. 32 is an embodiment of the AC of FIG. 26.

Although the AC 1001 is shown in FIG. 27 to have three equidistant bridges 1100, i.e., three bridges 1100 120° apart, it is not limited thereto and there may only be a single bridge 1100a as shown in FIG. 30. Alternatively, there may be two bridges 1100b 180° apart as shown in FIG. 31, or may be four bridges 1100c 90° apart as shown in FIG. 32. The plurality of bridges 1100, 1100b, 1100c may also be arranged along the circumferential direction of the outlet 1021 at different angles to each other. Alternatively, although not shown, there may be five or more bridges arranged. That is, there are no limitations on the number of the bridges.

However, in order to form the second section S2 and promote the smooth supply of air to be sucked in through the inlet 1020, a total sum of lengths of the bridges 1100, 1100a, 1100b, 1100c may be set to 5% or more but 40% or less of the whole circumference length of the outlet. In other words, a ratio of the length of the second section S2 to the sum of the lengths of the first and second sections S1 and S2 may be set to 5% or more but 40% or less.

Furthermore, if there are a plurality of bridges 1100, 1100b, 1100c arranged, a display unit 1120, 1120b, 1120c may be arranged on the bottom of one of the bridges 1100, 1100b, 1100c.

With the bridges 1100, 1100a, 1100b, 1100c, air discharged from the outlet 1021 may not be sucked back into the inlet 1020 but may spread out to cool or heat the room.

Figure 33:
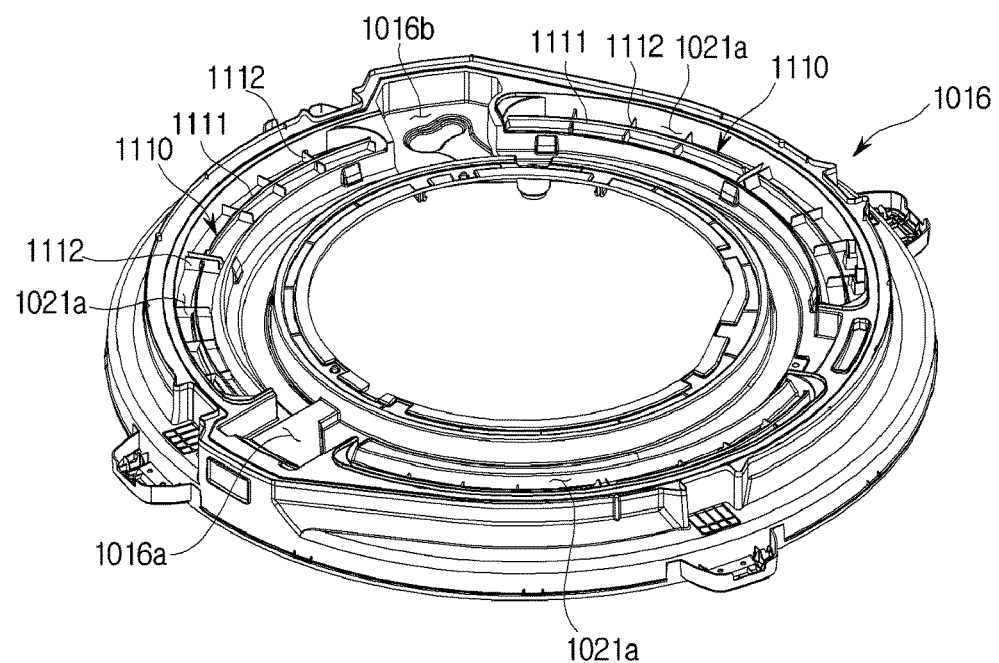
FIG. 33 is a perspective view of a drain tray shown in FIG. 28.

Referring to FIG. 33, the AC may further include a discharging guide rib 1110 arranged in the outlet 1021a and extending vertically along the direction in which the air is discharged. Specifically, the discharging guide rib 1110 may be formed on the drain tray 1016. The drain tray 1016 may include a drain tray outlet 1021a corresponding to the outlet 1021 of the housing 1010, and the discharging guide rib 1110 may be arranged in the drain tray outlet 1021a to decrease the area of the drain tray outlet 1021a, thereby increasing the flow velocity of air being discharged through the drain tray outlet 1021a. The discharging guide rib 1110 may guide the discharged air such that the air discharged from the outlet 1021a may spread out while being discharged. The discharging guide rib 1110 may be arranged to correspond to the first section S1 of the outlet 1021 in which no bridge 1100 is formed.

Furthermore, the discharging guide rib 1110 may be arranged on the drain tray outlet 1021a to reinforce the solidity of the housing 1010.

The discharging guide rib 1110 may include a first discharging guide rib 1111 extending along the circumferential direction of the drain tray outlet 1021a, and a second discharging guide rib 1112 extending along the radial direction of the drain tray outlet 1021a.

With the first discharging guide rib 1111 formed along the circumferential direction of the drain tray outlet 1021a and the second discharging guide rib 1112 formed along the radial direction of the drain tray outlet 1021a, the area of the drain tray outlet 1021a may be reduced, thereby increasing the flow velocity of the air passing through the drain tray outlet 1021. A plurality of the second discharging guide rib 1112 may be formed.

Figure 34:
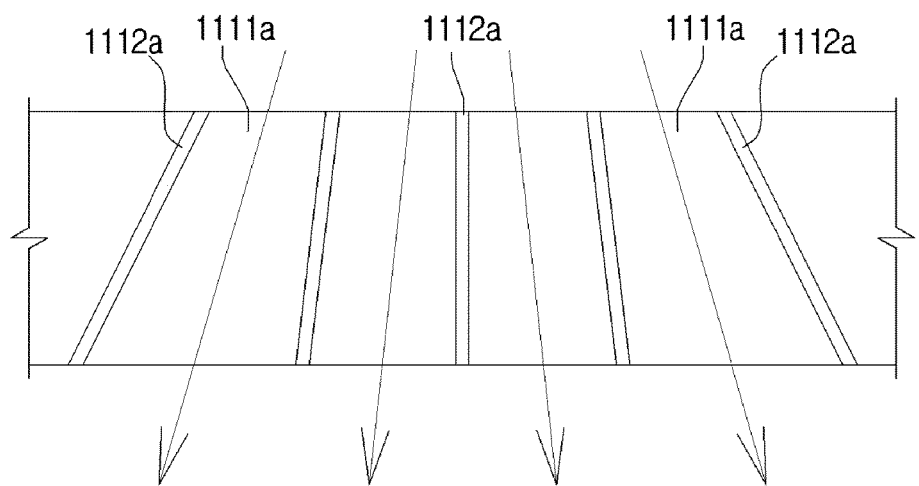
FIG. 34 is an unfolded view of a discharging guide rib shown in FIG. 33.
Figure 35:
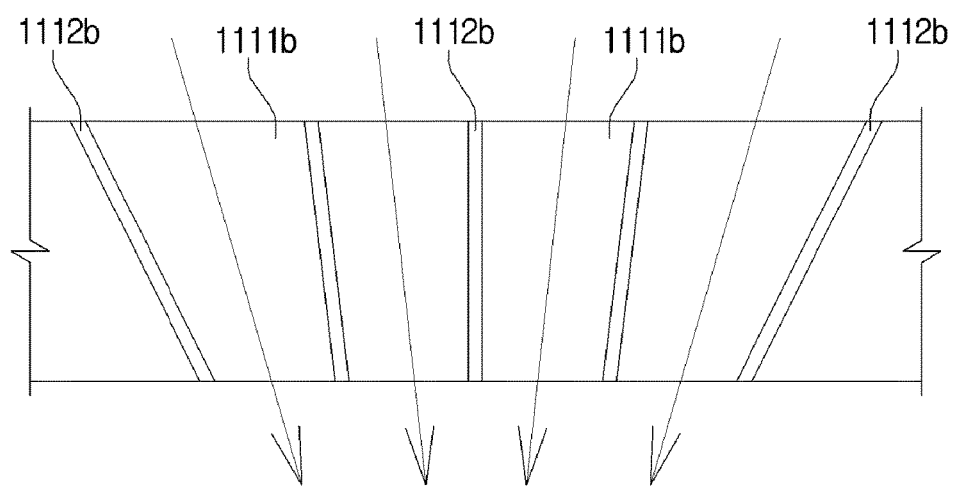
FIG. 35 is an embodiment of the discharging guide rib shown in FIG. 34.

FIGS. 34 and 35 show parts of the widespread discharging guide rib 1110 shown in FIG. 33.

Referring to FIG. 34, the second discharging guide rib 1112a may be inclined downward to the bridge 1100 as it is located closer to the bridge 1100 when viewed in the radial direction of the drain tray outlet 1021a. Specifically, the second discharging guide rib 1112a may be combined with the first discharging guide rib 1111a such that it is inclined in the direction in which the discharged air spreads out as it gets nearer to either ends from the center. Accordingly, the second discharging guide rib 1112a may force the air discharged from the drain tray outlet 1021a to spread out toward the bridge 1100, thereby minimizing the second section S2. That is, it may force air to be discharged in all directions of the AC 1011 if possible.

Referring to FIG. 35, the second discharging guide rib 1112b may be inclined downward to be away from the bridge 1100 as it is located closer to the bridge 1100 when viewed in the radial direction of the drain tray outlet 1021a. Specifically, the second discharging guide rib 1112b may be combined with the first discharging guide rib 1111b to be inclined in the direction in which the discharged air converges as the second discharging guide rib 1112b gets nearer to either ends from the center. Accordingly, the second discharging guide rib 1112b may form a powerful air flow by gathering air discharged from the drain tray outlet 1021a.

Figure 36:
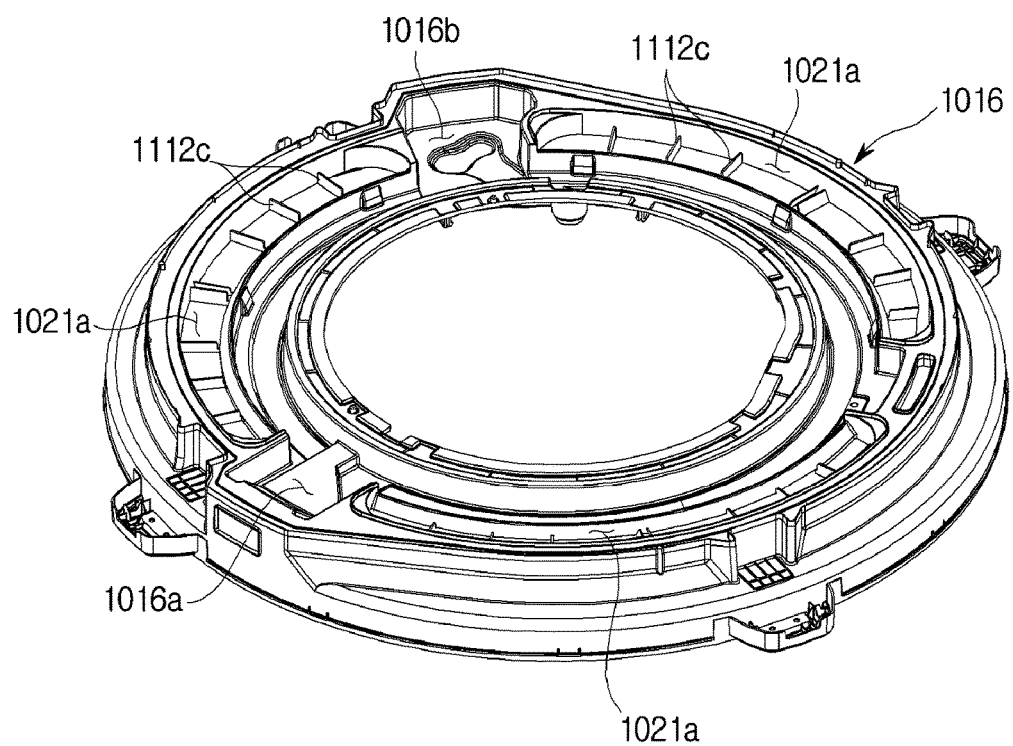
FIG. 36 is an embodiment of the discharging guide rib shown in FIG. 33.

Referring to FIG. 36, the housing 1010 may only include the second discharging guide rib 112c without the first discharging guide rib 1111.

Furthermore, although not shown, the first discharging guide rib 1111 may be arranged to be inclined to be away from the inlet 1020 in the radial direction of the drain tray outlet 1021a, so that the air discharged from the drain tray outlet 1021a may spread out from the inlet 1020 in the radial direction of the drain tray outlet 1021a.

Figure 38:
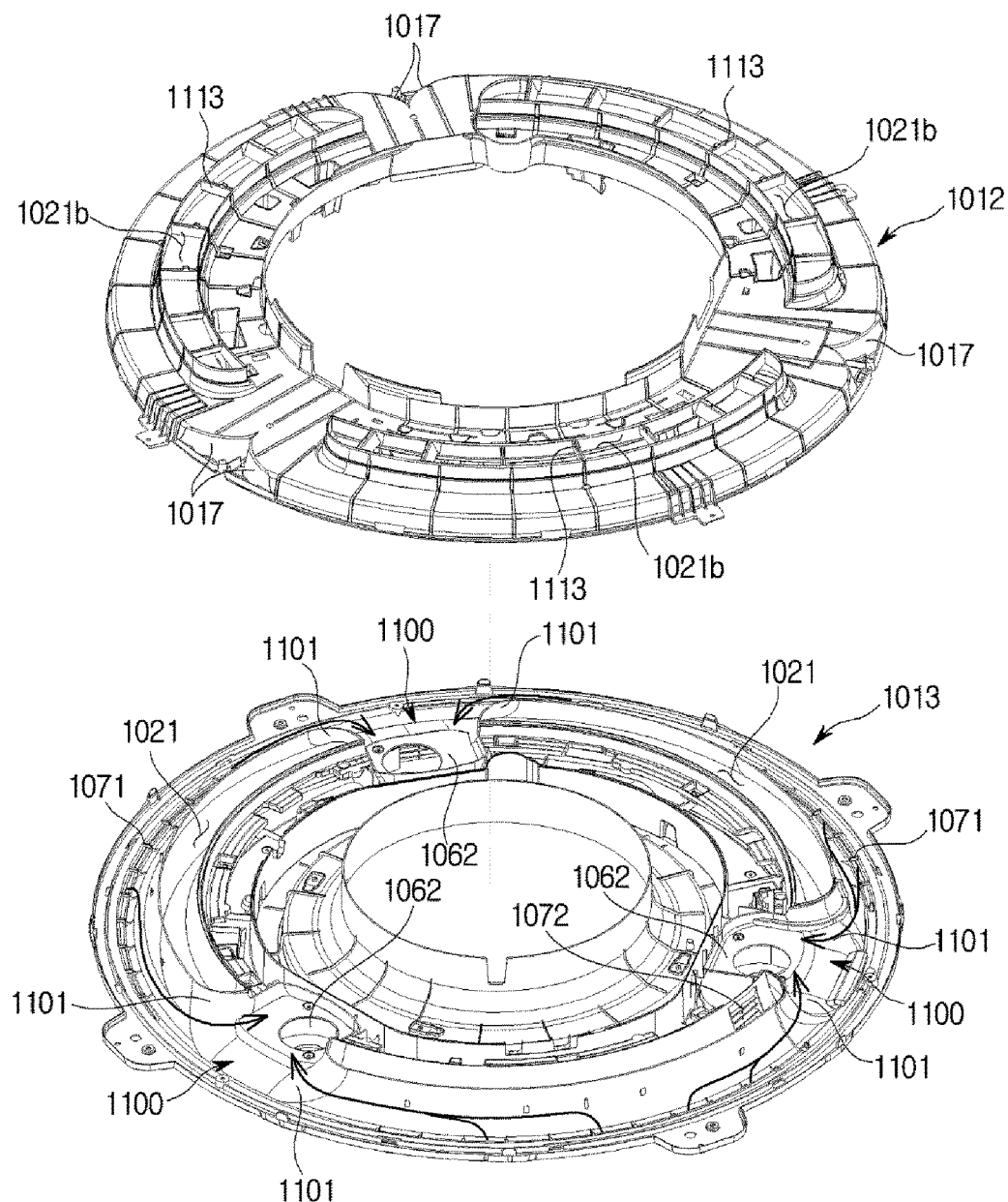
FIG. 38 is a view exploded into the middle housing and bottom housing as shown in FIG. 28.

As shown in FIG. 38, the middle housing 1012 may include a middle housing outlet 1021b corresponding to the outlet 1021 of the bottom housing 1013 and the drain tray outlet 1021a of the drain tray 1016, and in the middle housing outlet 1012b, there may be a housing discharging guide rib 1113 corresponding to the second discharging guide rib 1112 of the drain tray 1016. The housing discharging guide rib 1113 may be arranged on the same plane with the second discharging guide rib 1112 and combined with the second discharging guide rib 1112.

Figure 37:
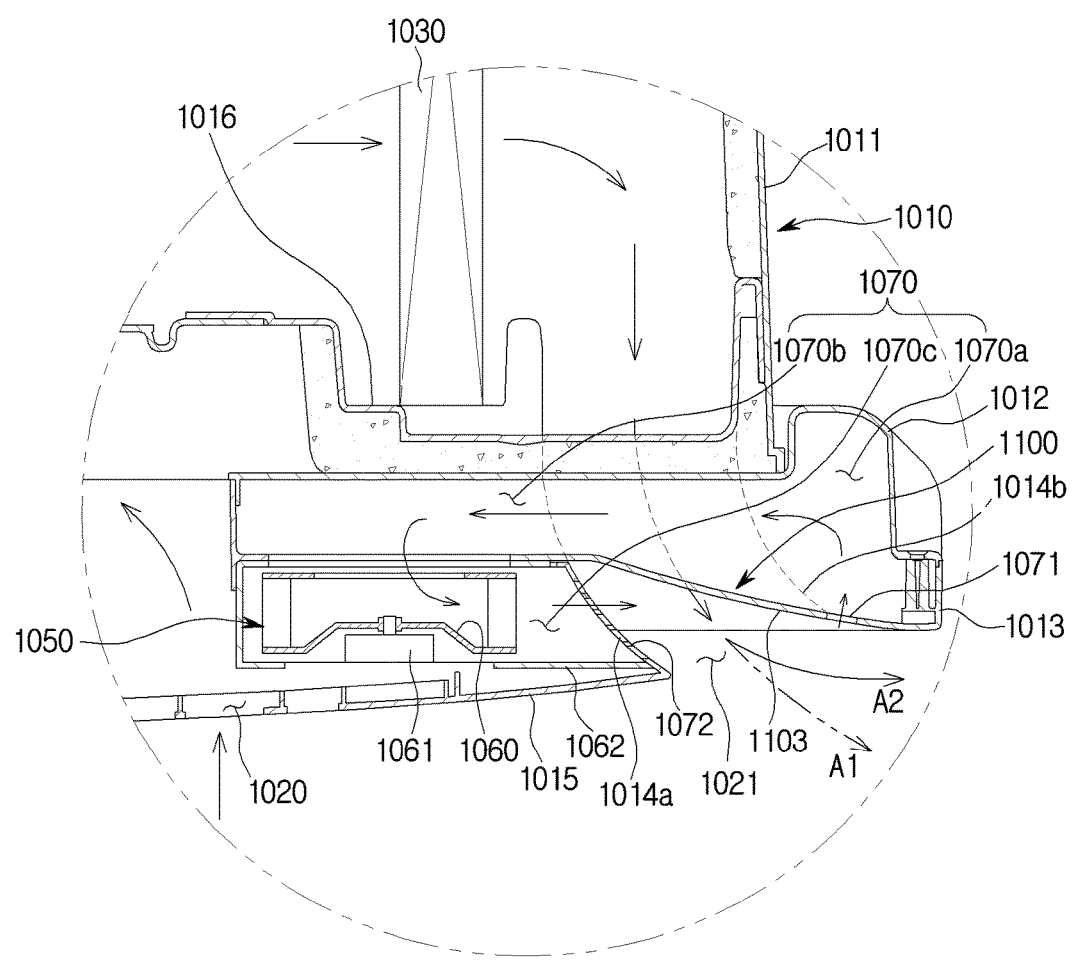
FIG. 37 is an expanded view of part 'O' indicated in FIG. 29.
Figure 39:
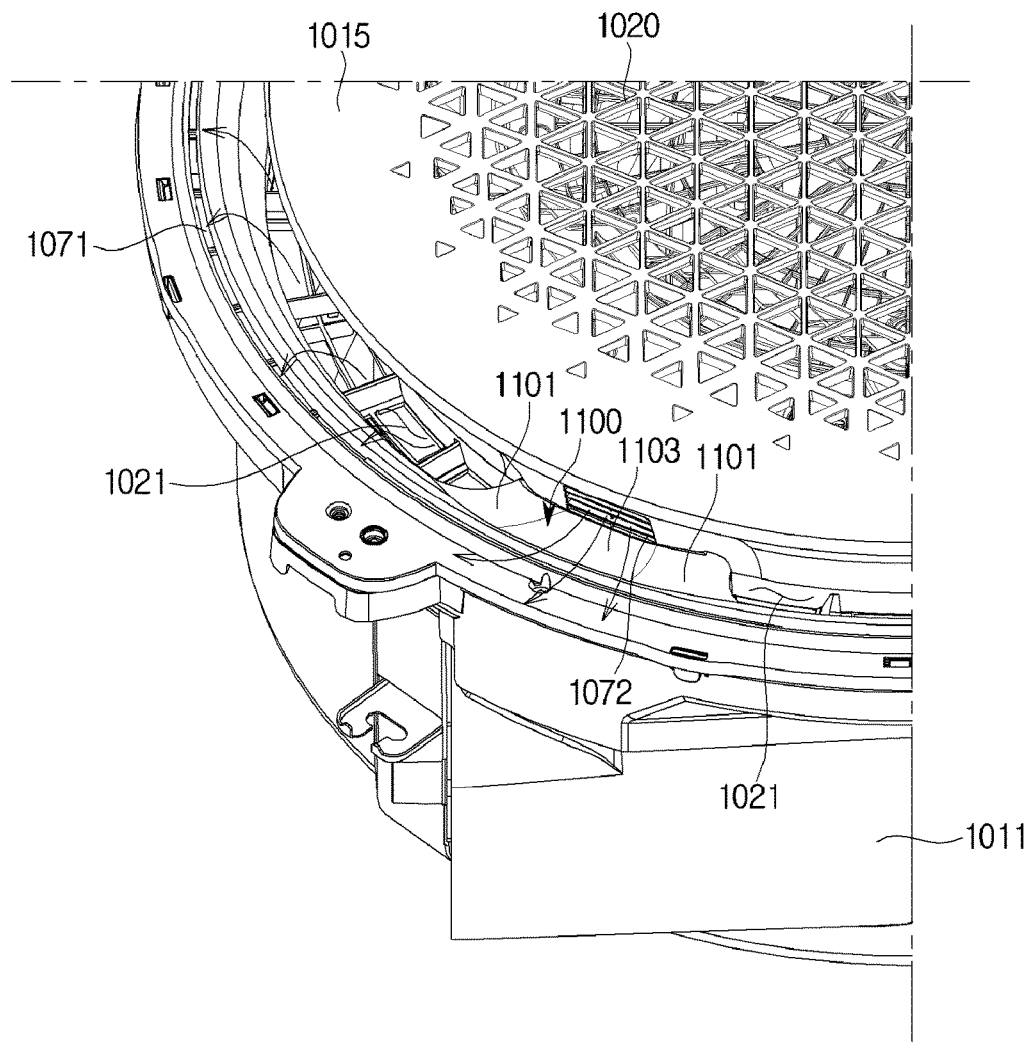
FIG. 39 shows air circulation by an air flow control device of the AC shown in FIG. 26.

FIG. 37 is an expanded view of part 'O' indicated in FIG. 29. FIG. 38 is a view exploded into the middle housing and bottom housing as shown in FIG. 28. FIG. 39 shows air circulation by an air flow control device of the AC shown in FIG. 26.

Referring to FIGS. 37 to 39, the AC 1001 may further include an air flow control device 1050 for controlling an air flow.

The air flow control device 1050 may control the direction of the discharged air flow by sucking in air around the outlet 1021 to change the pressure. Furthermore, the air flow control device 1050 may control an amount of sucking air around the outlet 1021. In other words, the air flow control device 1050 may control the direction of a discharged air flow by controlling the amount of sucking air around the outlet 1021.

Controlling the direction of a discharged air flow herein refers to controlling an angle of the discharged air flow.

In sucking in air around the outlet 1021, the air flow control device 1050 may suck in air from a side to a direction in which the discharged air flow flows.

Specifically, as shown in FIG. 37, given that a direction in which the discharged air flow flows, when the air flow control device 1050 is not activated, is denoted as direction A1, the air flow control device 1050 may be activated to change the direction for the discharged air flow to flow in direction A2 by sucking in air from a side to the direction A1.

At this time, the angle of changing direction may be controlled based on the amount of air suction. For example, the less the amount of air suction, the less the angle of changing direction, and the more the amount of air suction, the more the angle of changing direction.

The air flow control device 1050 may suck in air from the outside of the outlet 1021 in the radial direction. Like this, as the air flow control device 1050 sucks in air from the outside of the outlet 1021 in the radial direction, the discharged air flow may widely spread out from the center of the radial direction of the outlet 1021 to the outside in the radial direction.

The air flow control device 1050 may include an air flow control fan 1060 for producing a sucking force to suck in air around the outlet 1021, an air flow control motor 1061 for driving the air flow control fan 1060, and a guide path 1070 for guiding the air sucked in by the air flow control fan 1060.

The air flow control fan 1060 may be contained in a fan case 1062 arranged at an end of the bridge 1100 adjacent to the inlet 1020. In the embodiment, there are three air flow control fans 1060 to correspond to the number of bridges, but the number of the air flow control fans 1060 is not limited thereto, and the number and arrangement of the air flow control fans 60 may be designed in various ways as those of the bridges 1100.

Although the air flow control fan 1060 corresponds to a centrifugal fan in the embodiment in the embodiment in connection with FIG. 37, it is not limited thereto, and other various fans, such as axial-flow fans, cross-flow fans, mixed flow fans, etc., may also be used for the air flow control fan 1060.

The guide path 1070 connects an inflow hole 1071 for sucking in air around the outlet 1021 to a discharging hole 1072 for discharging the sucked air. A part of the guide path 1070 may be formed on the bridge 1100.

The inflow hole 1071 may be formed on the second guide plane 1014b of the bottom housing 1013. The discharging hole 1072 may be formed to be adjacent to the outlet 1021 on the opposite side to the inflow hole 1071. Specifically, the discharging hole 1072 may be formed in the fan case 1062 arranged on the bottom of the bridge 1100.

As described above, this structure may enable the air flow control device 1050 to discharge the sucked air to the opposite side to the direction A1 in which the discharged air flow flows, and may widen the angle of discharging air flow, thereby controlling the air flow more smoothly.

Referring to FIGS. 37 and 38, the guide path 1070 may include a first path 1070a formed in the circumferential direction on the outer side of the housing 1010 and funneled with the inflow hole 1071, a second path 1070b extending inward in the radial direction from the first path 1070a, and a third path 1070c formed inside the fan case 1062. The second path 1070b may be formed on the bridge 1100.

Accordingly, air sucked in through the inflow hole 1071 may be discharged out of the discharging hole 1072 through the first path 1070a, the second path 1070b, and the third path 70c.

The structure of the guide path 1070 is, however, only by way of example, and there are no limitations on the structure, shape, and arrangement of the guide path 1070 as long as the guide path 1070 connects the inflow hole 1071 and the discharging hole 1072.

Referring to FIGS. 37 and 39, the discharging hole 1072 may be formed to discharge air toward the bottom plane 1103 of the bridge 1100. The discharging hole 1072 may be formed below the bridge 1100.

If the air flowing in through the inflow hole 1071 is cooled air, condensation may occur on the outer side of the bridge 1100, i.e., the bottom plane 1103 of the bridge 1100 due to the difference in temperature between inside through which the cooled air passes and outside of the bridge 1100 while the cooled air is passing the bridge 1100.

On the other hand, in the case of AC 1001 in accordance with an embodiment of the present disclosure, because the cooled air sucked in through the inflow hole 1071 is discharged to the bottom plane 1103 of the bridge 1100 through the discharging hole 1072 formed below the bridge 1100, the difference in temperature between inside and outside of the bridge 1100 may be reduced. This may prevent condensation.

Figure 40:
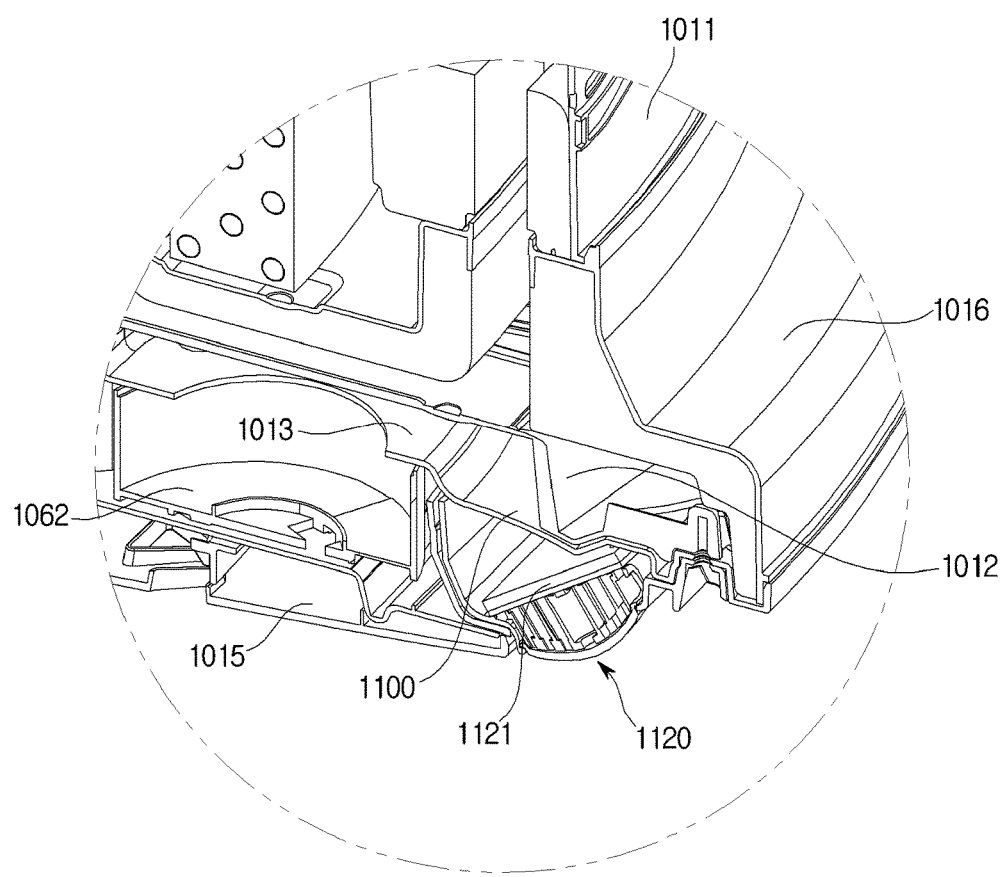
FIG. 40 is a cross-sectional view of a part where a display unit of the AC of FIG. 26 is arranged.

Referring to FIGS. 27 and 40, the AC 1001 may further include a display unit 1120 below one of the plurality of bridges 1100.

The display unit 1120 may display status of operation of the AC 1001 for the user. Specifically, the display unit 1120 may display, but not exclusively, whether the AC 1001 is operating, directions of the discharged air flow, whether the AC 1001 is currently driven in cooling mode or heating mode, or various information relating to the AC 1001.

The display unit 1120 may include a discharging guide plane 1122 having almost the same shape as that of the discharging guide plane 1101 of the bridge 1100. Accordingly, even the air discharged from the discharging hole 1021 adjacent to where the display unit 1120 is arranged may spread out while being discharged from the outlet 1021.

Although not shown, in addition to the display unit 1120, one of a remote control receiver (not shown), an input unit (not shown) of the AC 1001, and a communication unit (not shown) for enabling communication with an external device may also be located below the bridge 1100.

In the case the display unit 1120 is arranged below the bridge 1100, the discharging hole 1072 is unable to discharge air toward the bottom plane 1103 of the bridge 1100. Accordingly, an insulating material may be arranged between the display unit 1120 and the bridge 1100 to prevent the problem of condensation that might otherwise occur on the side of the display unit 1120.

Figure 41:
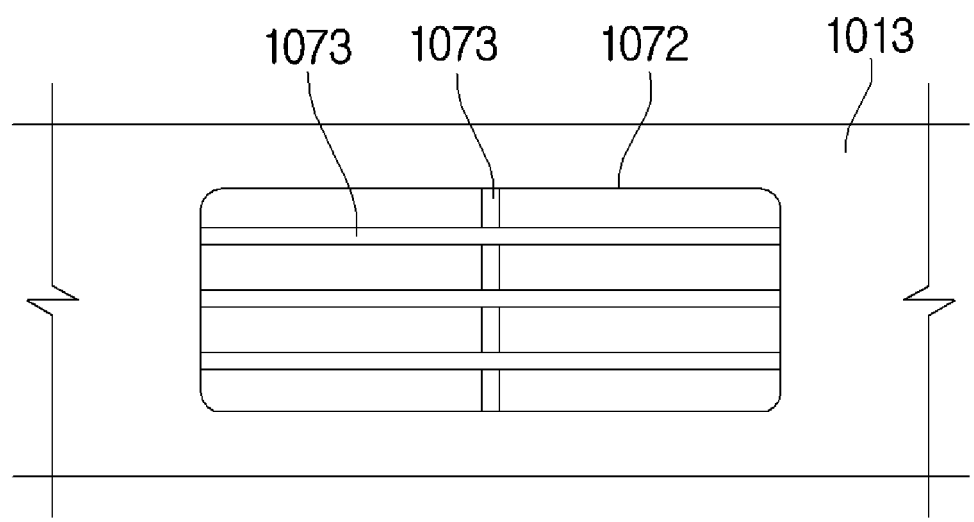
FIG. 41 shows a discharging hole of the AC shown in FIG. 26.

Referring to FIGS. 39 and 41, the discharging hole 1072 may further include a discharging hole rib 1073 that extends in the direction in which air is discharged from the discharging hole 1072. In other words, the discharging hole rib 1073 may be formed by extending in the radial direction of the outlet 1021. The discharging hole rib 1073 may extend horizontally and/or vertically. While there is one discharging hole rib 1073 extending in the vertical direction and four discharging hole ribs 1073 extending in the horizontal direction, there is no limitation on the number of the discharging hole rib 1073.

The discharging hole rib 1073 guides air discharged from the discharging hole 1072 such that the air discharged from the discharging hole 1072 may come into contact with the bottom plane 1103 of the bridge 1100 and then may be discharged in approximately the same direction as the discharged air flow from the outlet 1021.

Furthermore, when the air flow control device 1050 is not activated, i.e., when some of the air discharged from the outlet 1021 is not sucked in through the inflow hole 1071, it may prevent the some of the air discharged from the outlet 1021 from flowing into the discharging hole 1072.

Figure 42:
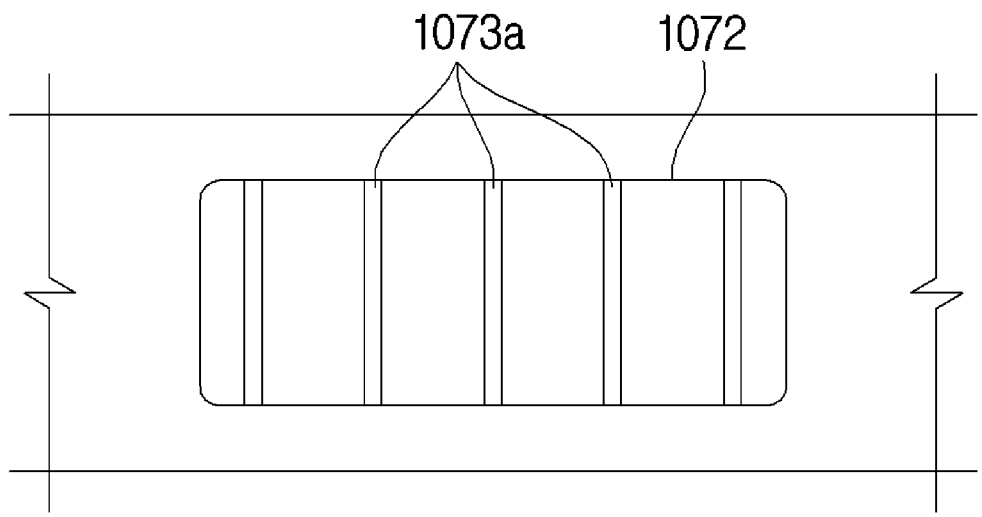
FIG. 42 shows an embodiment of the discharging hole of FIG. 41 viewed from the radial direction of the outlet.

FIG. 42 shows an embodiment of the discharging hole of FIG. 41 viewed from the radial direction of the outlet. FIG.

Figure 44:
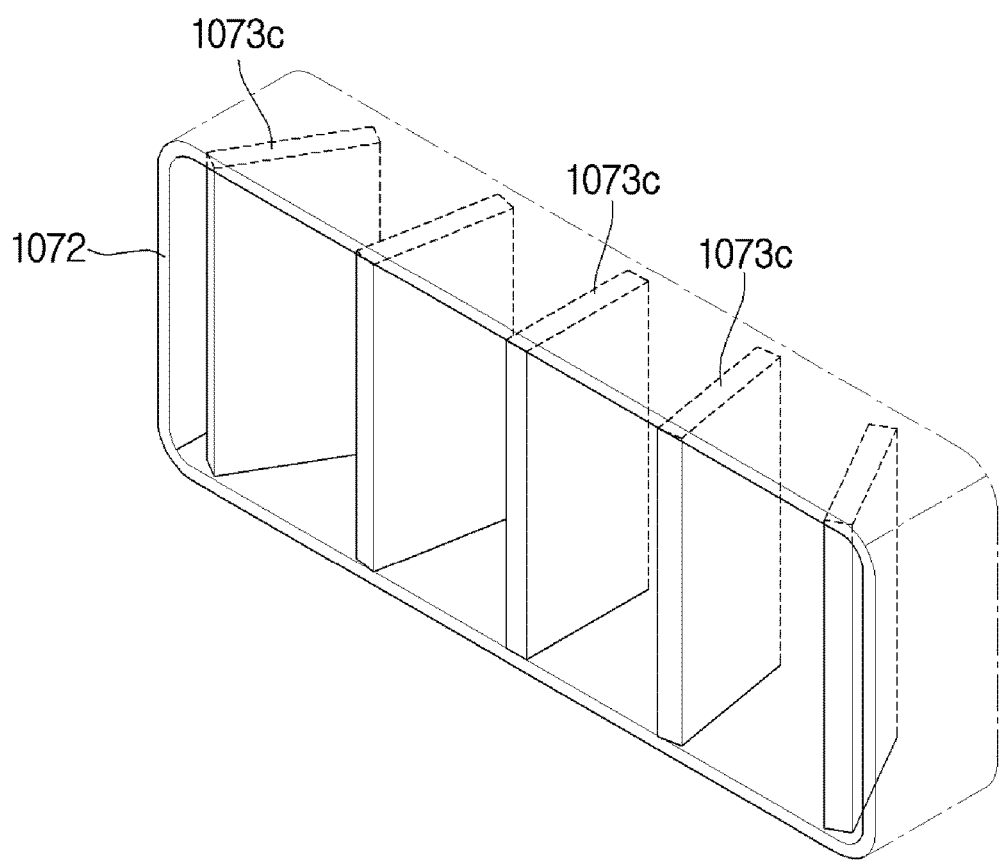
FIG. 44 is a perspective view of an embodiment of the discharging hole of FIG. 41.
Figure 45:
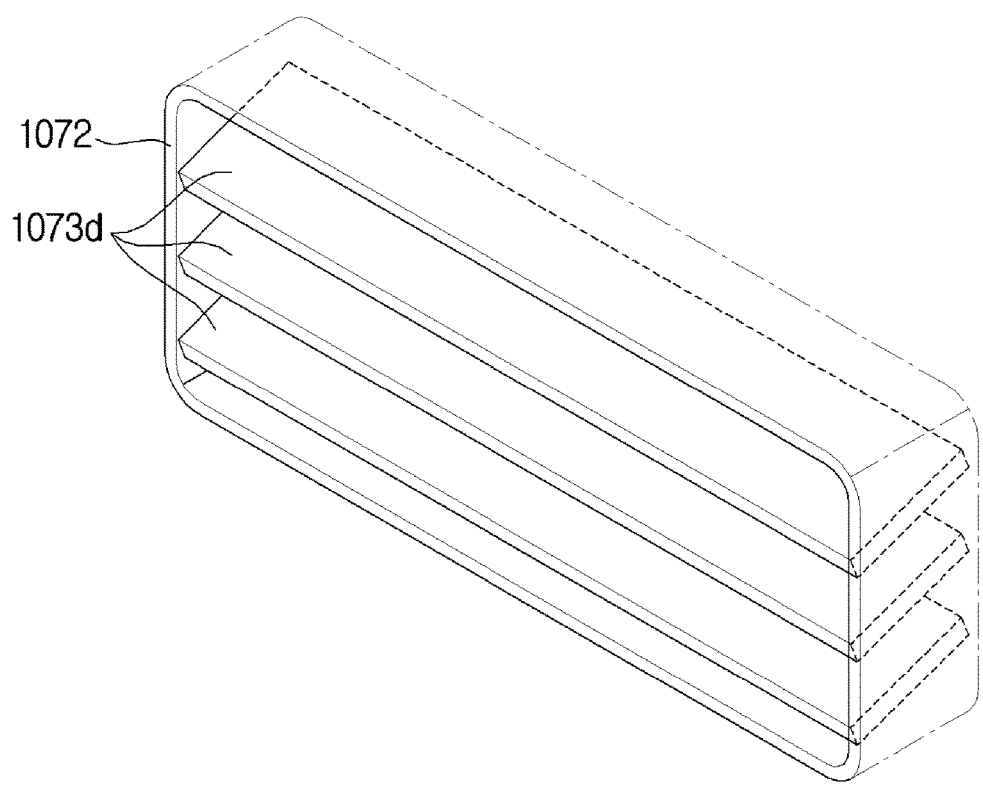
FIG. 45 is a perspective view of an embodiment of the discharging hole of FIG. 41.

43 shows an embodiment of the discharging hole of FIG. 41 viewed from the radial direction of the outlet. FIG. 44 is a perspective view of an embodiment of the discharging hole of FIG. 41. FIG. 45 is a perspective view of an embodiment of the discharging hole of FIG. 41.

Referring to FIG. 42, the discharging hole ribs 1073a of the discharging hole 1072 may only extend vertically.

Figure 43:
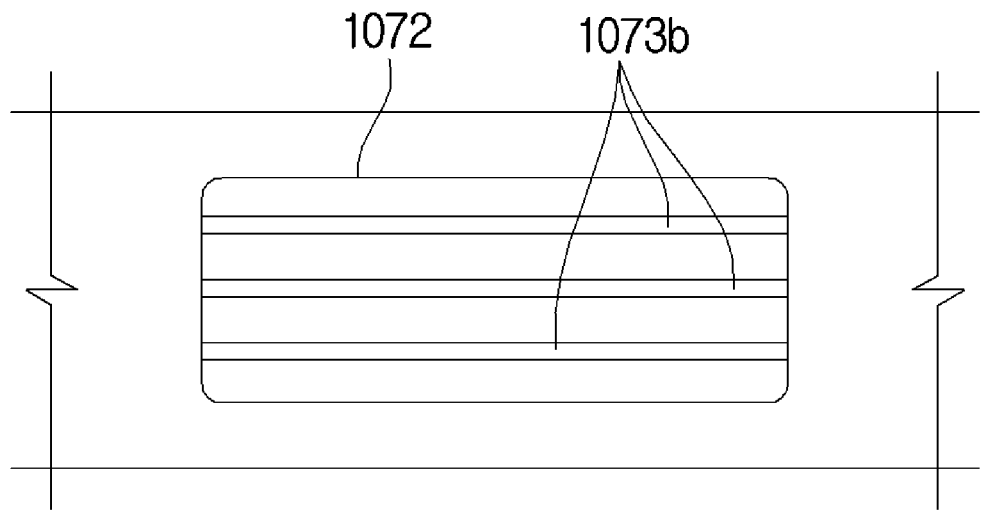
FIG. 43 shows an embodiment of the discharging hole of FIG. 41 viewed from the radial direction of the outlet.

Referring to FIG. 43, the discharging hole ribs 1073b of the discharging hole 1072 may only extend horizontally.

Referring to FIG. 44, the discharging hole ribs 1073c of the discharging hole 1072, which extend vertically, may be arranged to be inclined at predetermined angles with respect to the direction in which air is discharged such that the air discharged from the discharging hole 1072 may be spread out.

Referring to FIG. 45, the discharging hole ribs 1073d of the discharging hole 1072, which extend horizontally, may be arranged to be inclined downward in the direction air is discharged from the discharging hole 1072 such that the air discharged from the discharging hole 1072 may have approximately the same slope as that of the bottom plane 1103 of the bridge 1100. Accordingly, the air discharged from the discharging hole 1072 may be smoothly released across the bottom plane 1103 of the bridge 1100, thereby reducing the air loss caused by the collision with the bottom plane 1103 of the bridge 1100.

Figure 46:
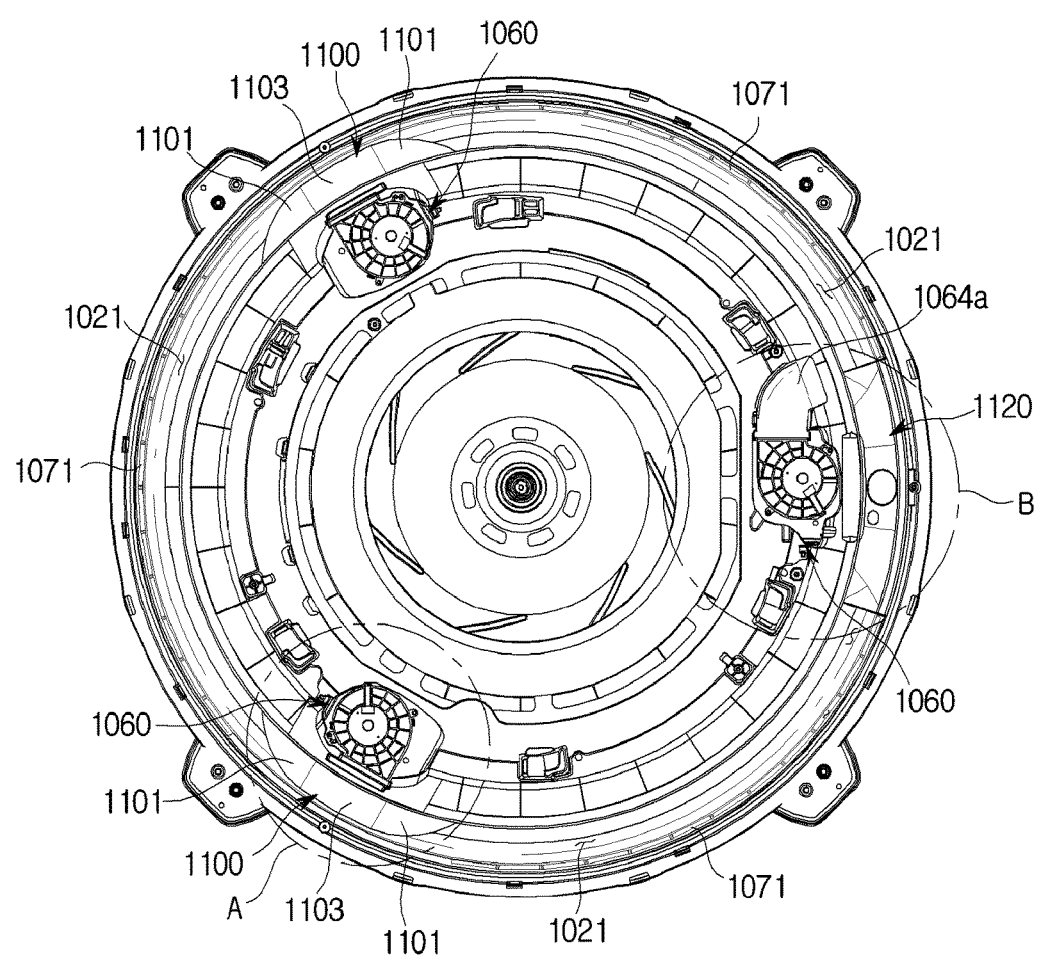
FIG. 46 is a bottom view of an AC with a grill shown in FIG. 26 eliminated.
Figure 47:
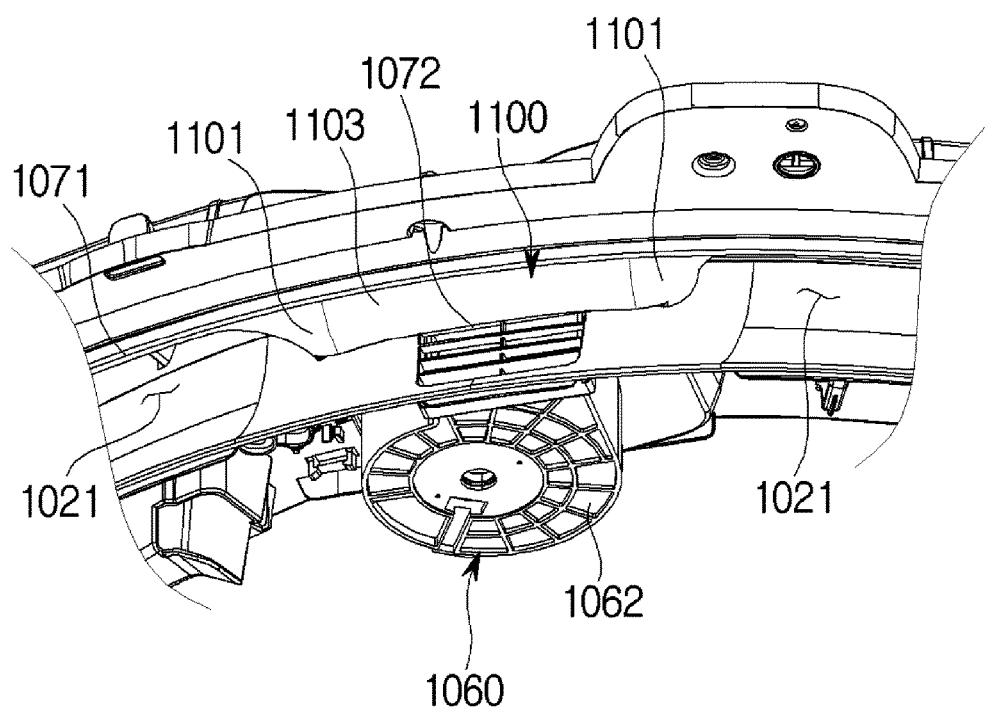
FIG. 47 is a view of part 'A' indicated in FIG. 46, viewed obliquely from below.
Figure 48:
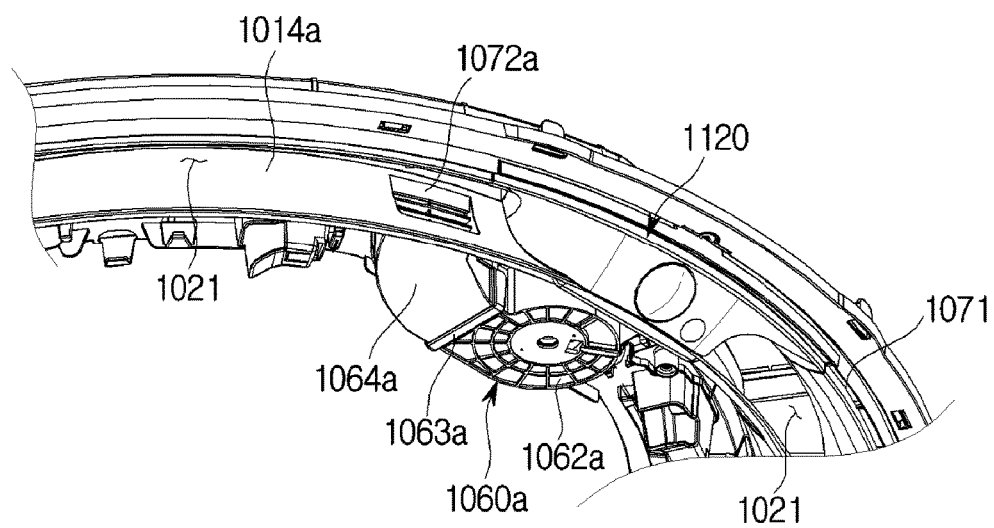
FIG. 48 is a view of part 'B' indicated in FIG. 46, viewed obliquely from below.
Figure 49:
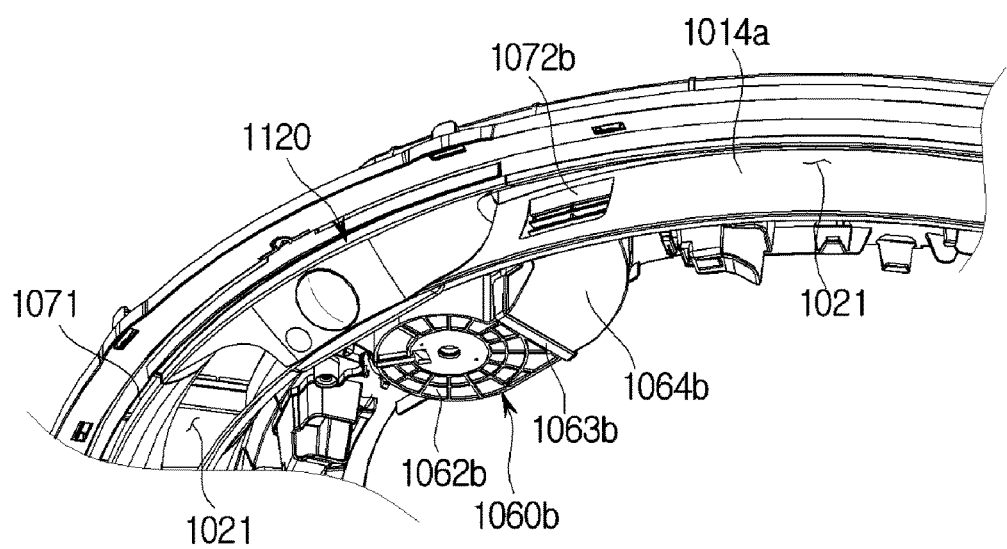
FIG. 49 is an embodiment of the bottom housing of FIG. 48.
Figure 50:
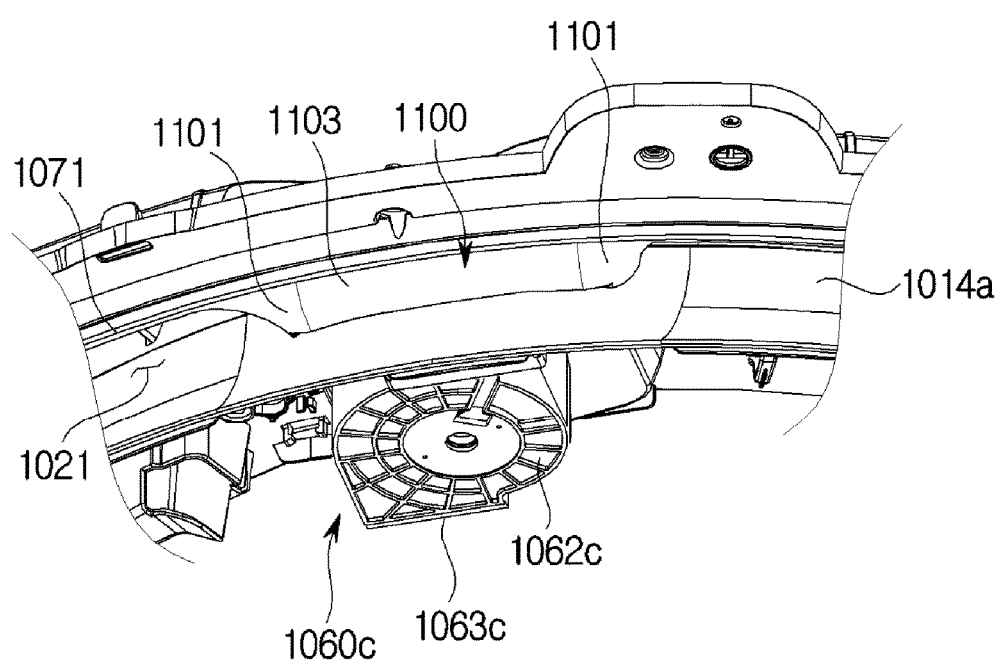
FIG. 50 is an embodiment of the bottom housing of FIG. 48.

FIG. 46 is a bottom view of an AC with the grill shown in FIG. 26 eliminated. FIG. 47 is a view of part 'A' indicated in FIG. 46, viewed obliquely from below. FIG. 48 is a view of part 'B' indicated in FIG. 46, viewed obliquely from below. FIG. 49 is an embodiment of the bottom housing of FIG. 48. FIG. 50 is an embodiment of the bottom housing of FIG. 48.

Referring to FIGS. 46 and 47, the air flow control fan 1060 of the AC 1001 may be arranged below the bridge 1100, and may discharge air sucked in from the inflow hole 1071 to the outside of the outlet 1021 in the radial direction through the discharging hole 1072. The discharging hole 1072 may be located on the opposite side to the outlet 1021 where the inflow hole 1071 is formed.

Referring to FIGS. 46 and 48, in the case the display unit 1120 is arranged below the bridge 1100, the air flow control fan 1060a is arranged at an end close to the inlet 1020 of the bridge 110 located above the display unit 1120, and is located on inner side of the outlet 1021 in the radial direction with respect to the display unit 1120.

A discharging hole 1072a through which air is discharged from the air flow control fan 1060a may be located on a first guide plane 1014a on the left to the display unit 1120. Specifically, unlike the fan case 1062 arranged adjacent to the bridge 1100 that has no display unit 1120 below, a fan case 1062a containing the air flow control fan 1060a may have an opening 1063a, through which air is discharged from the air flow control fan 1060a, located on the left to the display unit 1120, and an extension duct 1064a arranged for connecting the opening 1063a of the air flow control fan 1060a with the discharging hole 1072a formed on the first guide plane 1014a. Accordingly, the air sucked in through the inflow hole 1071 may be discharged through the discharging hole 1072a formed on the left to the display unit 1120 without interference with the display unit 1120.

On the other hand, as shown in FIG. 49, a discharging hole 1072b may be formed on the right to the display unit 1120. In this case, a fan case 1062b containing an air flow control fan 1060b may have an opening 1063b, through which air is discharged from the air flow control fan 1060b formed on the right to the display unit 1120, and an extension duct 1064b arranged for connecting the opening 1063b of the air flow control fan 1060b to a discharging hole 1072b formed on the first guide plane 1014a. Accordingly, the air sucked in through the inflow hole 1071 may be discharged through the discharging hole 1072b formed on the right to the display unit 1120 without interference with the display unit 1120.

Alternatively, as shown in FIG. 50, a discharging hole (not shown) may be formed behind the display unit 1120. In this case, air sucked in from the inflow hole 1071 may be discharged to the inside of the housing 1010.

Specifically, a fan case 1062c containing an air flow control fan 1060c may have an opening 1063c, through which air is discharged from the air flow control fan 1060c formed behind the display unit 1120, i.e., on inner side of the housing 1010, and a fourth path (not shown) arranged for connecting the opening 1063c of the air flow control fan 1060c to a discharging hole 1072c formed inside the housing 1010. Accordingly, the air flowing in through the inflow hole 1071 may sequentially pass the air flow control fan 1060c, the opening 1063c of the air flow control fan 1060c, and the fourth path, and may then be discharged through the outlet.

Figure 51:
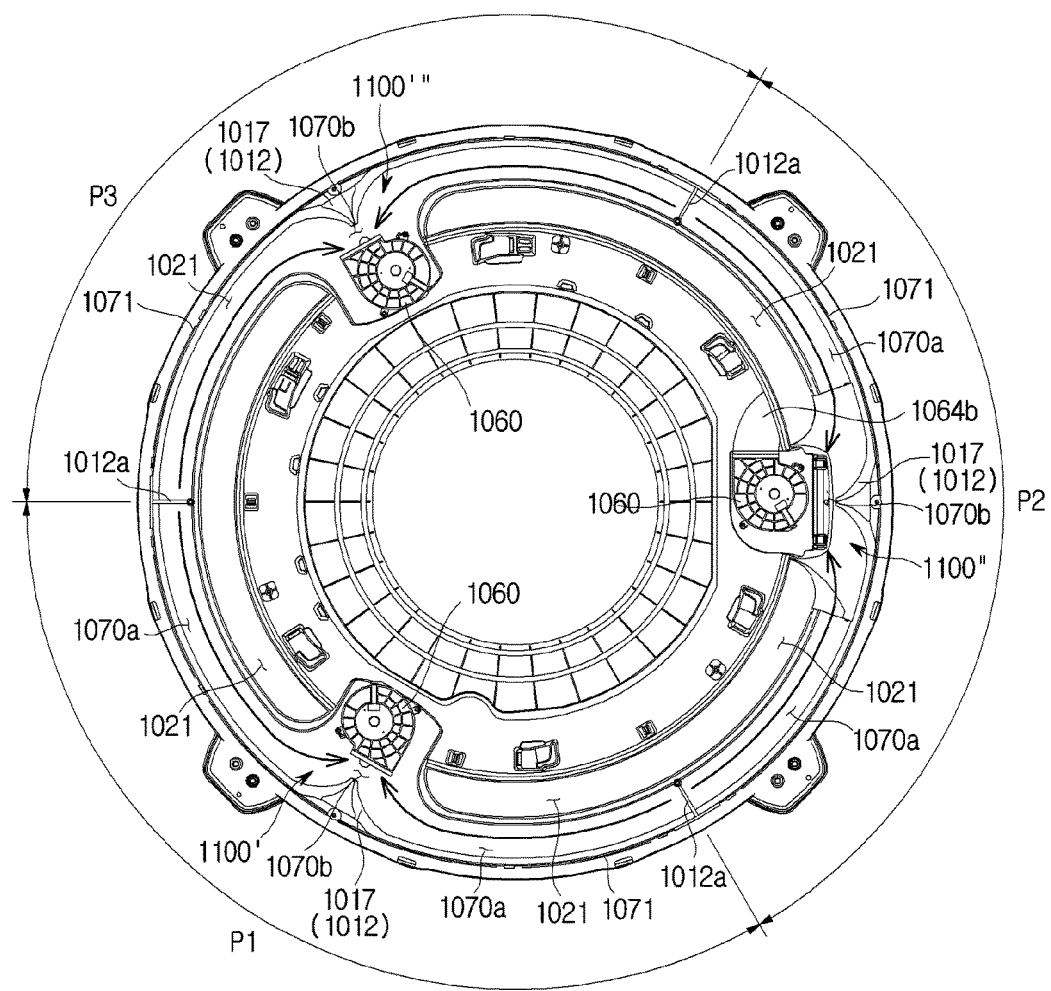
FIG. 51 is a cross-sectional view cut along line II to II indicated in FIG. 29.
Figure 52:
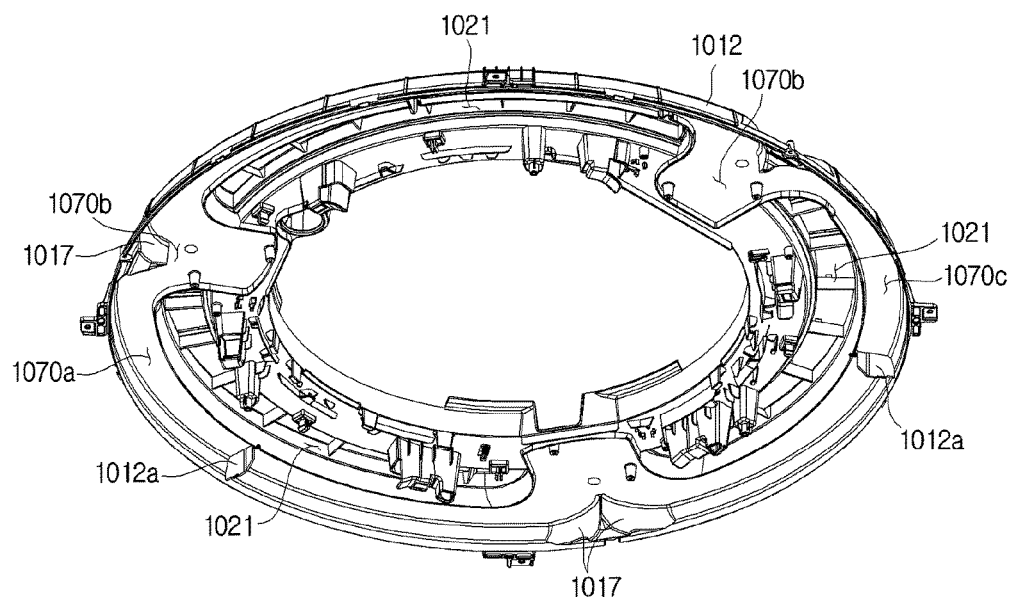
FIG. 52 is a bottom view of the middle housing shown in FIG. 28.
Figure 53:
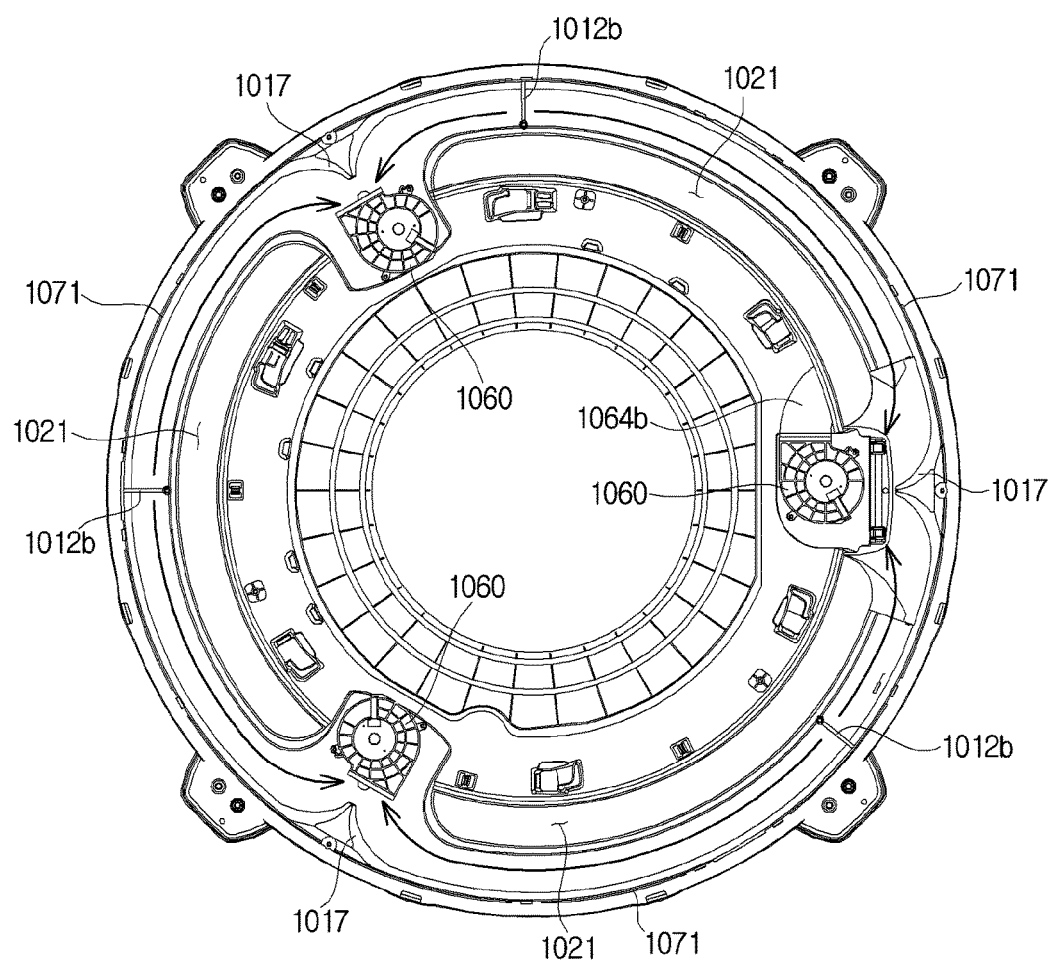
FIG. 53 is an embodiment of the middle housing of FIG. 51.
Figure 54:
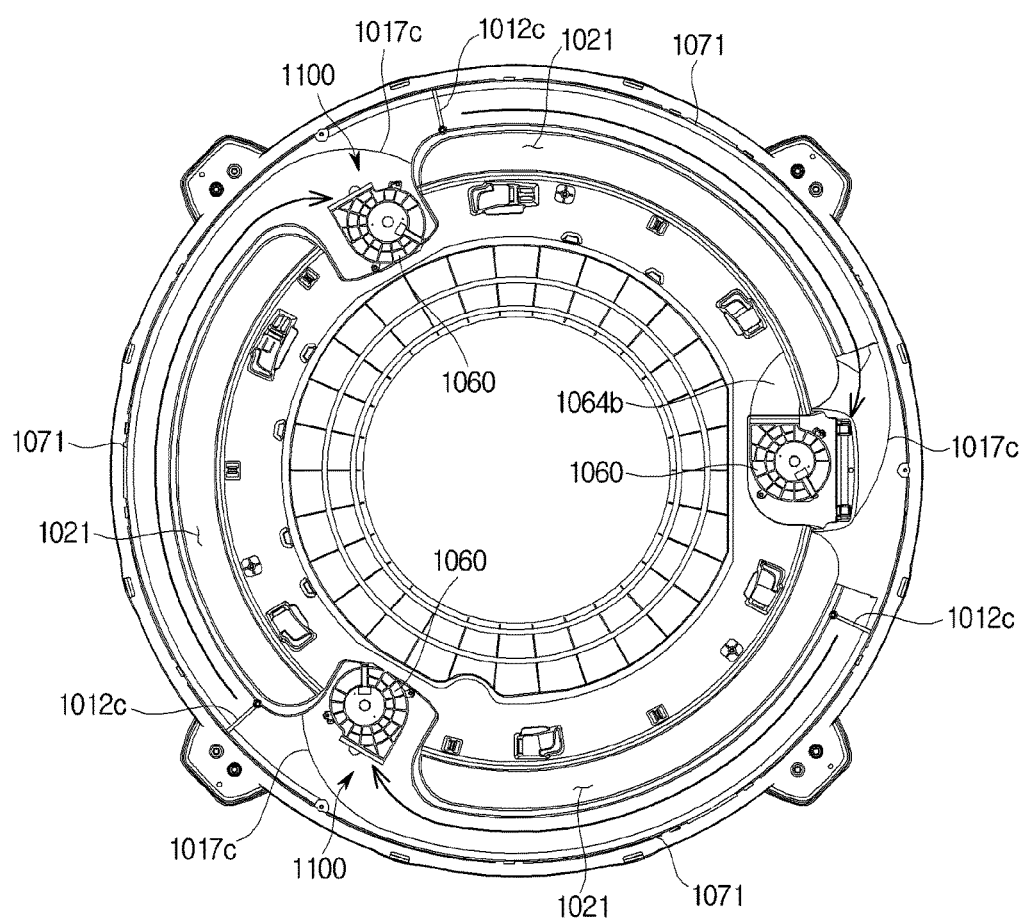
FIG. 54 is an embodiment of the middle housing of FIG. 51.
Figure 55:
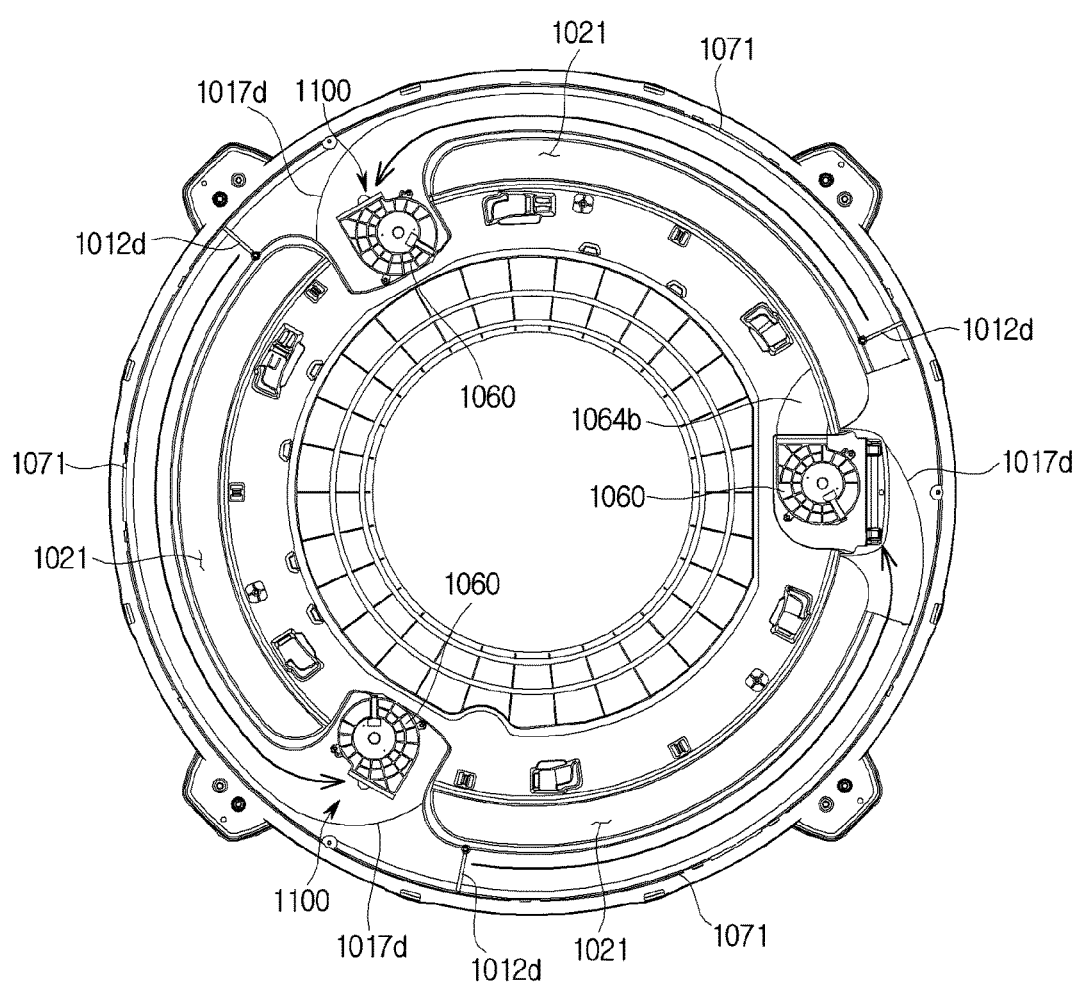
FIG. 55 is an embodiment of the middle housing of FIG. 51.
Figure 56:
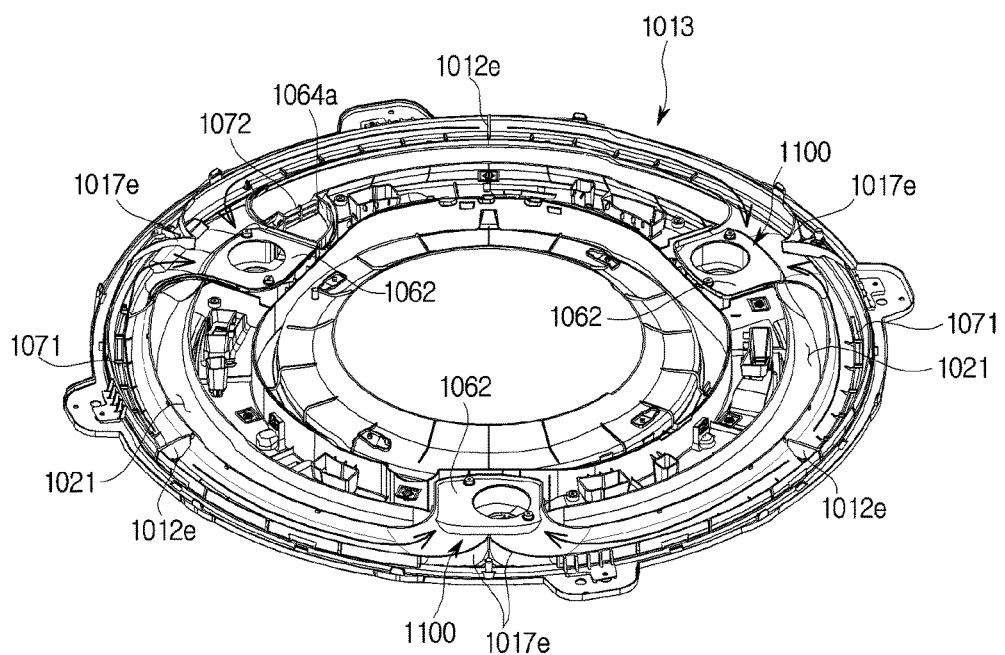
FIG. 56 is an embodiment of the bottom housing of FIG. 51.

FIG. 51 is a cross-sectional view cut along line II to II indicated in FIG. 29. FIG. 52 is a bottom view of the middle housing shown in FIG. 28. FIG. 53 is an embodiment of the middle housing of FIG. 51. FIG. 54 is an embodiment of the middle housing of FIG. 51. FIG. 55 is an embodiment of the middle housing of FIG. 51. FIG. 56 is an embodiment of the bottom housing of FIG. 51.

Referring to FIGS. 51 and 52, the middle housing 1012 may further include partitions 1012a dividing the guide path 1070.

Specifically, the middle housing 1012 may include partitions 1012a dividing the first path 1070a funneled with the inflow hole 1071. The partitions 1012a may be arranged to correspond to the number of the bridges 1100. The partitions 1012a may be arranged at middle points between the plurality of bridges 1100 on the first path 1070a for symmetrically partitioning the first path 1070a with respect to each bridge 1100. The partitions 1012a may divide the guide path 1070 formed between the plurality of air flow control fans 1060.

Specifically, as shown in FIG. 51, in the case there are three bridges 1100', 1100", 1100'" arranged, the partitions 1012a may be located at middle points between the bridges 1100', 1100", 1100'". Accordingly, the first path 1070a may be partitioned into a first part P1, a second part P2, and a third part P3, such that air flowing in through the inflow hole 1071 flows in the parts according to status of driving the air flow control fans 1060 arranged at one ends of the respective bridges 1100', 1100", 1100'".

Specifically, if the air flow control fan 1060 located at an end of the first bridge 1100' is driven, only part of the air discharged through the outlet 1021 corresponding to the first part P1 flows into the first path 1070a through the inflow hole 1071. If the air flow control fan 1060 located at an end of the second bridge 1100" is driven, only part of the air discharged through the outlet 1021 corresponding to the second part P2 flows into the first path 1070a through the inflow hole 1071. If the air flow control fan 1060 located at an end of the third bridge 1100'" is driven, only part of the air discharged through the outlet 1021 corresponding to the third P3 flows into the first path 1070a through the inflow hole 1071. The air flow control fans 1060 arranged adjacent to the respective bridges 1100', 1100", 1100'" may be driven independently from one another. Accordingly, as for the AC shown in FIG. 26, discharged air flows may be independently produced in three directions with respect to the bridges 1100.

Like this, in the case of the embodiment shown in FIG. 51, as many different air flows as a predetermined number of sections partitioned with respect to the bridges 1100', 1100", 1100''' may be produced.

The middle housing 1012 may include guiding parts 1017 formed at the other ends of the bridges 1100, that are opposite to the one ends at which the air flow fans 1060 are located. The guiding parts 1017 may be arranged at the other ends of the bridges 1100, to which air sucked in around the outlet 1021 may flow in. The guiding parts 1017 may be formed at a point where the first and second paths 1070a and 1070b join. The guiding parts 1017 guide air moving from the first paths 1070a to the bridge 1100 to avoid the loss of the airs flowing in from the first paths 1070a arranged on the left and right to the bridge 1100 by preventing collision when the airs join together. In other words, the guiding parts 1017 may guide air flowing in through the inflow hole 1071 to smoothly flow from the first path 1070a to the second path 1070b. The guiding part 1017 protrudes to form a curved plane having the symmetrical shape from the outer circumferential face of the middle housing 1012.

Referring to FIG. 53, the partitions 1012b may each be located a predetermined distance from a middle point on the first path 1070a between the bridges 1100 as well. In other words, the partition 1012b may be located closer to one of the bridges 1100.

Referring to FIG. 54, the partition 1012c may each be located at a point where the bridge 1100 and the first path 1070a join. Specifically, the partitions 1012c may be arranged at right ends to the bridges 1100. In this case, the guiding parts 1017c each protrude to form a curved plane at the right end to the bridge 1100 such that air flowing in from the first path 1070a formed on the left to the bridge 1100 is guided to the bridge 1100.

In the case of an embodiment shown in FIG. 54, different air flows may be produced with respect to the outlet 1021 between the plurality of bridges 1100.

Referring to FIG. 55, the partitions 1012d may also be arranged at the left ends to the bridges 1100. In this case, the guiding parts 1017d each protrude to form a curved plane at the left end to the bridge 1100 such that air flowing in from the first path 1070a formed on the right to the bridge 1100 is guided to the bridge 1100.

In the case of an embodiment shown in FIG. 55, different air flows may be produced with respect to the outlet 1021 between the plurality of bridges 1100.

Referring to FIG. 56, partitions 1012e and guiding parts 1017e may be arranged in the bottom housing 1013. In this case, locations of the partitions 1012e and shapes of the guiding parts 1017e may be determined as described above in connection with FIGS. 51 to 55.

Figure 57:
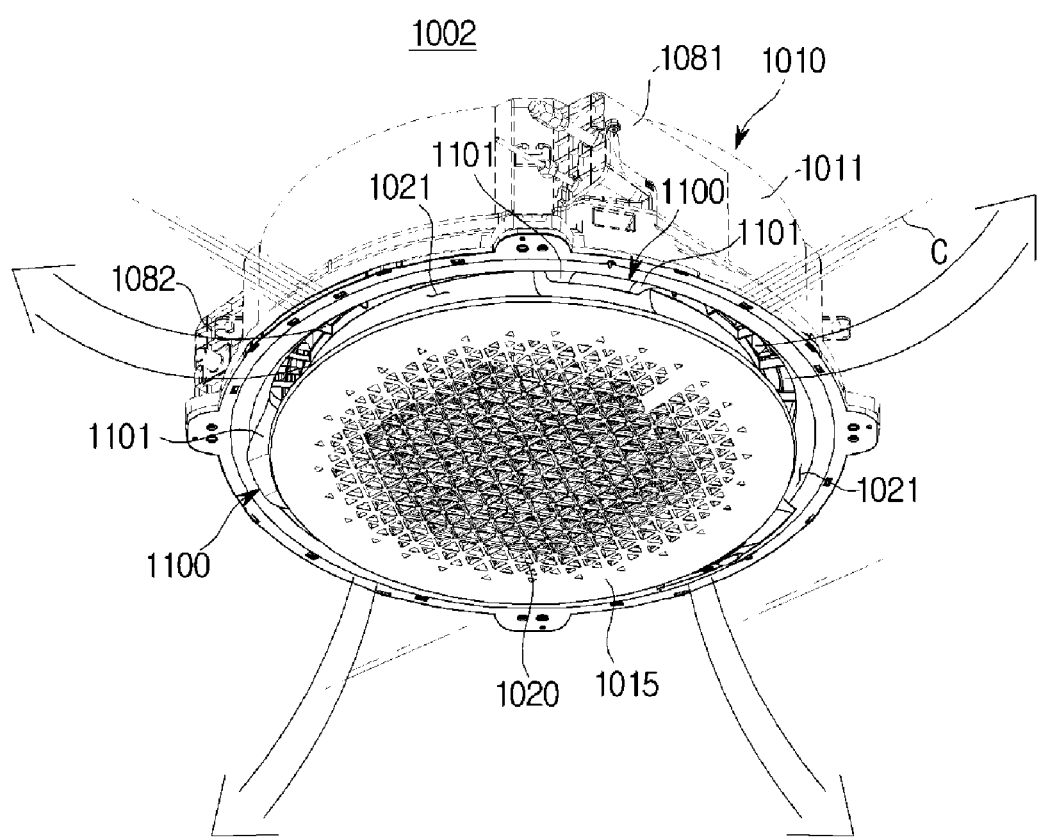
FIG. 57 is an embodiment of the AC of FIG. 26.

FIG. 57 is an embodiment of the AC 1001 of FIG. 26. As for the embodiment shown in FIG. 57, like reference numerals are used for like components of the AC 1001 of FIG. 26, so the description will be omitted below.

The air flow control device 1050 for controlling an air flow of discharged air by sucking in air discharged from the outlet 1021 may be left out from an AC 1002 shown in FIG. 57. Accordingly, the AC 1002 shown in FIG. 57 may exclude the inflow hole 1071 and the discharging hole 1072.

Figure 58:
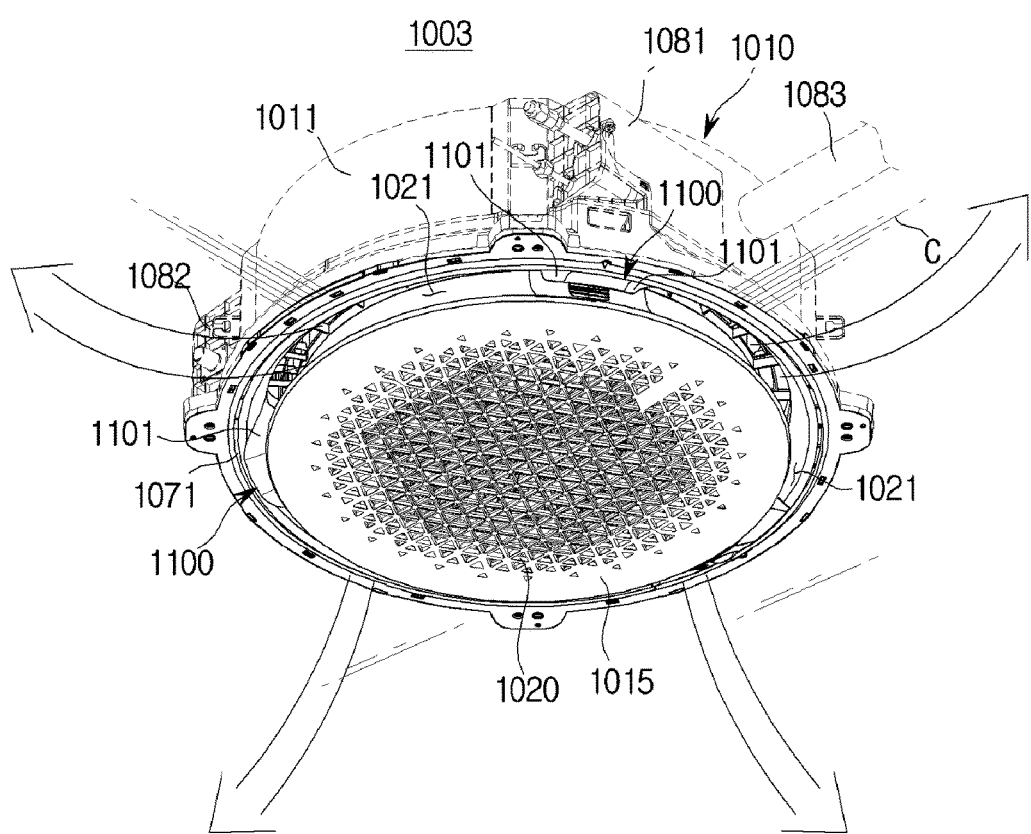
FIG. 58 is an embodiment of the AC of FIG. 26.

FIG. 58 is an embodiment of the AC of FIG. 26. As for the embodiment shown in FIG. 58, like reference numerals are used for like components of the AC 1001 of FIG. 26, so the description will be omitted below.

An AC 1003 shown in FIG. 58 may further include an auxiliary inlet 1083 to suck in outdoor air in addition to the inlet 1020. The auxiliary inlet 1083 may be arranged on the outer circumferential face of the upper housing 1011. The auxiliary inlet 1083 may be built into the ceiling C. The auxiliary inlet 1083 may be arranged outside of the ceiling C. Outdoor air sucked in through the auxiliary inlet 1083 may pass the heat exchanger 1030 and may then be discharged through the outlet 1021.

As such, the AC 1001 in accordance with the present disclosure may prevent the air discharged from the outlet 1021 from being sucked back into the inlet 1020, thereby preventing condensation from being formed inside the housing 1010 and improving effective performance of the AC 1001 felt by the user by reducing the loss of the discharged air flow.

Figure 59:
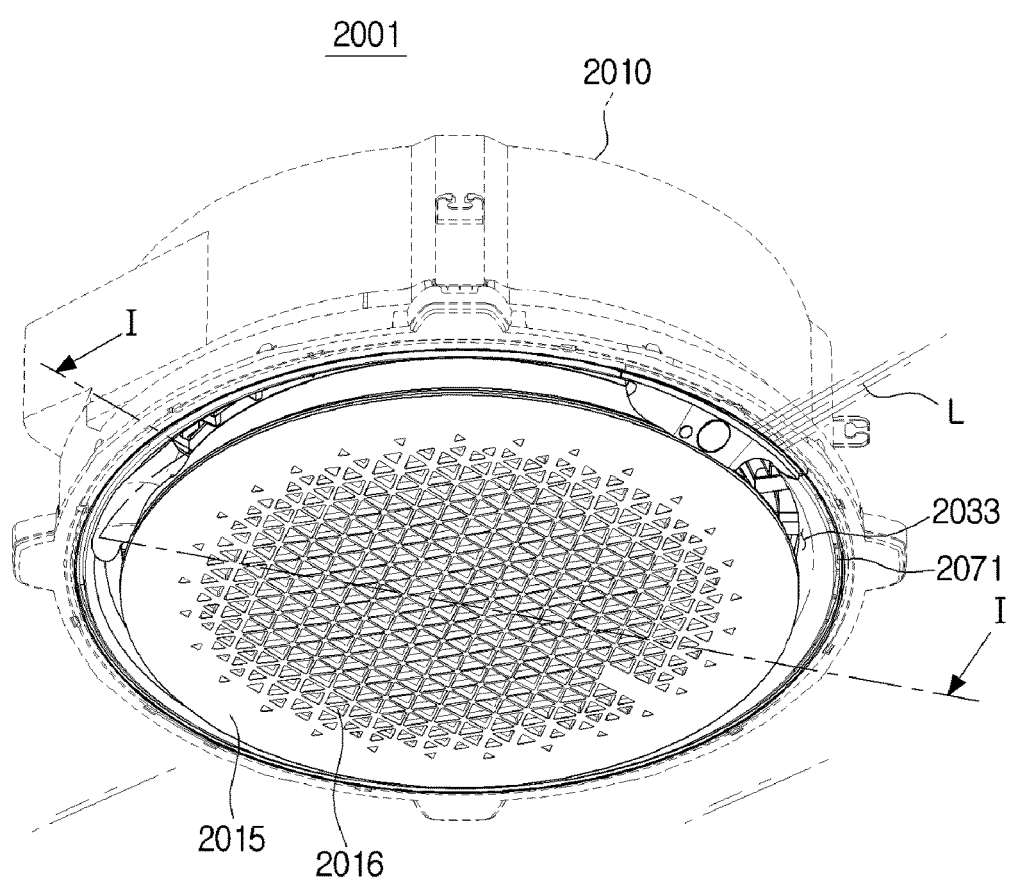
FIG. 59 is a perspective view of an AC indoor unit, according to an embodiment of the present disclosure.
Figure 60:
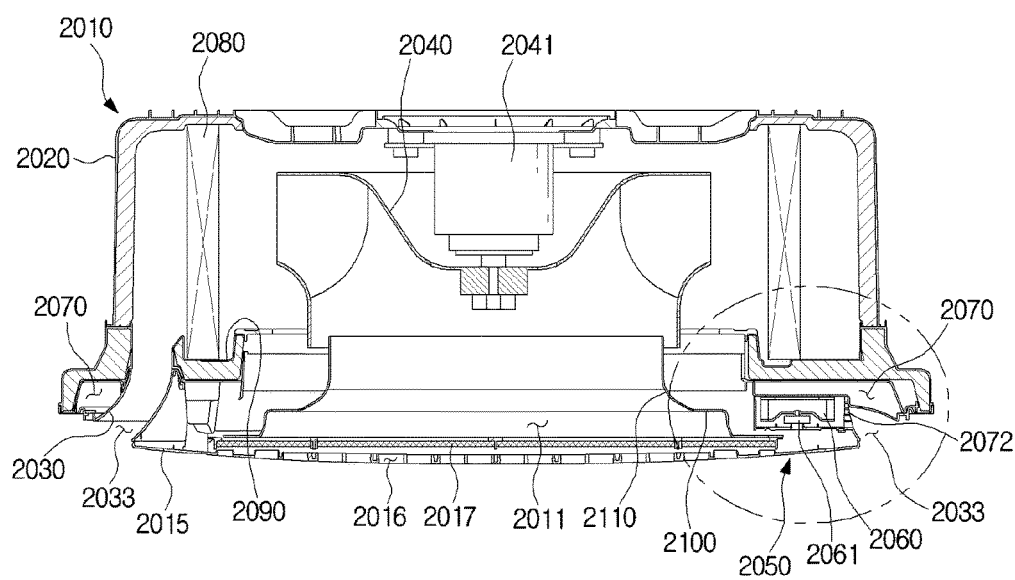
FIG. 60 is a side cross-sectional view cut along the line I to I indicated in FIG. 59.
Figure 61:
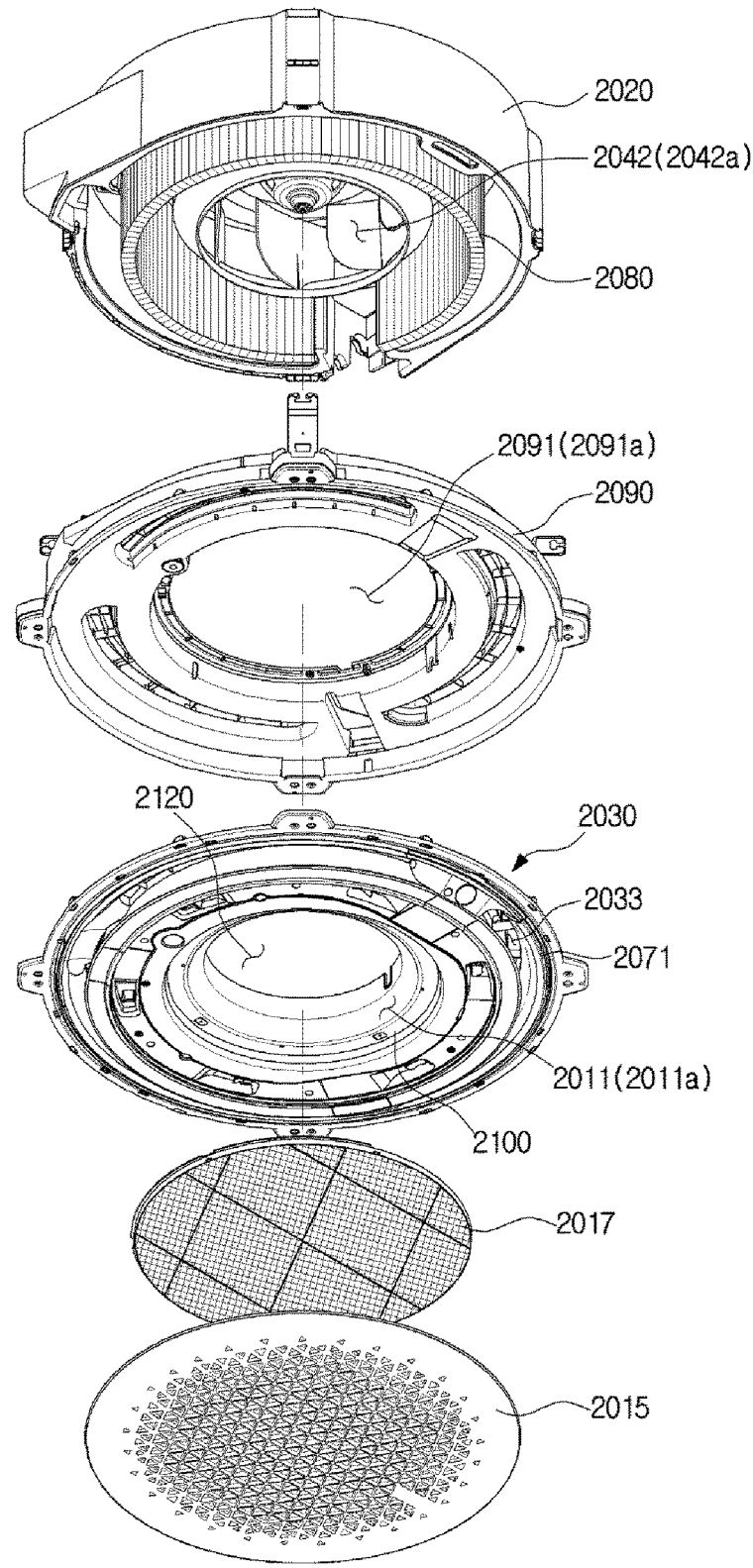
FIG. 61 is an exploded view of an AC, according to an embodiment of the present disclosure.
Figure 62:
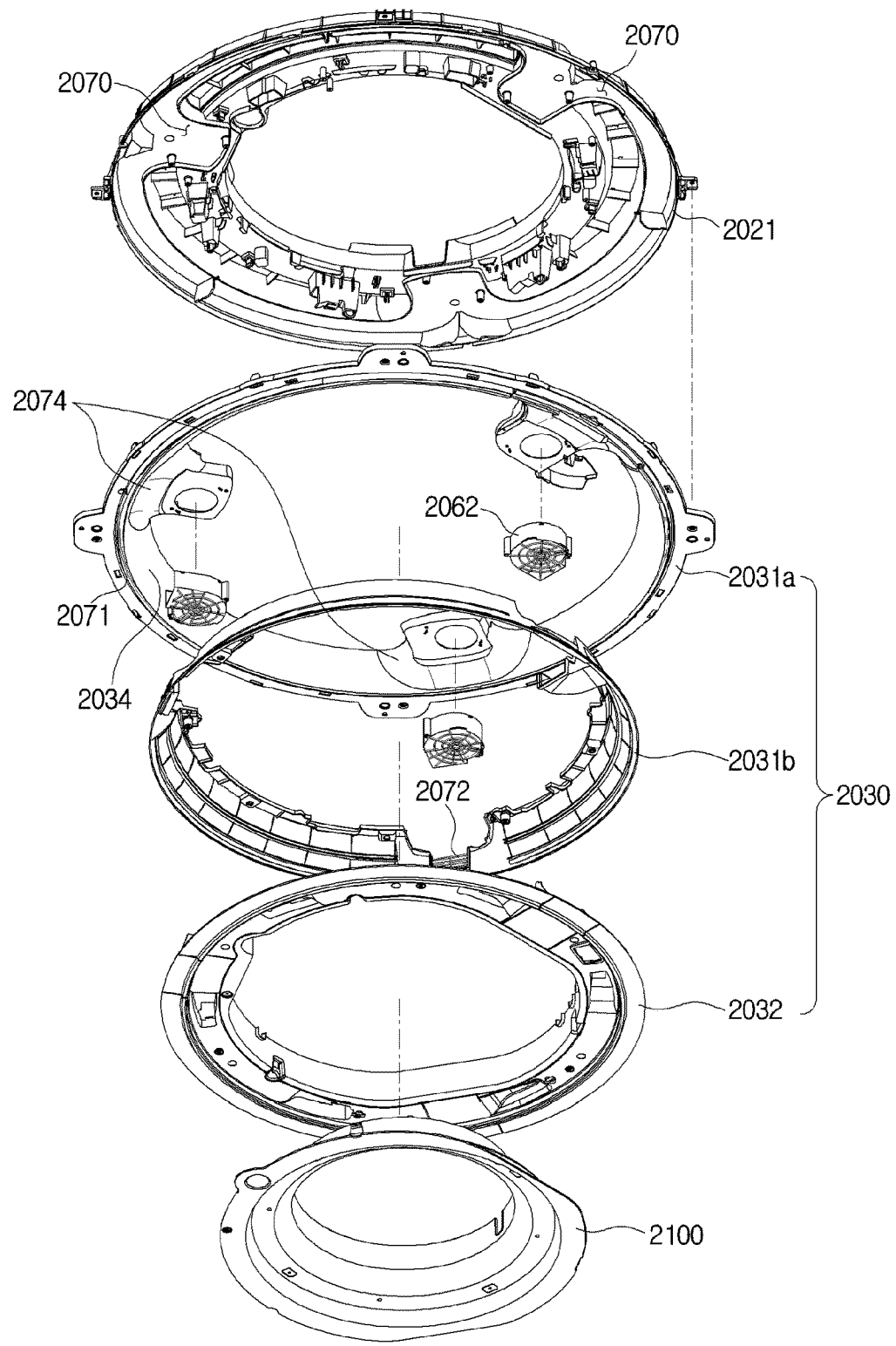
FIG. 62 is an exploded view of a bottom housing of an AC, according to an embodiment of the present disclosure.
Figure 63:
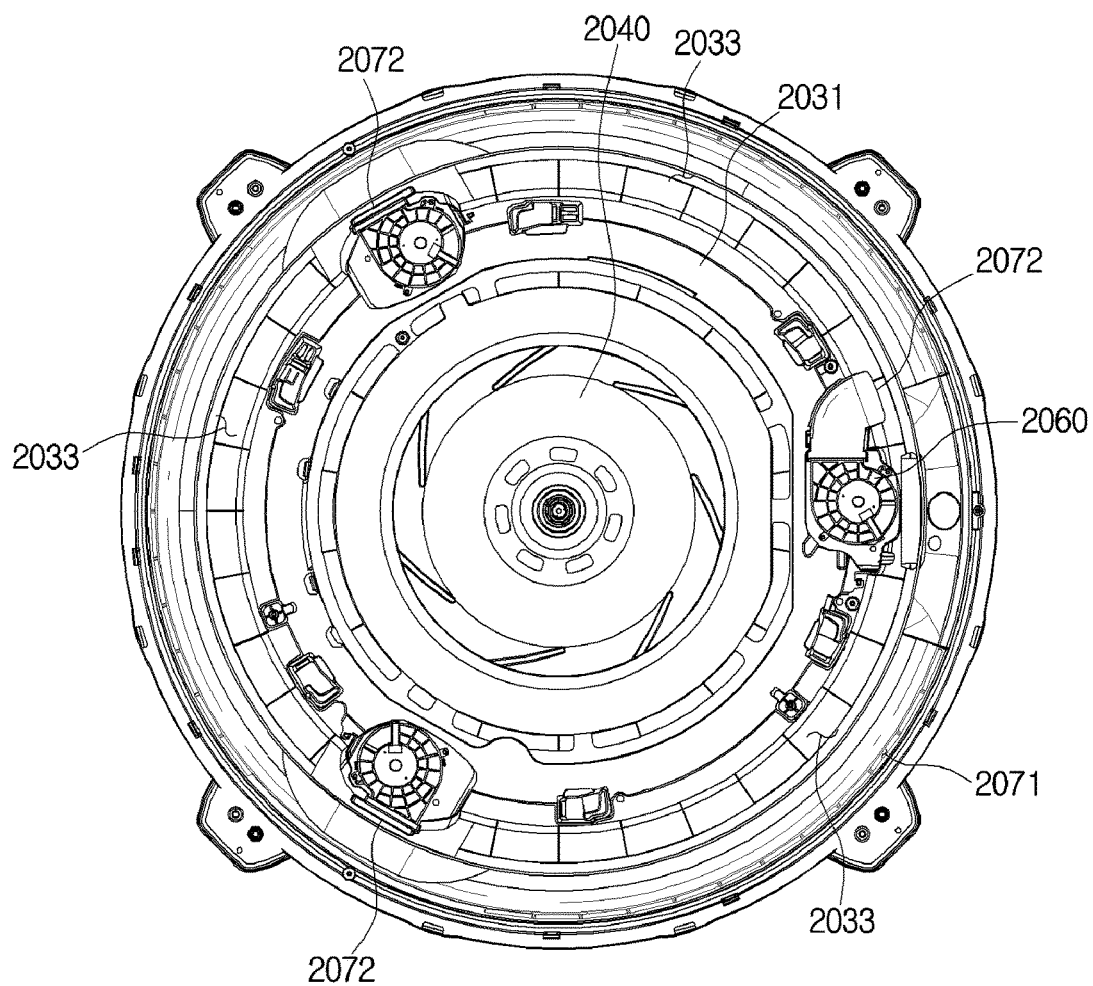
FIG. 63 is a bottom view of an AC with a second bottom housing eliminated, according to an embodiment of the present disclosure.
Figure 64:
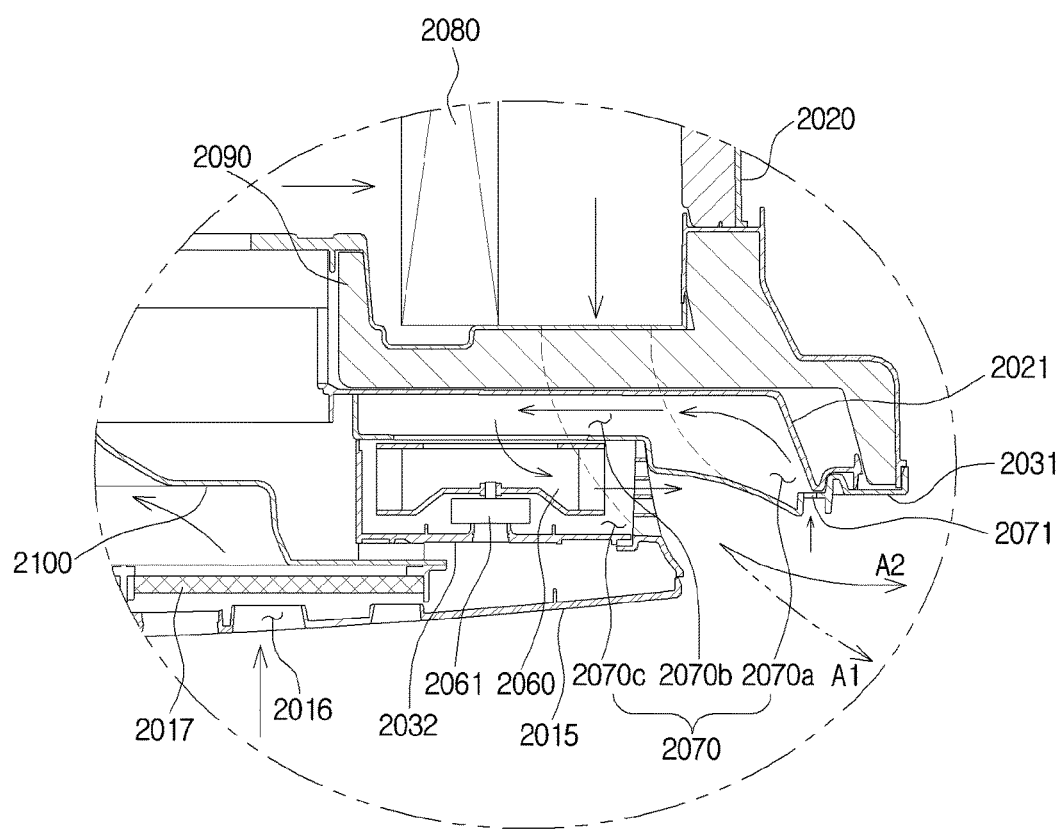
FIG. 64 is an enlarged view of a part of what is shown in FIG. 60.

FIG. 59 is a perspective view of an AC indoor unit, according to an embodiment of the present disclosure. FIG. 60 is a side cross-sectional view cut along the line I to I indicated in FIG. 59. FIG. 61 is an exploded view of an AC, according to an embodiment of the present disclosure. FIG. 62 is an exploded view of a bottom housing of an AC, according to an embodiment of the present disclosure. FIG. 63 is a bottom view of an AC with a second bottom housing eliminated, according to an embodiment of the present disclosure. FIG. 64 is an enlarged view of a part of what is shown in FIG. 60.

Referring to FIGS. 59 to 64, schematic features of an AC in accordance with an embodiment of the present disclosure will now be described.

An AC indoor unit 2001 may be installed on the ceiling C. At least a part of the AC indoor unit 2001 may be embedded in the ceiling C.

The AC indoor unit 2001 may include a housing 2010 having an inlet 2011 and an outlet 2033, a heat exchanger 2080 arranged inside the housing 2010, and a blower fan 2040 for circulating air.

Viewed from the vertical direction, the housing 2010 may have an approximately circular shape. The housing 2010 may include a top housing 2020 arranged inside the ceiling C, a middle housing 2021 combined on the bottom of the top housing 2020, and a bottom housing 2030 combined on the bottom of the middle housing 2021.

A bottom housing 2030 may include a first bottom outer housing 2031a arranged around and below the middle housing and having a ring shape, a first bottom inner housing 2031b arranged on the inner side of the first bottom outer housing 2031a in the radial direction and having a ring shape, and a second bottom housing 2032 combined onto the bottom of the first bottom inner housing 2031b for covering the bottom of the first bottom inner housing 2031b (see FIG. 62). Alternatively, the first bottom inner housing 2031b and the second bottom housing 2032 may be integrated in one unit.

At a center part of the bottom housing 2030, an inlet 2011 having the form of an opening funneled from the outside to a blower fan 2040 to suck in outdoor air may be arranged. Specifically, the center part of the second bottom housing 2032 is opened, and the space funneled from the opening of the second bottom housing 2032 to the blower fan 2040 allows outdoor air to be sucked to the inside of the housing 2010.

A suction panel 2015 including a suction grill 2016 formed in a plurality of holes to cover the inlet 2011 and suck air into the inlet 2011 may be arranged below the inlet 2011, and an outlet 2033 for discharging air may be formed outside of the suction panel 2015 in the radial direction.

Viewed from the vertical direction, the outlet 2033 may have an approximately circular shape.

The outlet 2033 may be formed in a gap formed between the first bottom outer housing 2031a and the first bottom inner housing 2031b, i.e., between the first bottom outer housing 2031a and the first bottom inner housing 2031b in the radial direction. In other words, the outlet 2033 may be defined to be the space formed between the inner circumferential face of the first bottom outer housing 2031a and the outer circumferential face of the first bottom inner housing 2031b from the opening of the middle housing 2021.

However, the outlet 2033 is not limited thereto, but may be any space, an opening formed on the bottom housing 2030, funneled with the outside such that heat-exchanged air from a heat exchanger 2080 is discharged out of the bottom housing 2030.

With this structure, an AC indoor unit 2001 may suck in air at the bottom, cool or heat the air, and discharge the cooled or heated air out of the bottom.

A Coanda curved part to guide the air discharged through the outlet 2033 may be formed on the inner circumferential face of the first bottom outer housing 2031a. The Coanda curved part 2034 may guide an air flow discharged though the outlet 2033 to adhere closely to and flow across the Coanda curved part 2034.

A filter 2017 may be combined onto the top of the suction panel 2015 to filter out dust from air sucked into the suction grill 2016.

At the center part of the second bottom housing 2032, a suction guide 2100 may be formed to guide air passing the suction panel 2015 to move to the blower fan 2040. As described above, an opening is formed at the center part of the second bottom housing 2032, and the suction guide 2100 may be arranged on the opening of the second bottom housing 2032 to guide air flowing into the opening to move to the blower fan 2040.

Viewed from the vertical direction, the heat exchanger 2080 may have an approximately circular shape.

The heat exchanger 2030 may rest on a drain tray 2090 for condensed water generated in the heat exchanger 2080 to be collected in the drain tray 2090.

The blower fan 2040 may be located on inner side in the radial direction of the heat exchanger 2080. The blower fan 2040 may be a centrifugal fan that sucks in air in the axial direction and releases the air in the radial direction. The AC indoor unit 2001 may include a blower motor 2041 for driving the blower fan 2040. It may also include a blower fan inflow hole 2042 through which air sucked from the inlet 2011 is moved to the blower fan 2040.

With this structure, the AC indoor unit 2001 may suck in air in a room, cool or heat the air, and then release the cooled or heated air back to the room.

The AC indoor unit 2001 may further include an air flow control device 2050 for controlling a discharged air flow.

The air flow control device 2050 may control the direction of the discharged air flow by sucking in air around the outlet 2033 to change the pressure. Furthermore, the air flow control device 2050 may control an amount of sucking air around the outlet 2033. In other words, the air flow control device 2050 may control the direction of a discharged air flow by controlling the amount of sucking air around the outlet 2033.

Controlling the direction of a discharged air flow herein refers to controlling an angle of the discharged air flow.

In sucking in air around the outlet 2033, the air flow control device 2050 may suck in air from one side of a direction in which the discharged air flow flows.

Specifically, as shown in FIG. 64, given that a direction in which the discharged air flow flows when the air flow control device 2050 is not activated is denoted as direction A1, the air flow control device 2050 may be activated to change the direction for the discharged air flow to flow to direction A2 by sucking in air from one side to the direction A1.

At this time, the angle of changing direction may be controlled based on the amount of air suction. For example, the less the amount of air suction, the less the angle of changing direction, and the more the amount of air suction, the more the angle of changing direction.

The air flow control device 2050 may discharge the sucked air to the opposite side to the direction A1 in which the discharged air flow flows. By doing this, it may expand the angle of discharging air flow, thereby controlling the air flow more smoothly.

The air flow control device 2050 may suck in air from outside of the outlet 2033 in the radial direction. Like this, as the air flow control device 2050 sucks in air from the outside of the outlet 21 in the radial direction 2033, the discharged air flow may widely spread out from the center part of the outlet 2033 in the radial direction to the outer side in the radial direction.

The air flow control device 2050 may include an air flow control fan 2060 for producing a sucking force to suck in air around the outlet 2033, an air flow control motor 2061 for driving the air flow control fan 2060, an air flow control fan case 2062 that covers the air flow fan 2060 and the air flow control motor 2061, and guide path 2070 for guiding the air sucked in by the air flow control fan 2060.

The air flow control fan 2060 may be housed inside the bottom housing 2030. Specifically, the air flow control fan case 2062 may be arranged in the space formed in the first bottom outer housing 2031a. It is, however, not limited thereto, and the air flow control fan 2060 may be arranged inside the bottom housing 2030 and also be arranged in the space formed in the first bottom inner housing 2031b or the second bottom housing 2032 as well as the first bottom outer housing 2031a.

In the embodiment, there may be three air flow control fans 2060 each formed with 120 degrees. The air flow control fan 2060 is not limited thereto, but more or fewer air flow control fans 60 with various arrangements may be designed.

Although the air flow control fan 2060 corresponds to a centrifugal fan in the embodiment, it is not limited thereto, and various fans, such as axial-flow fans, cross-flow fans, mixed flow fans, etc., may also be used for the air flow control fan 60.

The guide path 2070 connects an inflow hole 2071 for sucking in air around the outlet 2033 to the discharging hole 2072 for discharging the air sucked in.

The inflow hole 2071 may be formed on the Coanda curved part 2034 of the first bottom housing 2031.

The discharging hole 2072 may be located around the outlet 2033 on the opposite side to the inflow hole 2071. Specifically, the discharging hole 2072 may be formed in the second bottom housing 2032.

As described above, this structure may enable the air flow control device 2050 to discharge the sucked air to the opposite side to the direction A1 in which the discharged air flow flows, and may widen the angle of discharging air flow, thereby controlling the air flow more smoothly.

The guide path 2070 may include a first path 2070a formed in the circumferential direction of the housing 2010 and funneled with the inflow hole 2071, a second path 2070b extending inward in the radial direction from the first path 2070*a*, and a third path 2070*c* formed in an area in which the air flow control fan 2060 is safely received.

Accordingly, air sucked in through the inflow hole 2071 may be discharged out of the discharging hole 2072 through the first path 2070*a*, the second path 2070*b*, and the third path 2070*c*.

The guide path 2070 may be formed by the middle housing 2021, the first bottom housing 2031*a*, 2031*b*, and the second bottom housing 2032. Specifically, the first and second paths 2070*a* and 2070*b* may be formed in an internal space formed by the middle housing 2021 and the first bottom housing 2031*a*, 2031*b*, and the third path 2070*c* may be formed in an internal space formed by the second bottom housing 2032 and the air flow control fan case 2062.

The structure of the guide path 2070 is, however, only by way of example, and there are no limitations on the structure, shape, and arrangement of the guide path 2070 as long as the guide path 70 connects the inflow hole 2071 and the discharging hole 2072.

In the first bottom outer housing 2031*a*, there may be bridges 2074 arranged to partition the outlet 2033 and form the second path 2070*b*. In the embodiment, there are three bridges.

With the structure, the AC indoor unit in accordance with embodiments of the present disclosure may control a discharged air flow without a blade structure, as compared to a conventional AC indoor unit in which a blade is arranged in the outlet and an air flow is controlled by turning the blade. Accordingly, because there is no interference by a blade, an amount of discharge may increase and circulation noise may be lessened.

Furthermore, in contrast with the conventional AC indoor unit having an outlet that has to be formed in a straight shape to turn the blade, the AC indoor unit according to embodiments of the present disclosure has an outlet that may be formed in a circular shape, and accordingly the housing and the heat exchanger may also be formed in the circular shape, thereby improving the aesthetic appearance with the differentiated design. Furthermore, given that the shape of a common blower fan is circular, in the embodiments of the present disclosure, air flows more naturally, pressure loss is reduced, and as a result, cooling or heating performance of the AC may be improved. In the following, a suction guide 2100 to guide air to be sucked into the AC indoor unit 2001 will be described in detail.

Figure 65:
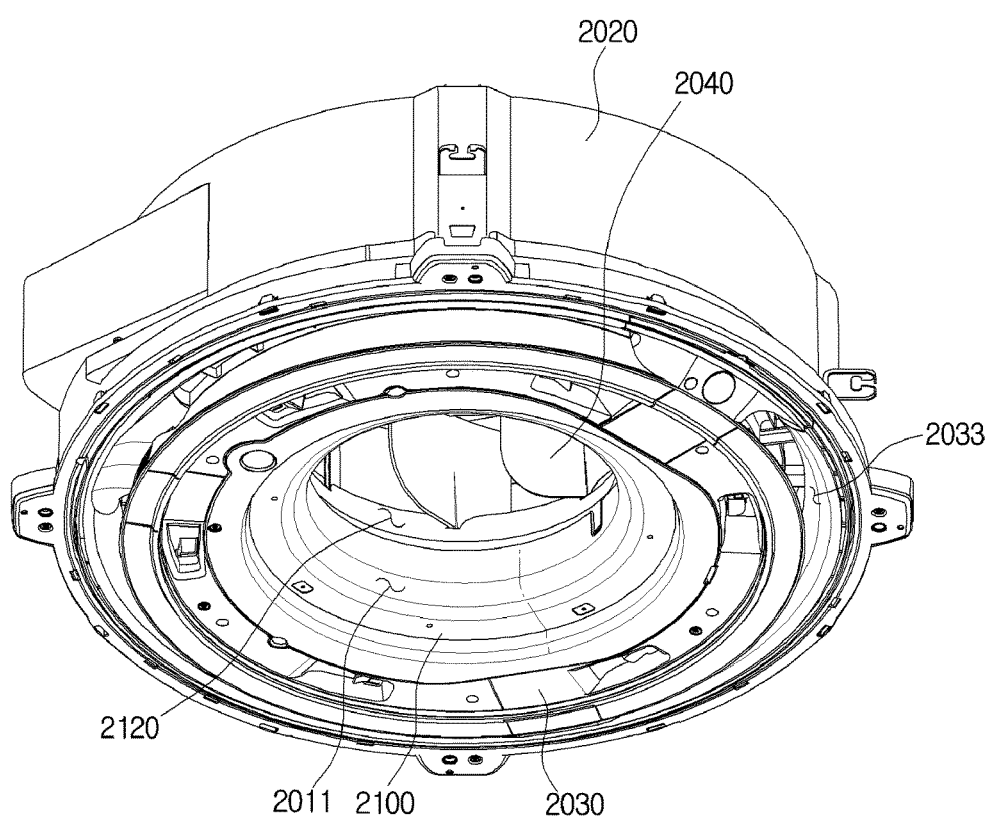
FIG. 65 is a perspective bottom view of a separated suction panel of an AC, according to an embodiment of the present disclosure.
Figure 66:
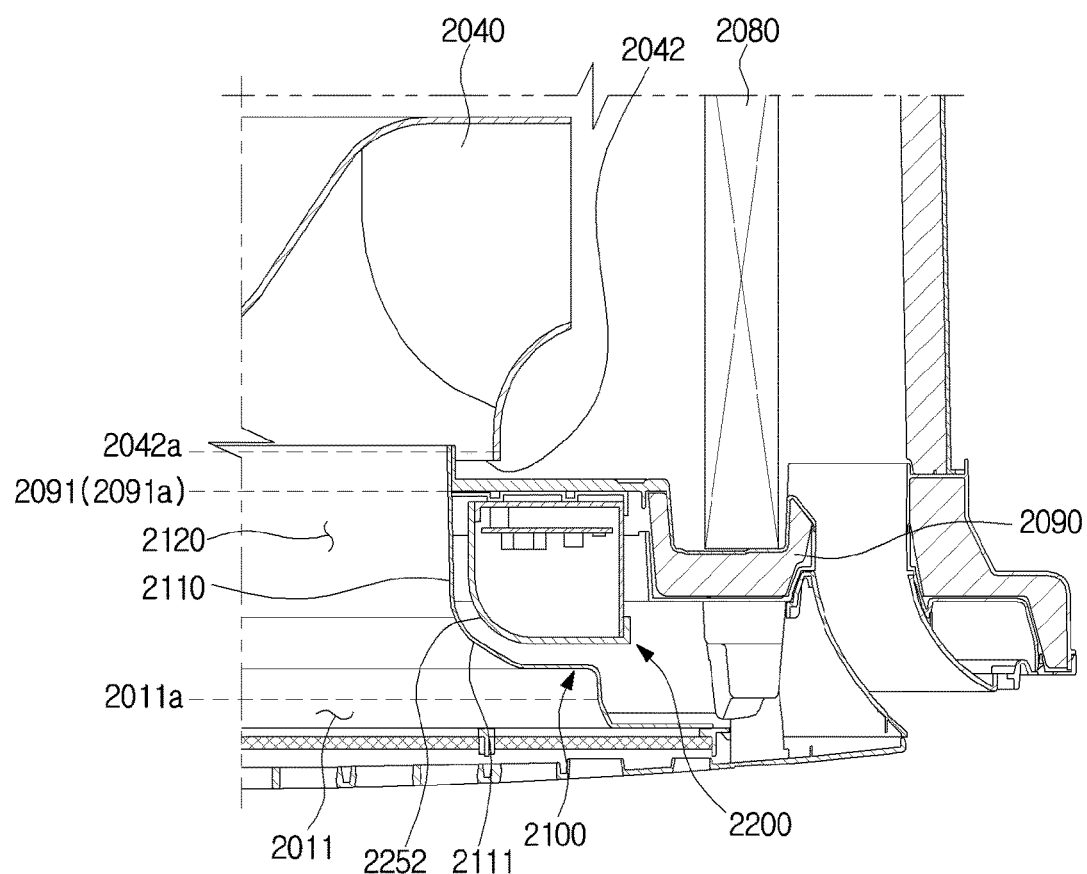
FIG. 66 is a partially cross-sectional view of a suction guide of an AC, according to an embodiment of the present disclosure.
Figure 67:
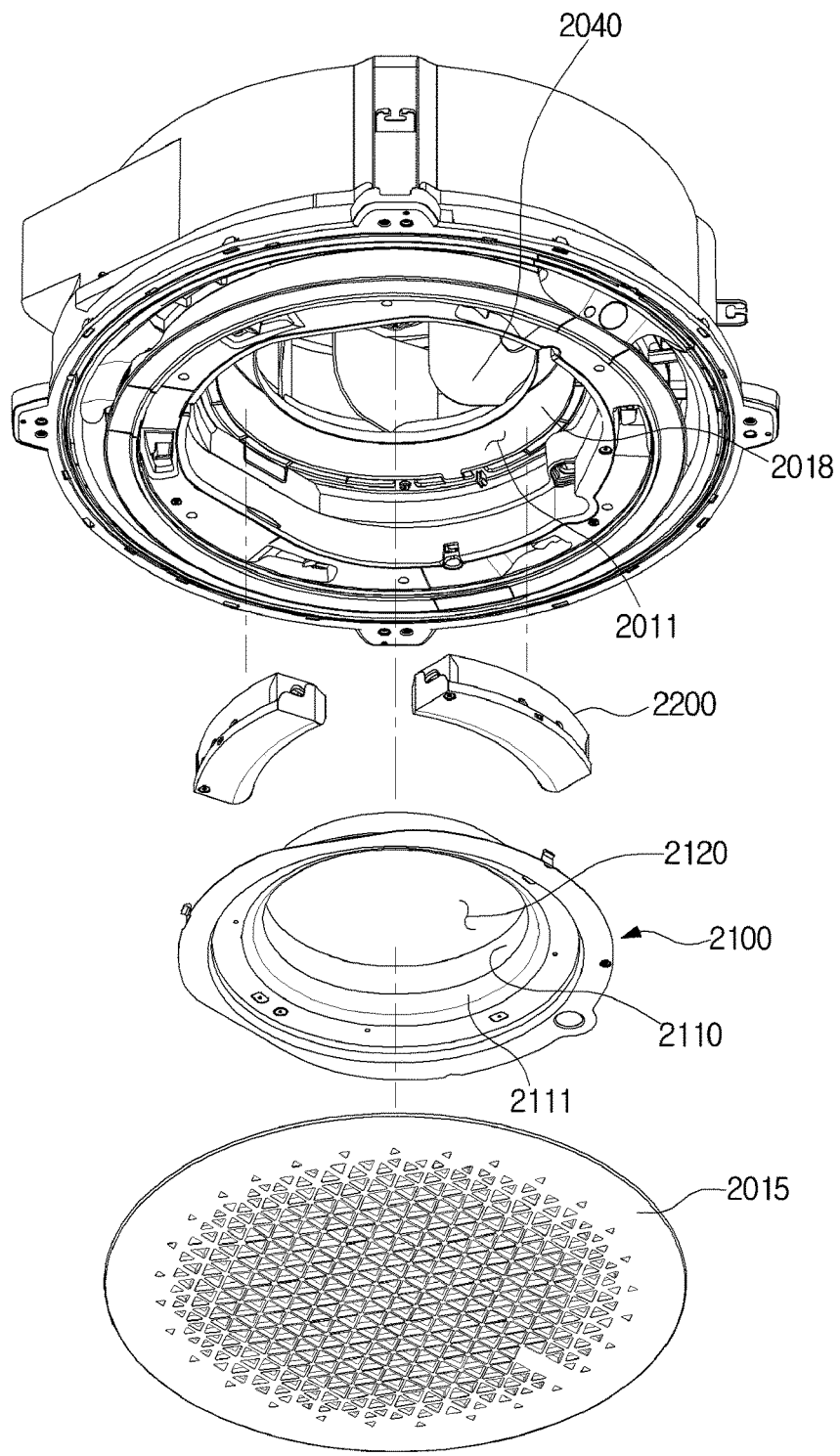
FIG. 67 is an exploded view of some parts of an AC, according to an embodiment of the present disclosure.

FIG. 65 is a perspective bottom view of a separated suction panel of an AC, according to an embodiment of the present disclosure. FIG. 66 is a partially cross-sectional view of a suction guide of an AC, according to an embodiment of the present disclosure. FIG. 67 is an exploded view of some parts of an AC, according to an embodiment of the present disclosure.

Referring to FIG. 65, the suction guide 2100 to guide outdoor air flowing into the housing 2010 may be arranged between an inlet 2011 and a blower fan inflow hole 2042.

The suction guide 2100 may be arranged in the form of a tube between the inlet 2011 and the blower fan 2040 by extending from the inlet 2011 and the blower fan inflow hole 2042 such that outdoor air may pass through the inlet 2011 and flow into the blower fan 2040.

The suction guide 2100 may include a guide plane 2110 extending from the inlet 2011 to the blower fan inflow hole 2042 and having the curved form.

The guide plane 2110 is a part of the inner circumferential face of the suction guide 2100, and may be formed in a ring shape that encloses the outer circumferential face of the inlet 2011 and extends to the blower fan inflow hole 2042. Furthermore, the guide plane 2110 may pass through an opening 2091 formed at a center part of a drain tray 2090 and extend from the inlet 2011 to the blower fan inflow hole 2042.

The air sucked in through the inlet 2011 is guided by the guide plane 2110 to flow into the blower fan 2040 and may then be heat-exchanged with the heat exchanger 2080. That is, the space formed by the guide plane 2110 may be a suction path 2120 through which the air flows.

The suction guide 2100 may include a round part 2111 formed to be rounded and curved between the inlet 2011 and the blower fan inflow hole 2042. Specifically, as shown in FIG. 65, the round part 2111 may be formed to be rounded toward the inner side of the housing 2010 from the inlet 2011 to the drain tray 2090.

The guide plane 2110 may include the round part 2111 and may extend to a side adjacent to the blower fan inflow hole 2042. Specifically, the guide plane 2110 may be defined as the inner circumferential face of the suction guide 2100 extending from the round part 2111 to the blower fan inflow hole 2042.

The suction path 2120 may be formed by the round part 2111 to have a streamlined shape to promote smooth air circulation from the inlet 2011 to the blower fan inflow hole 2042.

The round part 2111 may be formed such that a cross-sectional area of the suction path 2120 formed adjacent to the inlet 2011 is wider than a cross-sectional area of the suction path 2120 formed on the side of the drain tray 2090.

Specifically, the suction path 2120 may have a curved plane in which the round part 2111 is convex toward the inner side of the housing 2010 with respect to a rotation axis of the blower fan 2040, such that the radius of the guide plane 2110 formed adjacent to the blower fan inflow hole 2042 extends less than the radius of the guide plane 2110 formed adjacent to the inlet 2011.

The round part 2111 is not limited thereto, but may be formed in a round form that extends from the inlet 2011 to where the blower fan inflow hole 2042 is located, and may include a curved plane concave to the inner side of the housing 2100 with respect to the rotation axis of the blower fan 2040.

The round part 2111 may start bulging from a side adjacent to the inlet 2011 and stop bulging between the inlet 2011 and the drain tray 2090.

Specifically, one side of the round part 2111 may be in an area located on the upper side than the inlet 2011, and the other side of the round part 2111 may be in between the inlet 2011 and the drain tray 2090, the other side being bulged to be turned 90 degrees from the one side of the round part 2111.

The round part 2111 is, however, not limited thereto. For example, the round part 2111 may start bulging from the inlet 2011 and the other side of the round part 2111 may be arranged in the blower fan inflow hole 2042 while passing through the drain tray 2090 so that the bulge may lead to the blow fan inflow hole 2042 from the inlet 2011.

Due to the round part 211, the guide plane 2110 does not have a plane vertical to the rotation axis of the blow fan 2040, thereby promoting smooth air flow.

As the suction guide 2100 passes through the drain tray 2090 and extends from the inlet 2011 to the blower fan inflow hole 2042, the drain tray 2090 may not be exposed to the outside by being covered by the suction guide 2100.

Specifically, the outer circumferential face of the suction guide 2100 may be formed in the direction facing the inner circumferential face of the housing 2010 so as not to be exposed to the outside, and the inner circumferential face of the suction guide 2100 may be arranged in the form that is funneled to the blower fan 2040 from the outside and thus not be exposed to the outside. Accordingly, the drain tray 2090 may be located on the outer side of the outer circumferential face of the suction guide 2100 not to be exposed to the outside.

In other words, no drain tray 2090 may be arranged on the suction path 2120 formed by the guide plane 2110 located in the inner circumferential face of the suction guide 2100. That is, the guide plane 2110 may be formed in order to separately arrange the suction path 2120 and the drain tray 2090.

In the case of the conventional AC, part of the drain tray is located in the suction path to interfere with the air flow. In particular, in the case of part of the drain tray arranged to be vertical to the rotation axis of the blower fan, it blocks flow of sucked air, thereby reducing an amount of the air flowing into the blower fan and making significant noise due to collision with the drain tray.

On the contrary, in accordance with an embodiment of the present disclosure, as the suction guide 2100 separates the drain tray 2090 from the suction path 2120, the above problems occurring in the conventional AC may be solved.

Especially, in addition to separating the drain tray 2090, the round part 2111 may be arranged in the section covering the drain tray 2090 in order not to block air flow but to promote smooth air flow into the blower fan 2040.

Furthermore, as will be described later, built-in parts of the AC indoor unit 2001, such as a control case 2200 may be arranged on the edge side of the opening 2091, and covered by the suction guide 2100 not to be arranged in the suction path 2120.

Because the built-in parts, such as the drain tray 2090 and the control case 2200 are covered by the suction guide 2100 and exclude a plane formed in the suction path 2120 to be vertical to the rotation axis of the blower fan 2040, air fluidity may increase while frictional noise may be minimized.

In particular, in an embodiment of the present disclosure, noise made in the suction path 2120 may be reduced by about 1.5 dB when the AC indoor unit 2001 is driven with the suction guide 2100 assembled, as compared to when the AC indoor unit 2001 is driven with the suction guide 2100 eliminated.

To explain the suction guide 2100 in some perspective, an opening of the side of the blower fan 2040 formed to allow air to be sucked into the blower fan 2040 may be defined as a first inlet 2042a, an opening formed on the housing 2010 to allow air to flow to the inner side of the housing 2010 may be defined as a third inlet 2011a, and an opening formed in the drain tray 2090 to allow the air sucked in through the third inlet 2011a to pass through the drain tray 2090 may be defined as the second inlet 2091a.

The suction guide 2100 may be arranged to extend from the side of the first inlet 2042a to the side of the third inlet 2011a, and to pass through the second inlet 2091a formed between the first and third inlets 2042a and 2011a (see FIG. 61).

As the suction guide 2100 passes through the second inlet 2091a, the suction guide 2100 enables the drain tray 2090 arranged on the outer side of the outer circumferential face of the suction guide 2100 to be separated from the suction path 2120 formed by the inner circumferential face of the suction guide 2100.

Furthermore, the third inlet 2011a may be formed by the round part 2111 to be larger in radius than the first inlet 2042a, and the second inlet 2091a formed between them has a smaller in radius than the third inlet 2011a.

An embodiment of the suction guide 2100' will now be described. Other features than the suction guide 2100' and the drain tray 2090' as will be described below are the same as features in the aforementioned embodiment, so the description will be omitted.

Figure 68:
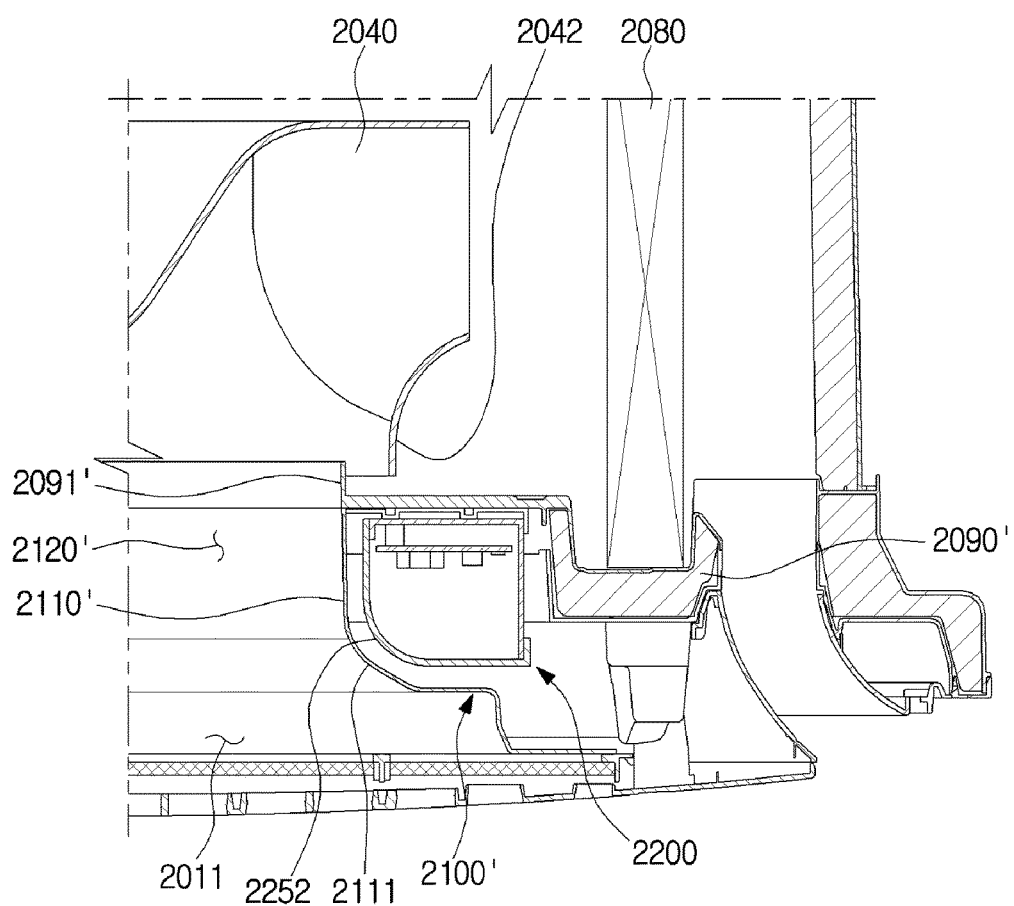
FIG. 68 is a partially cross-sectional view of a suction guide of an AC, according to an embodiment of the present disclosure.

FIG. 68 is a cross-sectional view of a part of a suction guide of an AC, according to an embodiment of the present disclosure.

The suction guide 2100' may be arranged in the form of a tube between the inlet 2011 and a drain tray 2090' by extending from one side where the inlet 2011 is arranged to the other side where the dray tray 2090' is located, in order to allow outdoor air to flow in through the inlet 2100 to the blower fan 2040 via the suction guide 2100' and the drain tray 2090'.

The other side of the suction guide 2100' may be connected to an opening 2091' of the drain tray 2090', and form a tube shape connected to the guide plane 2100' and the opening 2091' on the inner side of the housing 2010.

In other words, unlike the suction path as described in connection with the aforementioned embodiment, the suction path 2120' may be formed by parts of the suction guide 2100' and drain tray 2090'. Specifically, as the guide plane 2110' extends from the round part 2111 to one side of the inner circumferential face of the opening 2091' of the drain tray 2090', the suction path 2120' may be formed in a section extending along the guide plane 2110' to the other side of the inner circumferential face of the opening 2091' of the drain tray 2090'.

The suction guide 2100' may be arranged to be in contact with one side of the inner circumferential face of the opening 2091' of the drain tray 2090' without a gap. Accordingly, air may be guided and moved from the inlet 2011 to the blower fan 2040 through the suction path 2120'.

As one side of the inner circumferential face of the opening 2091' is in contact with the guide plane 2110' without a gap, the side of the guide plane 2110' coming into contact with the opening 2091' and the one side of the inner circumferential face of the opening 2091' may have the radius of the same size. Accordingly, because there is no structure formed in the suction path 2120' to be vertical to the rotation axis of the blower fan 2040, air may flow into the blower fan 2040 without restriction of the fluidity.

The other side of the inner circumferential face of the opening 2091' extends to the side of the blower fan inflow hole 2042, thereby guiding air to flow into the blower fan 2040.

Accordingly, unlike the aforementioned embodiment, even if part of the drain tray 2090' is exposed to the suction path 2120', air may be guided to the blower fan without restricting the air fluidity.

In other words, in the case of the conventional AC, part of the drain tray arranged in the suction path interferes with the air fluidity, but in accordance with the embodiment of the present disclosure, the problem arising in the conventional AC may be solved by the drain tray 2090' forming the suction path 2120' including a streamlined feature with the suction guide 2100', which does not interfere with the air fluidity.

In the following, a control case 200 will be described in detail.

Figure 69:
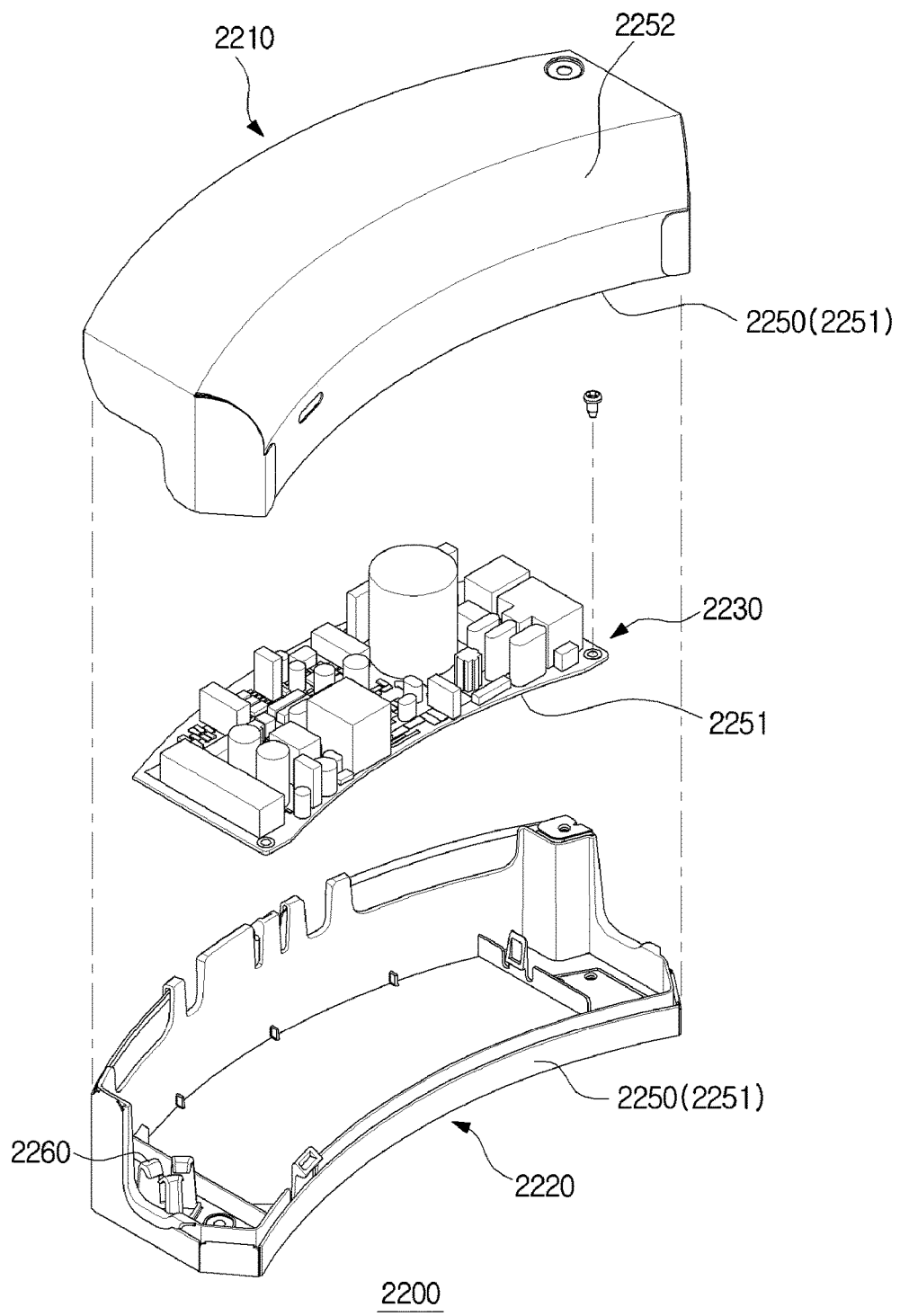
FIG. 69 is an exploded view of a control case, according to an embodiment of the present disclosure.
Figure 70:
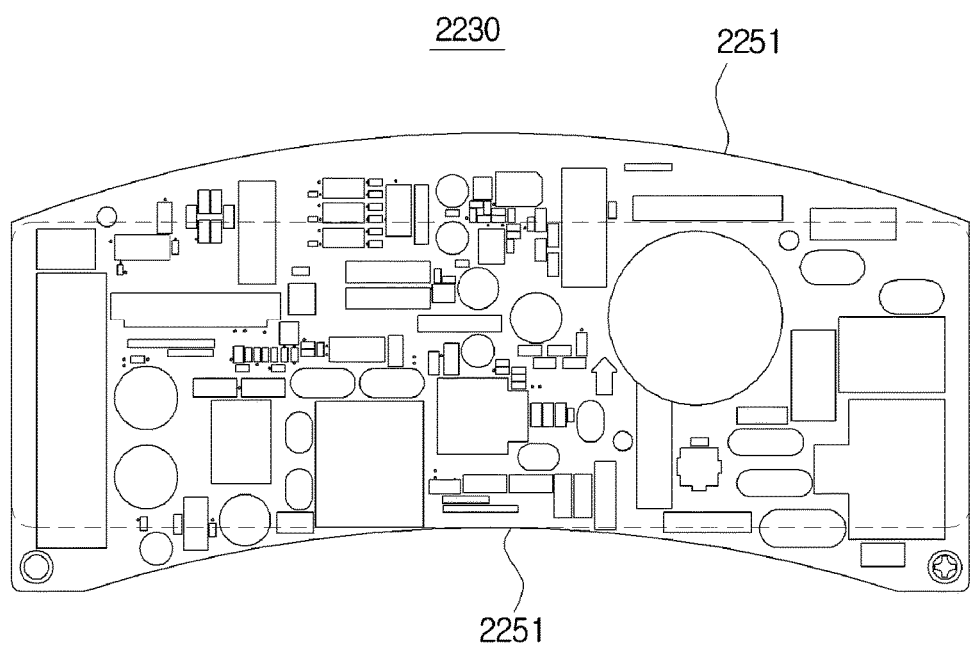
FIG. 70 is a floor plan of a Printed Circuit Board (PCB), according to an embodiment of the present disclosure.
Figure 71:
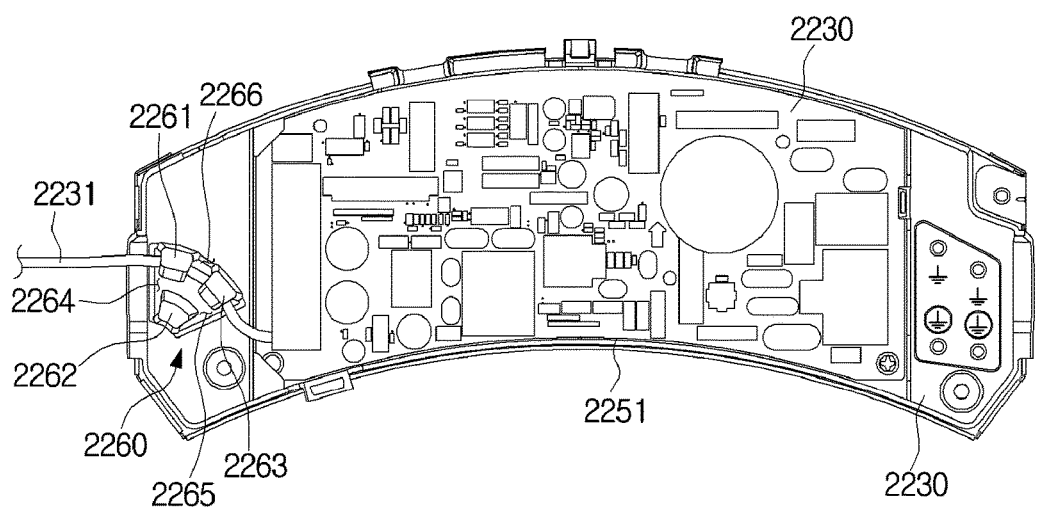
FIG. 71 is a floor plan of a PCB assembled in the lower case of a control case, according to an embodiment of the present disclosure.
Figure 72:
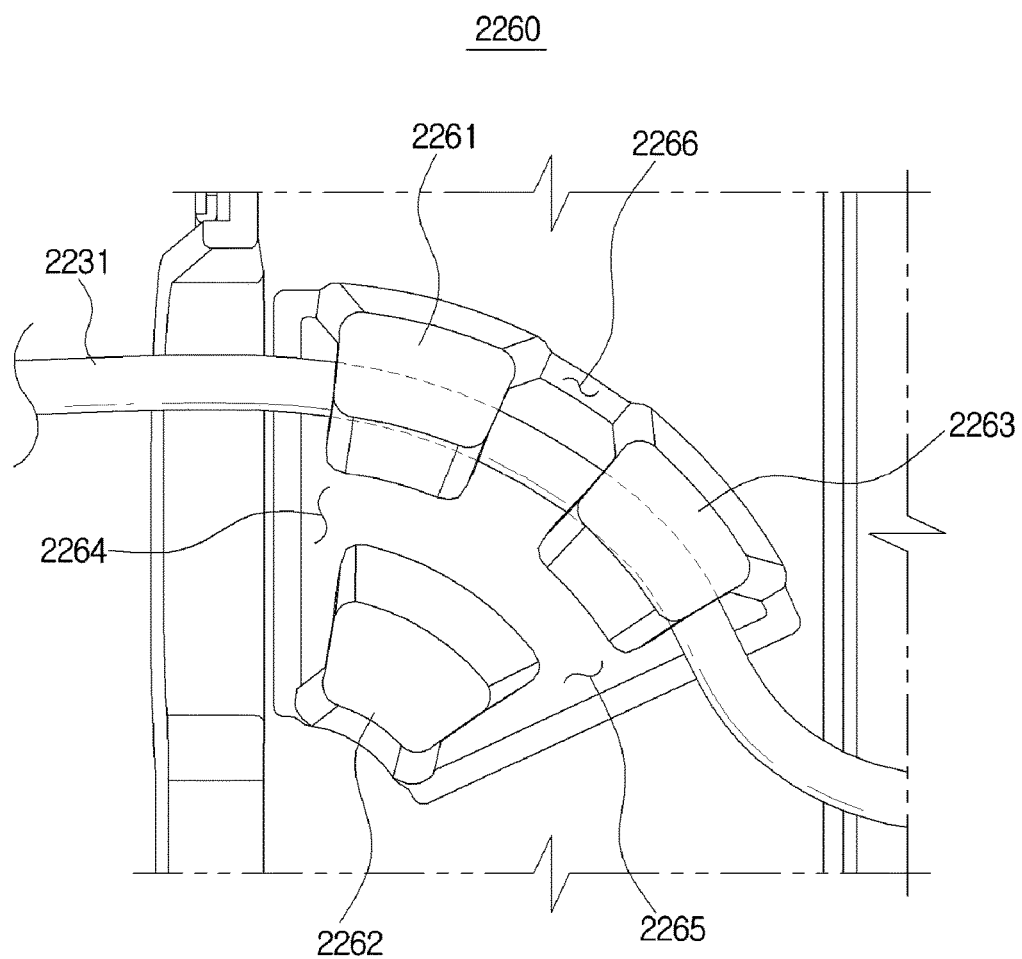
FIGS. 72, 73, 74, and 75 illustrate a wire held in a wire holder, according to an embodiment of the present disclosure.
Figure 73:
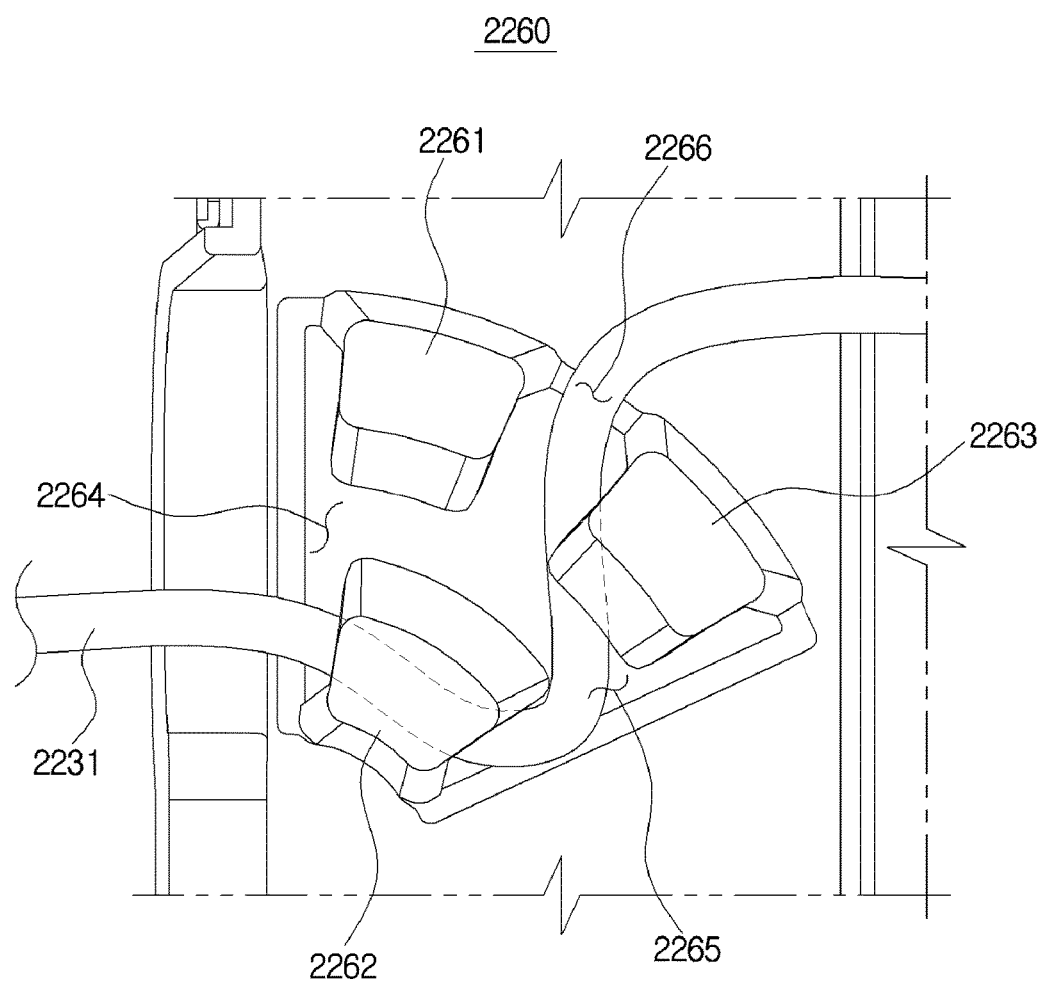
Figure 74:
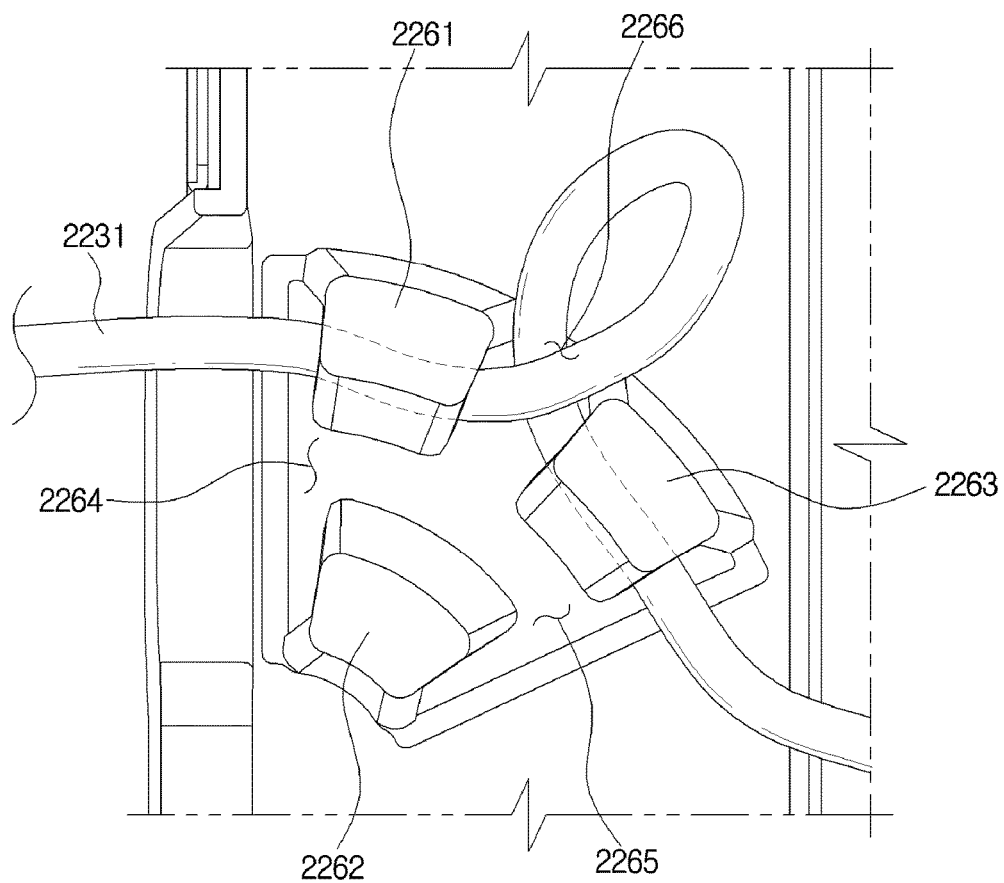
Figure 75:
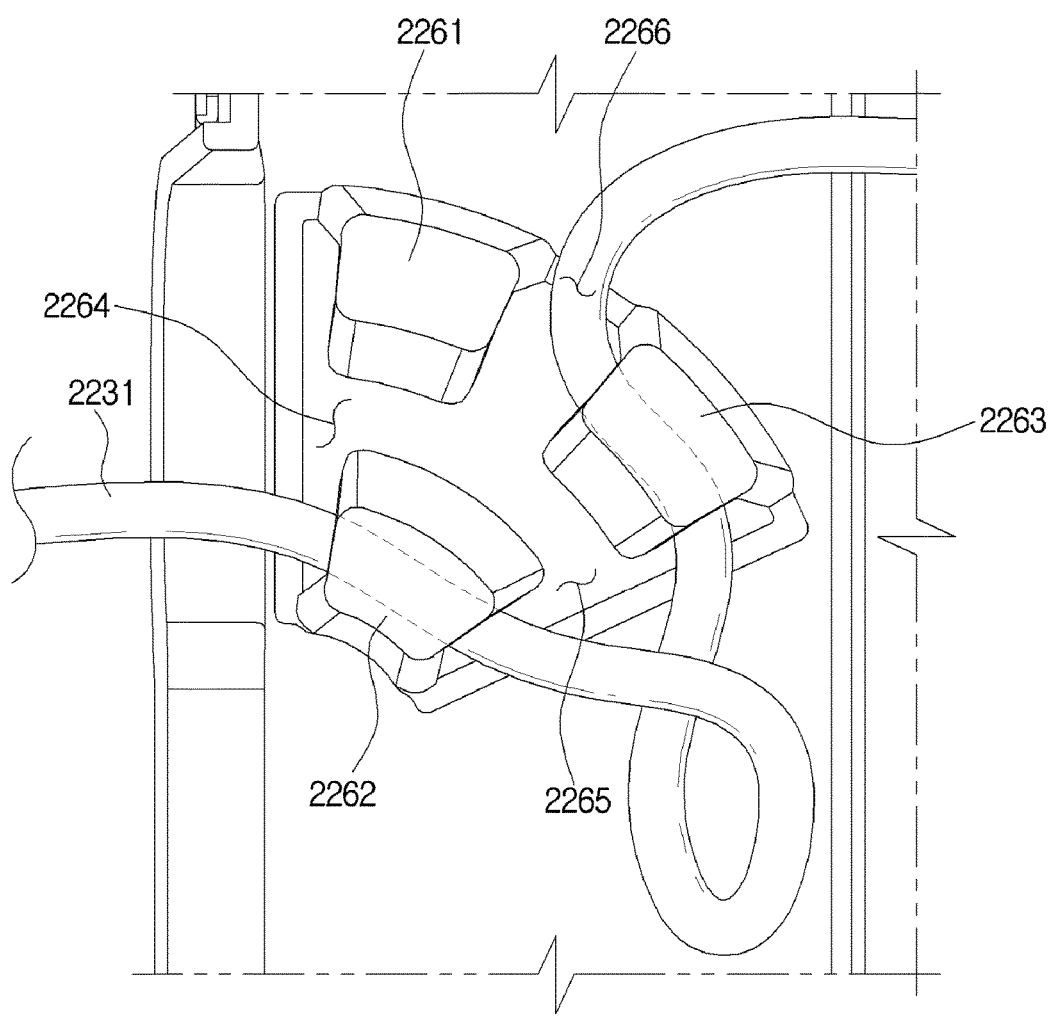

FIG. 69 is an exploded view of a control case, according to an embodiment of the present disclosure. FIG. 70 is a floor plan of a Printed Circuit Board (PCB), according to an embodiment of the present disclosure. FIG. 71 is a floor plan of a PCB assembled in the lower case of a control case, according to an embodiment of the present disclosure. FIGS. 72 to 75 illustrate a wire held in a wire holder, according to an embodiment of the present disclosure.

Referring to FIGS. 66 to 69, the control case 2200 may be arranged on an edge side of the opening 2091 of the drain tray 2090.

The control case 2200 may include a curved part 2250 corresponding to the outer circumferential face of the opening 2091. This is to prevent the control case 2200 from being arranged in the suction path 2120 while being arranged on the outer circumferential face of the opening 2091.

Specifically, the curved part 2250 of the control case 2200 may be arranged to correspond to the edge side of the opening 2091, so that there may be no part of the control case 2200 arranged on the outer side of the drain tray 2090, especially on the inner side of the opening 2091.

In the case of the conventional AC, the control case may be arranged on the drain tray in a similar way to the embodiment of the present disclosure, but the control case has the form of a box, part of which is exposed to the outer side of the drain tray and located in the suction path 2120, thereby interfering with air fluidity, making noise, and reducing a quantity of fluid.

Such problems may be solved in the embodiment of the present disclosure, where the control case 2200 is not exposed to the outer side of the drain tray 2090 and thus not located in the suction path 2120.

Furthermore, as the control case 2200 includes the curved part 2250, it may be covered by the suction guide 2100. Specifically, the curved part 2250 may be formed to correspond to the outer circumferential face of the opening 2091 as well as to correspond to the outer circumferential face of the suction guide 2100.

The outer circumferential face of the suction guide 2100 may have a radius of curvature corresponding to the inner circumferential face of the opening 2091 because it passes through the opening 2091, and because the curved part 2250 includes a curved plane having a radius of curvature corresponding to the outer circumferential face of the opening 2091, the outer circumferential face of the suction guide 2100 and the curved part 2250 may include their respective curved planes of a corresponding form.

With the curved part 2250, the suction guide 2100 may be arranged to have the inner circumferential face of a streamlined form as a whole without additional change in the shape, because the control case 2200 has no part protruding to the inner side of the suction guide 2100.

The control case 2200 may be arranged on the outer side of the outlet 2091 in the radial direction to be located on the drain tray 2090, and may be arranged between the inlet 2011 and the drain tray 2090 with respect to the vertical direction of the AC indoor unit 2001.

As described above, because the round part 2111 of the suction guide 2100 is formed between the inlet 2011 and the drain tray 2090, the control case 2200 may further include a curved part 2250 corresponding to the round part 2111 in the vertical direction.

Specifically, when the curved part 2250 corresponding to the opening 2091 is called a first curved part 2251, the control case 2200 may include a second curved part 2252 that has a curved plane corresponding to the round part 2111 in the vertical direction.

The control case 2200 may be covered by the second curved part 2252 with the suction guide 2100. Because the second curved part 2252 has a curved plane corresponding to the round part 2111, the control case 2200 may be arranged close to the outer circumferential face of the suction guide 2100.

Accordingly, the suction guide 2100 may be arranged to have the inner circumferential face of a streamlined form as a whole without additional change in the shape, because the control case 2200 has no part protruding to the inner side of the suction guide 2100 even in the vertical direction.

As shown in FIG. 69, the control case 2200 may include an upper case 2210 that has the first and second curved parts 2251 and 2252, a lower case 2220 that has the first curved part 2251, and a PCB 2230 arranged between the upper and lower cases 2210 and 2220.

As shown in FIG. 70, the PCB 2230 may include the first curved part 2251. This is to maintain the shape of the entire control case 2200 as the PCB 2230 is assembled inside the cases 2210, 2220.

However, if, unlike the embodiment of the present disclosure, the PCB 2230 is arranged on only a part of the internal area of the cases 2210, 2220 because the PCB 2230 is smaller in area than the cases 2210, 2220, the PCB 2230 may not include the first curved part 2251.

As shown in FIG. 71, a wire holder 2260 to hold a wire 2231 extending from the PCB 2230 may be formed in the lower case 2220.

The PCB 2230 may be electrically connected by the wire 2231 to internal components of the AC indoor unit 2001 for controlling the internal components. Otherwise, if the wire 2231 is disorderly placed inside the cases 2210, 2220, it is likely to be damaged. The wire holder 2260 may thus be arranged to orderly arrange the wire 2231.

The wire holder 2260 may be placed on one side or both sides of the space where the PCB 2230 is located in the lower case 2220. Among the entire wire 2231 extending to either sides from the PCB 2230, some may be held by the wire holder 2260 while others may extend to the outside of the cases 2210, 2220.

The wire holder 2260 may be formed by three hooks 2261, 2262, and 2263 arranged in the form of a triangle. It is, however, not limited to the embodiment, but may be formed by two hooks or four or more hooks.

Given that there are a first hook 2261 arranged on the top, a second hook 2262 arranged on the bottom left, and a third hook 2263 arranged on the bottom right with respect to the arrangement of the form of the triangle, projections of the respective hooks 2261, 2262, 2263 may be arranged toward the center of the arrangement of the form of the triangle.

There may be passing regions 2264, 2265, 2266 formed between the hooks 2261, 2262, 2263, through which the wire 2231 passes.

When the space between the first and second hooks 2261 and 2262 is defined as a first passing region 2265, the space between the second and third hooks 2262 and 2263 a second passing region 2266, and the space between the third and first hooks 2263 and 2261 a third passing region 2266, the wire 2231 may pass at least two different passing regions of the three passing regions 2264, 2265, 2266 and extend to the inner side of the cases 2210, 2220.

As shown in FIGS. 72 to 75, if the wire 2231 extends from the bottom of the PCB 2230 with respect to the plane of the lower case 2220, the wire 2231 may pass through the first and second passing regions 2264 and 2265 and extend to the outside of the cases 2210, 2220.

Furthermore, if there is a need to adjust the length of the wire 2231 because the wire 2231 is too long, the length may be adjusted by extending part of the wire 2231 to the third passing region 2266.

If being extended from the top of the PCB 2230, the wire 2231 may pass the first and third passing regions 2264 and 2266 and extend to the outside of the cases 2210, 2220.

Moreover, if there is a need to adjust the length of the wire 2231 because the wire 2231 is too long, the length may be adjusted by extending part of the wire 2231 to the second passing region 2265.

According to embodiments of the present disclosure, an AC indoor unit may control a discharged air flow by sucking air from around an outlet without a blade.

As the AC indoor unit controls a discharged air flow without a blade, reduction in an amount of discharge due to interference by the blade may be lessened.

As the AC indoor unit controls a discharged air flow without a blade, circulation noise may be reduced.

Furthermore, an outlet of the AC indoor unit may be implemented not only in the conventional straight-line shape but also in other various shapes, such as circular and curved shapes.

The AC may also prevent air discharged from the outlet from being sucked back into the inlet.

By preventing the air discharged from the outlet from being sucked back into the inlet, the AC may prevent condensation from being formed inside.

The AC may also increase a range the discharged air reaches, thereby improving its effective performance felt by the user.

The AC may also increase cooling/heating efficiency.

In addition, with a suction guide of the AC, a path of air sucked in by the suction guide improves, leading to increase in air flow and decrease in noise.

Moreover, with a control case of the AC to improve air flow, air flow increases while noise decreases.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

DESCRIPTION OF THE SYMBOLS 1,200,300,400,500,600,700: AC Indoor Unit
10: housing
14: Coanda Curved Part
15: Grill
16: Drain Tray
20: Inlet
21: Outlet
30: Heat Exchanger
31: Header
32: Tube
40: Blower Fan (Main Fan)
41: Blower Motor
50: Air flow Control Device
60: Air flow Control Fan (Auxiliary Fan)
61: Air flow Control Motor
62: Fan Case
70: Guide path
70a,70b,70c: First, Second, Third Path
71: Inflow Hole
72: Discharging Hole
90: Input Unit
A1,A2: Discharged Air flow

What is claimed is:

1. An air conditioner comprising:
   a housing having an inlet and an outlet;
   a main path formed in the housing to connect the inlet and the outlet;
   a main fan arranged in the main path to draw air into the housing through the inlet and to discharge air from the housing through the outlet; and
   an auxiliary fan arranged to draw air from the main path and to discharge the air, drawn from the main path, from the air conditioner so as to change a direction of the air discharged from the housing through the outlet by the main fan.

2. The air conditioner according to claim 1, further comprising:
   a guide path branched from the main path to guide the air drawn by the auxiliary fan.

3. The air conditioner according to claim 2, wherein the auxiliary fan is arranged on the guide path.

4. The air conditioner according to claim 1, wherein the air discharged from the air conditioner by the auxiliary fan interacts with the air discharged from the housing through the outlet by the main fan to change the direction of the air discharged from the housing through the outlet by the main fan.

5. The air conditioner according to claim 4, further comprising:
   an inflow hole through which air is introduced into the guide path from the main path, and a discharging hole through which air is discharged from the guide path.

6. The air conditioner according to claim 5, wherein the discharging hole is formed in a surface of the housing.

7. The air conditioner according to claim 1, further comprising:
   a heat exchanger arranged in the main path.

8. The air conditioner according to claim 7, wherein the auxiliary fan draws air from the main path between the inlet and the heat exchanger.

9. The air conditioner according to claim 7, wherein the auxiliary fan draws air from the main path between the heat exchanger and the outlet.

10. The air conditioner according to claim 1, wherein the auxiliary fan is formed inside the housing.

11. The air conditioner according to claim 1, wherein the auxiliary fan is formed outside the housing.

12. An air conditioner comprising:
    a housing having an inlet and an outlet;
    a main fan arranged in the housing to draw air into the housing through the inlet and to discharge air in a first direction from the housing through the outlet; and
    an auxiliary fan arranged to discharge air in a second direction corresponding to the first direction,
    wherein the air discharged by the auxiliary fan interacts with the air discharged from the housing through the outlet by the main fan to change a direction of the air discharged from the housing through the outlet by the main fan from the first direction to a third direction different from the first direction.

13. The air conditioner according to claim 12, wherein a first speed of the air discharged by the auxiliary fan is faster than a second speed of the air discharged from the housing through the outlet by the main fan.

14. The air conditioner according to claim 12, wherein the housing includes a Coanda curved part formed around the outlet to induce the air discharged by the auxiliary fan by a Coanda effect.

15. The air conditioner according to claim 14, wherein the second direction of the air discharged by the auxiliary fan corresponds to a tangential direction of the Coanda curved part.

16. The air conditioner according to claim 14, wherein the Coanda curved part is formed to be convex relative to the outlet.

17. The air conditioner according to claim 14, further comprising:
    a guide path to guide air drawn by the auxiliary fan.

18. The air conditioner according to claim 17, further comprising:
    an inflow hole through which air is drawn into the guide path, and
    a discharging hole through which air is discharged from the guide path.

19. The air conditioner according to claim 18, wherein the discharging hole is formed between an inner circumferential surface of the outlet and the Coanda curved part.

20. An air conditioner comprising:
    a main inlet provided in an exterior surface of the air conditioner;
    a main outlet provided in the exterior surface of the air conditioner;
    a heat exchanger configured to exchange heat with air flowing by the heat exchanger;
    a main fan configured to draw air into the air conditioner through the main inlet, transfer the air from the main inlet to the heat exchanger, and discharge the heat-exchanged air from the air conditioner through the main outlet;
    an auxiliary inlet;
    an auxiliary outlet; and
    an auxiliary fan configured to transfer air from the auxiliary inlet to the auxiliary outlet to change a direction of the discharged heat-exchanged air using at least one of a speed and a direction of the transferred air.

* * * * *